United States Patent [19]

Yamakawa

[11] Patent Number: 5,167,005
[45] Date of Patent: Nov. 24, 1992

[54] FUZZY COMPUTER

[75] Inventor: Takeshi Yamakawa, Fukuoka, Japan

[73] Assignee: Research Development Corporation of Japan, Tokyo, Japan

[21] Appl. No.: 392,405

[22] Filed: Aug. 11, 1989

[30] Foreign Application Priority Data

Aug. 19, 1988 [JP] Japan .............................. 63-206007
Aug. 19, 1988 [JP] Japan .............................. 63-206008
Aug. 19, 1988 [JP] Japan .............................. 63-206009
May 24, 1989 [JP] Japan .............................. 1-130648

[51] Int. Cl.$^5$ .............................................. G06F 7/70
[52] U.S. Cl. ........................................ 395/3; 395/900; 364/807
[58] Field of Search ................ 364/513, 807, 602; 307/201; 395/3, 900

[56] References Cited

U.S. PATENT DOCUMENTS 4,716,540  12/1987  Yamakawa ........................ 364/807
4,860,243   8/1989  Ueno et al. ........................ 364/807
4,875,184  10/1989  Yamakawa ........................ 364/807
4,914,614   4/1990  Yamakawa ...................... 364/746.2

FOREIGN PATENT DOCUMENTS 0268182  5/1988  European Pat. Off. .

OTHER PUBLICATIONS

Yamakawa et al., "Fuzzy Memory Device", *2nd IFSA Congress*, Jul. 20–25, 1987, pp. 551–555.
Yamakawa, "A Simple Fuzzy Computer Hardware System Employing MIN and MAX Operations", *2nd IFSA Congress*, Jul. 20–25, 1987, pp. 827–830.
Togai et al., "Expert System on a Chip", *IEEE Expert*, Fall 1986, pp. 55–62.
Yamakawa, "Intrinsic Fuzzy Electronic Circuits for Sixth Generation Computer", *Fuzzy Computing*, M. Gupta, Ed., 1988, pp. 157–171.
Zadeh, "Making Computers Think Like People", *IEEE Spectrum*, Aug. 1984, pp. 26–32.

*Primary Examiner*—Michael R. Fleming
*Assistant Examiner*—Robert W. Downs
*Attorney, Agent, or Firm*—Koda and Androlia

[57] ABSTRACT

A fuzzy computer which carries out fuzzy operations using membership functions.

This fuzzy computer readily processes implications made up of an antecedent expressed by fuzzy values and a consequent expressed by singleton values.

This fuzzy computer includes a fuzzy processor, fuzzy controller and a MAX circuit block composite device used in same, and in addition, it contains grade-controllable membership function circuits, grade-controllable membership function generator circuits and center of gravity determination circuits which function as a useful circuit called a defuzzifier for converting fuzzy quantities to definitive values.

5 Claims, 45 Drawing Sheets

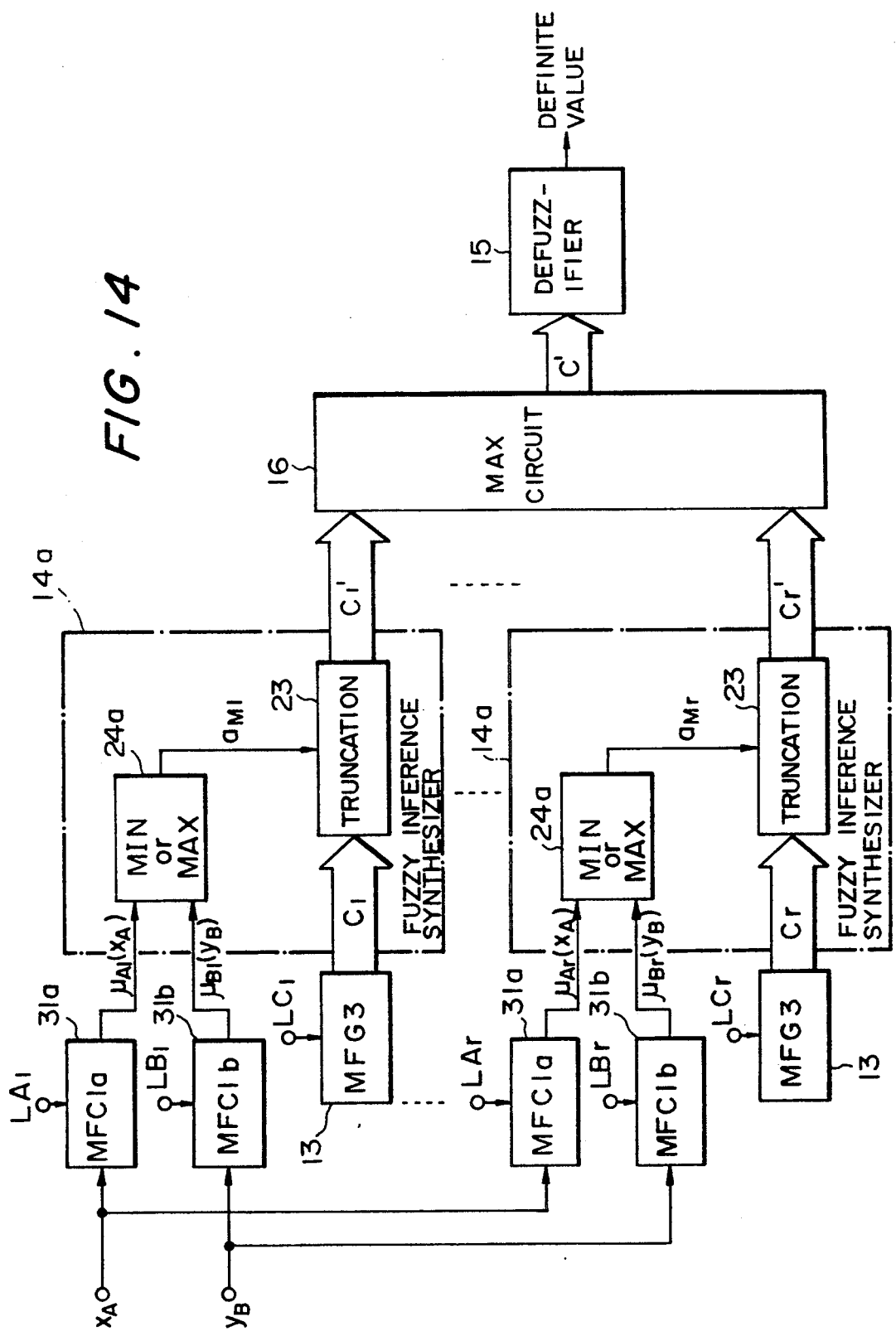

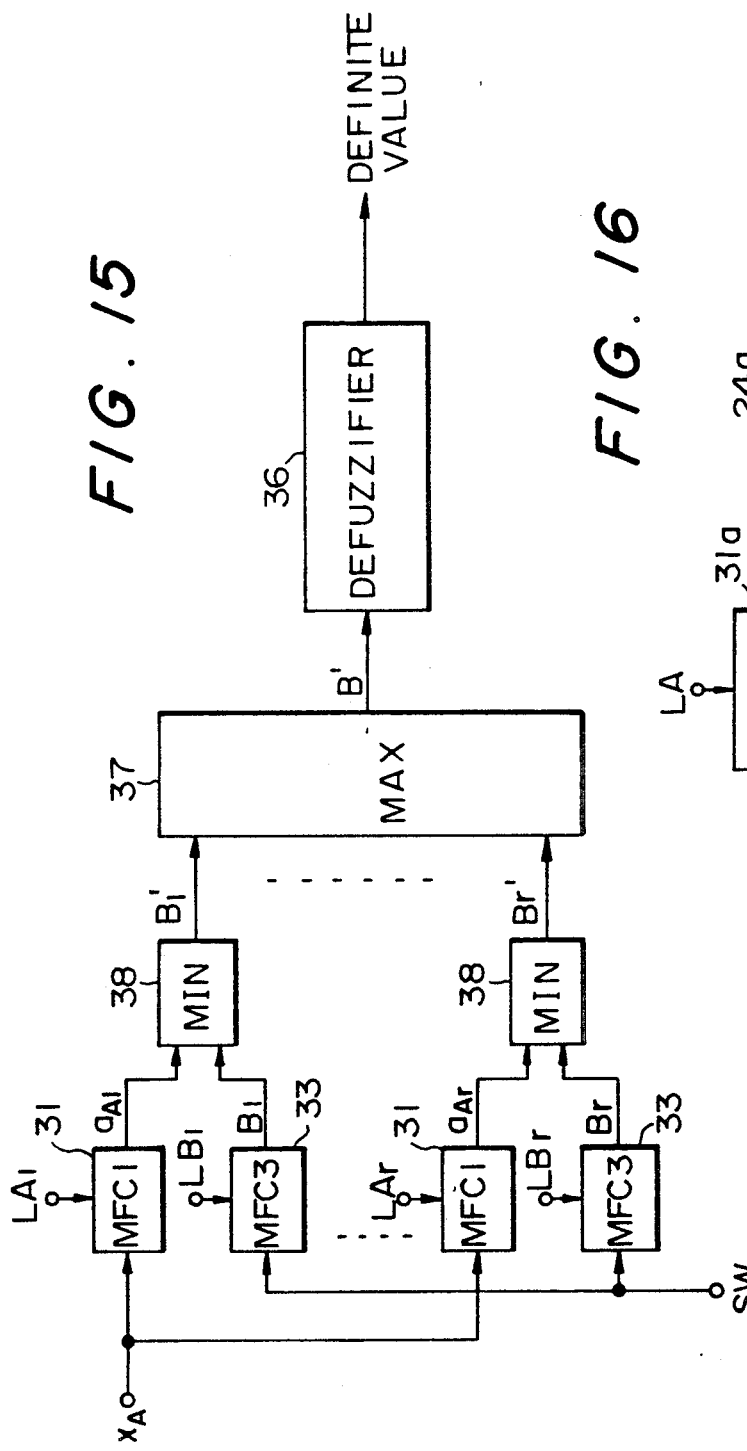

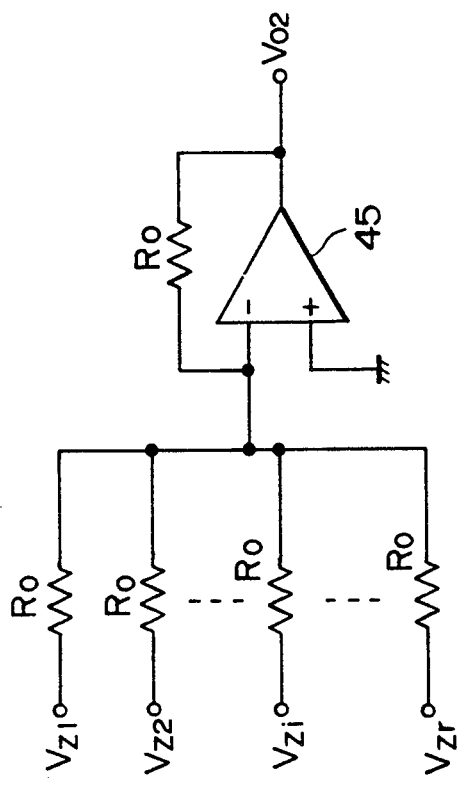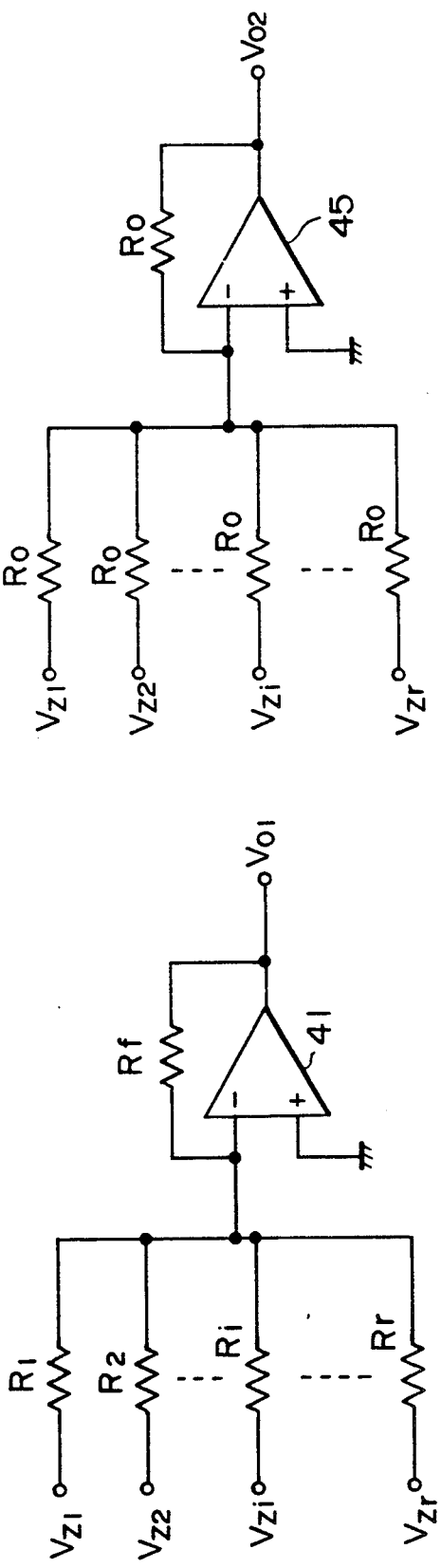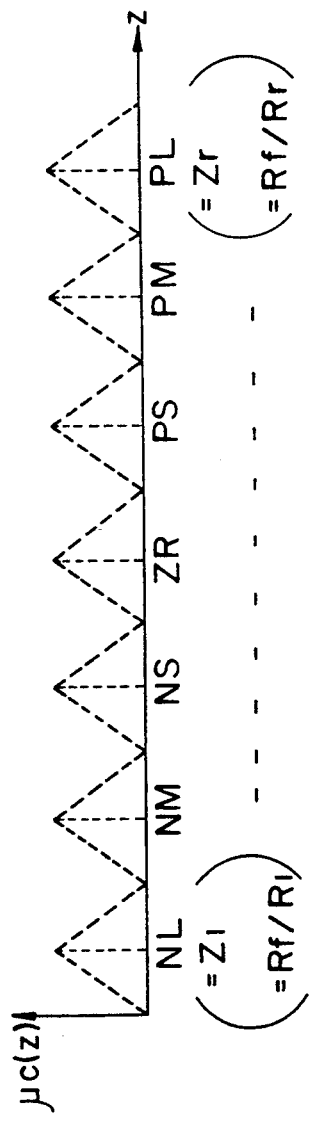
FIG. 20
FIG. 21
FIG. 22

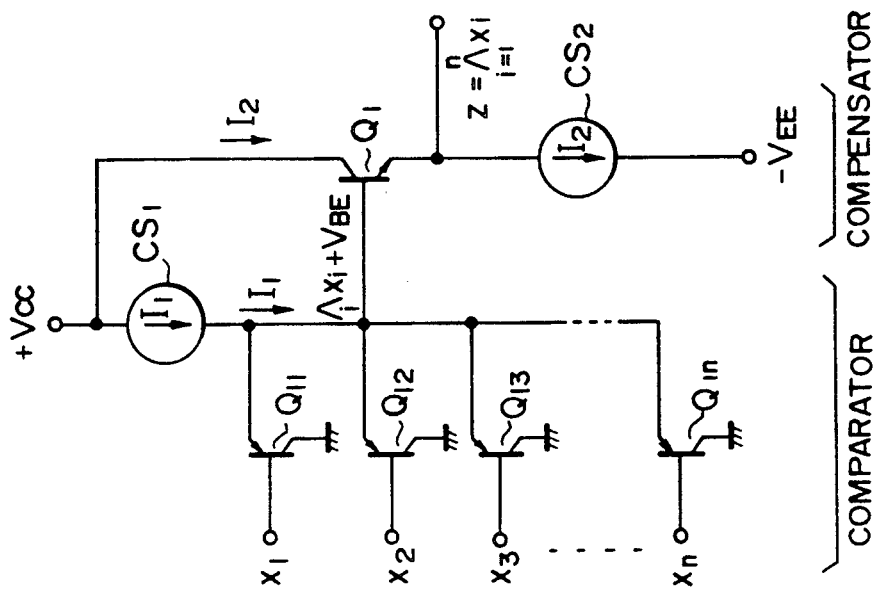

| FIG.26A | FIG.26B |

FIG. 36
| FIG.36A | FIG.36B | FIG.36C |
FIG. 36A
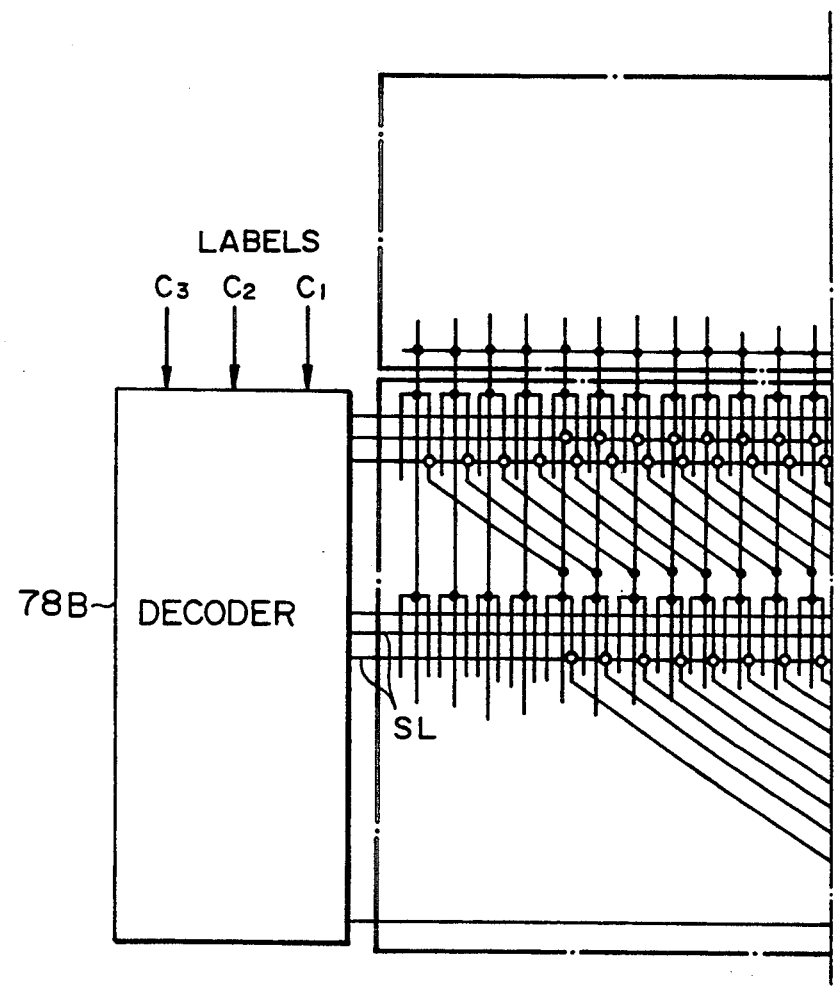
FIG. 37
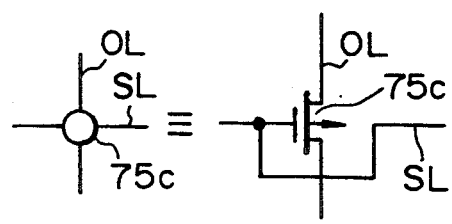

| LABEL | INPUT | | | OUTPUT | | | | | | |
|---|---|---|---|---|---|---|---|---|---|---|
| | $C_1$ | $C_2$ | $C_3$ | $S_1$ | $S_2$ | $S_3$ | $S_4$ | $S_5$ | $S_6$ | $S_7$ |
| P L | 1 | 1 | 1 | H | H | L | H | H | L | H |
| P M | 1 | 1 | 0 | H | L | H | H | H | L | H |
| P S | 1 | 0 | 1 | H | H | L | H | L | H | H |
| Z R | 1 | 0 | 0 | H | L | H | H | L | H | H |
| N S | 0 | 1 | 1 | L | H | H | H | L | H | H |
| N M | 0 | 1 | 0 | H | L | H | L | H | H | H |
| N L | 0 | 0 | 1 | L | H | H | L | H | H | H |
| UNSPECIFIED | 0 | 0 | 0 | H | H | H | H | H | H | L |

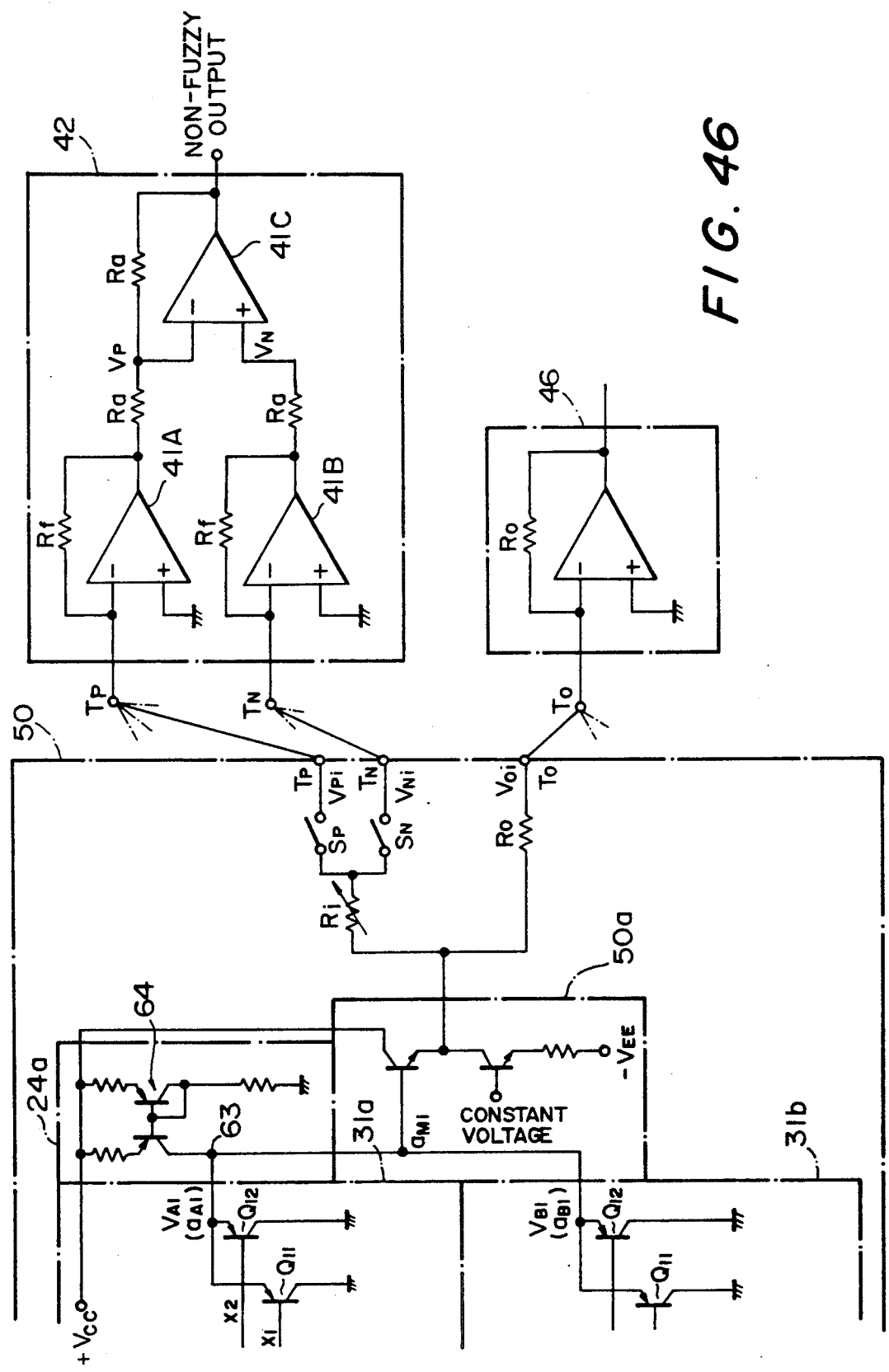

| FIG.47A | FIG.47B |

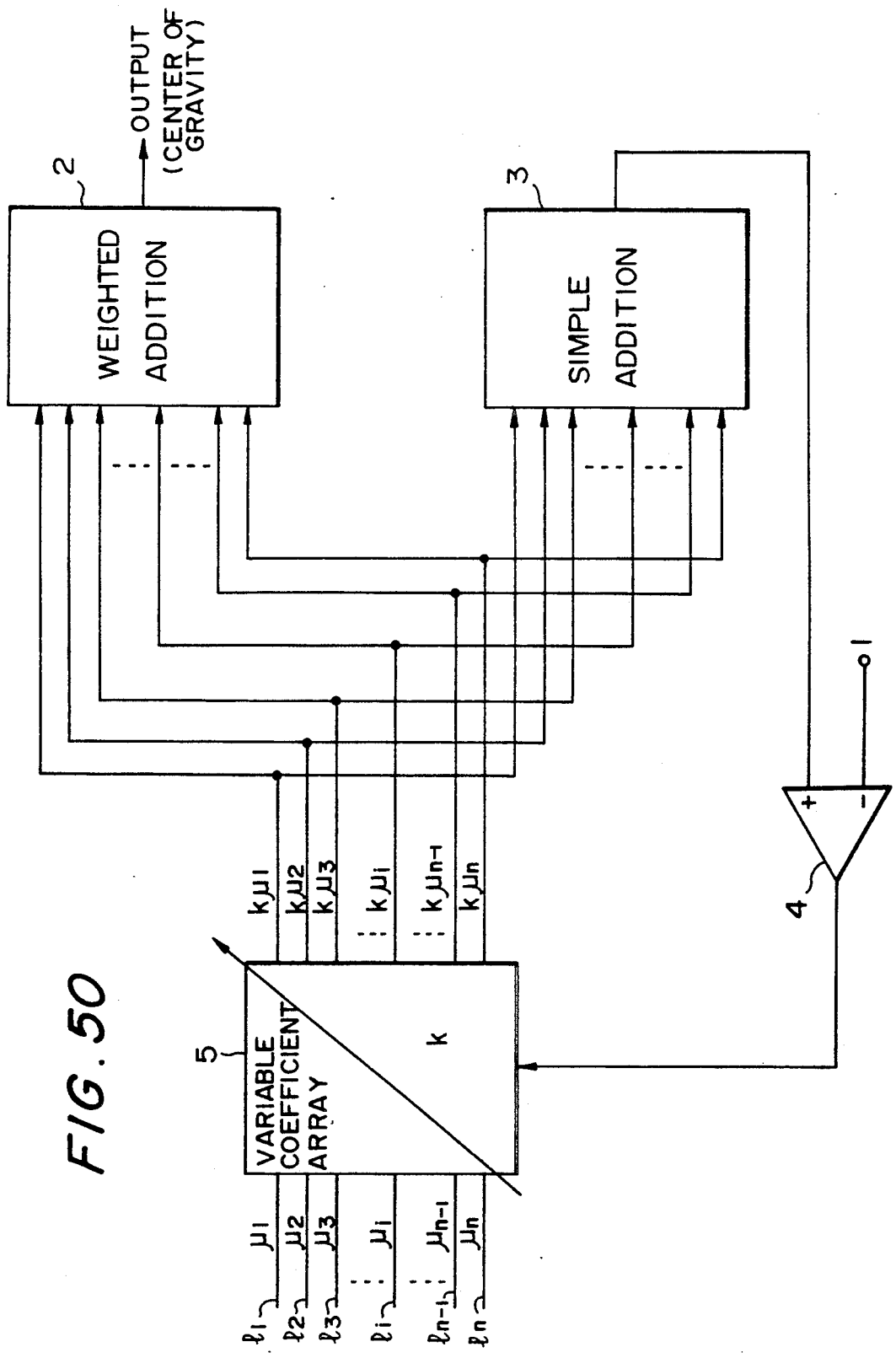

CENTER OF GRAVITY

FUZZY COMPUTER

BACKGROUND OF THE INVENTION

1. Field of the Invention

This invention relates to fuzzy computers, fuzzy processors, fuzzy controllers, and MAX circuit composite devices, along with circuits used in same, including grade-controllable membership function circuits, grade-controllable membership function generator circuits, and center of gravity determination circuits which act as useful circuits for defuzzifiers which convert fuzzy quantities into definitive values.

2. Prior Art Statement

A great human mind created the digital computer through the harmonization of the elements of the concept of the stored program, Boolean algebra and binary hardware which carries out stable operations. Iteration of these operations makes possible the development of complex logical structures and complex data processing techniques and the like. The stability of these operations gives the digital computer excellent reliability, so digital computer systems are becoming larger and larger. As long as the program does not include any human mental information, digital computers can run any type of program, hence their appellation as the "universal machine." The appearance of the digital computer system is having profound effects on the everyday life and culture of man.

Another great human mind created an extremely important concept, that of "fuzziness" through the study of how man thinks and how men communicate between themselves. L.A. Zadeh proposed the concept of the fuzzy set in 1965. Since then, while there have been many papers published on theoretical studies of fuzziness, there have been few reports on its practical application, and in fact, such work has only been carried out with the help of binary digital computers.

Research into fuzziness has emphasized that human knowledge is based on accumulated experience which is summed up as linguistic information such as expert knowledge. This linguistic information is generally endowed with vagueness, ambiguity, inaccuracy, and incompleteness so it can be characterized as membership functions. The size of the membership can be expressed by numerical values in the region from 0.0 to 1.0, varying within this range.

For linguistic information to be handled by a digital computer, the size (value) of the membership is represented by a binary code. In binary electronic circuits, this value represented by binary code is repeatedly stored, transferred and finally calculated over and over according to a stored program. Thus there is a problem with the processing of fuzzy information by digital system in that they require large amounts of time to do so. In addition, the binary-coded values require incredibly large amounts of storage and vast numbers of devices used for calculation. While the digital computer is a universal machine as described above, it is not necessarily most suited for the realtime processing of fuzzy information. This has prompted searches for other types of machines which can efficiently process fuzzy information at high speed.

Recent fuzzy computer systems represent fuzzy information including fuzzy membership functions, results of fuzzy inferences and such as electrical signals (voltage or current) distributed among a plurality of lines. One often needs to select a single definitive value from the fuzzy information represented by an electrical signal distribution provided as output from fuzzy controllers or fuzzy computers. The circuits which convert fuzzy information to definitive values are called defuzzifiers, an example of which is a center of gravity determination circuit.

A center of gravity determination circuit typically comprises multiplication circuits, addition circuits and division circuits. The hardware for such multiplication circuits and division circuits is complex and not readily adjustable, while they are also limited in dynamic range.

OBJECT AND SUMMARY OF THE INVENTION

An object of this invention is to provide a hardware system suited to the processing of fuzzy information, and more particularly, a system with a simple structure known as a fuzzy processor.

Another object of this invention is to realize in an extremely simple structure a MAX circuit which is particularly useful in fuzzy inference calculating devices or fuzzy processing devices known as fuzzy controllers, fuzzy computers or fuzzy processors.

The fuzzy processor of this invention is characterized by being provided with at least one membership function circuit which provides output of signals which represent membership functions in response to input signals, and a plurality of switches connected to its output side in parallel to each other, and also being provided with a plurality of implication circuits, one for each implication, and weighting circuits which apply weighting to each of the switches of the implication circuits.

By means of which, a simple fuzzy processor may be realized with a structure in which the antecedent section of the implications is represented by fuzzy values, while the consequent section is represented by singleton (non-fuzzy) values. A plurality of switches connected in parallel are provided to connect the fuzzy signals of the antecedent section to the singleton signals of the consequent section, so that any switch may be selectively turned on. The singleton signal is realized by the weighting of the selected switches.

The fuzzy processor of this invention is characterized by being provided with a plurality of implication circuits provided for each implication, being provided with at least one membership function circuit which, in response to input signals, provides output of signals which represent membership functions, and a variable resistance circuit connected to the output side for providing weighting, and addition circuits which add the output signals of the implication circuits.

By means of which, a simple fuzzy processor may be realized with a structure in which the antecedent section of the implications is represented by fuzzy values, while the consequent section is represented by singleton values. Moreover, the singleton weighting can be adjusted as desired using variable resistance.

The composite device of the MAX circuit block of this invention comprises a plurality of fuzzy inference circuits which carry out the specified fuzzy inference for each implication, a MAX circuit which carries out a MAX operation on the output signals from the a plurality of fuzzy inference circuits, and a back end circuit which processes or outputs the results of the MAX operation. The various fuzzy inference circuits are each provided on a single type 1 board and the back end circuits are provided on a type 2 board. A MAX circuit comprises transistors provided on each type 1 board, on which the bases of these transistors are provided with the output of fuzzy inference circuits, and the emitters of which become the output terminals for the type 1 boards, along with current sources provided on the type 2 boards and connected to the input terminals of these type 2 boards, and a wired OR comprising connections by means of a connector from the output terminals of the type 1 boards to the respective input terminals of the type 2 boards.

Another object of this invention is to provide hardware systems suited for the processing of fuzzy information, and more particularly grade-controllable membership function circuits and grade-controllable membership function generator circuits useful in the systems referred to as fuzzy controllers.

A still further object of this invention is to provide fuzzy computers and fuzzy controllers which are built using said grade-controllable membership function circuits and gradecontrollable membership function generator circuits.

A grade-controllable membership function circuit of the invention is characterized by being provided with a membership function circuit which, in response to an input signal, provides as output a level signal which represents a previously-determined membership function, the peak level section of which is determined by a label signal, and a grade-control circuit which controls the level of the output signal from this membership function circuit in response to a grade-control signal input.

By means of the invention, the grade of the membership function provided as output from the membership function circuit can be varied in response to a grade-control signal.

A grade-controllable membership function generator circuit of the invention is characterized by being provided with a signal distribution generation circuit which generates a signal level distribution which represents a membership function by means of signal levels distributed over a plurality of signal lines, and a switch array which converts said signal level distribution into specified positions on a plurality of output signal lines in response to a given level signal, while said signal distribution generation circuits are provided with circuit sections which generate a signal of a plurality of levels by dividing the level of the given control signal.

By means of this invention, the grade of the membership function generated by the membership function generation circuit can be varied in response to a control signal.

Furthermore, according to the invention, since the grade of the membership function can be adjusted manually or in response to the results of learning, the membership function can be weighted depending on the importance of the implication rule.

A sweep-type fuzzy controller of the invention is characterized by comprising an initial-rank circuit which, in response to one or more given inputs, provides as output a signal which represents the results of specified operations on a signal which represents a membership function value, or a signal which represents a plurality of membership function values, a sweep signal generator circuit which generates a sweep signal of a fixed period, and a grade-controllable membership function circuit which, synchronized with the input sweep signal, provides as output a signal which represents a specified membership function, and being provided with said output signal from said initial-rank circuit as a control signal, controls the level of the signal representing the membership function in response to this control signal, thus carrying out fuzzy inferences based on algebraic product rules.

By means of the invention, a fuzzy controller which carries out inferences based on algebraic product rules can be realized with an extremely simple structure.

A parallel-type fuzzy controller of the invention is characterized by comprising an initial-rank circuit which, in response to one or more inputs, provides as output a signal which represents the results of specified operations on a signal which represents a membership function value, or a signal which represents a plurality of membership function values, and a grade-controllable membership function generator circuit which generates and provides output signal levels which represent a membership function distributed over a plurality of signal lines, and being provided with said output signal from said initialrank circuit as a control signal, controls the level of the signal representing the membership function in response to this control signal, thus carrying out fuzzy inferences based on algebraic product rules.

By means of this invention, a fuzzy controller which carries out inference operations according to algebraic product rules can be realized with an extremely simple structure.

A parallel-type fuzzy controller of the invention is characterized by being provided with at least one grade-controllable membership function circuit which, in response to a given input signal, provides as output a signal representing a membership function, and controls the level of the output signal representing the membership function in response to a given control signal, a grade-controllable membership function generator circuit which generates and provides as output signal levels which represent a membership function distributed over a plurality of signal lines, and being provided with the same control signal as said grade-controllable membership function circuit, controls the level of the signal level distribution to be generated in response to this control signal, and a fuzzy inference synthesis circuit which executes specified fuzzy inference operations on the output signals from said gradecontrollable membership function circuits and grade-controllable membership function generator circuit.

By means of this invention, a fuzzy controller which carries out inference operations while controlling the grade of the antecedent and consequent sections, and is particularly useful in fuzzy systems which have learning functions can be realized.

A parallel-type fuzzy computer of the invention is characterized by being provided with at least three gradecontrollable membership function generator circuits each which generates and provides as output signal levels which represent different membership functions distributed over a plurality of signal lines, and being provided with the same control signal, controls the level of signal level distribution in response to this control signal, and a fuzzy inference engine which executes specified fuzzy inference operations on the output signals from said at least three grade-controllable membership function generator circuits.

By means of this invention, a fuzzy computer which is able to change or adjust the grade of membership functions in the antecedent and consequent sections, and is particularly useful in fuzzy systems which have learning functions can be realized.

A sweep-type fuzzy controller of the invention is characterized by being provided with at least one of a type 1 grade-controllable membership function circuit which, in response to a given input signal, provides as output a signal representing a membership function, and each controls the level of its output signal representing the membership function in response to a given control signal, a sweep signal generator circuit which generates a sweep signal of a fixed period, and a type 2 gradecontrollable membership function circuit which, synchronized with the sweep signal, provides as output a signal representing a membership function on the time axis, and being provided the same control signal given to said type 1 grade-controllable membership function circuit, controls the level of its output signal in response to this control signal, and a fuzzy inference synthesis circuit which executes specified fuzzy inference operations on the output signals from said type 1 grade-controllable membership function circuits and type 2 grade-controllable membership function circuit.

By means of this invention, a fuzzy controller is able to change the grade of membership functions in the antecedent and consequent sections, and would be suited for fuzzy systems which have learning functions.

A sweep-type fuzzy computer of the invention is characterized by being provided with a sweep signal generator circuit which generates a sweep signal of a fixed period, at least three grade-controllable membership function circuits, each of which, synchronized with the sweep signal, provides as output a signal representing a different membership function on the time axis, and being provided the same control signal, controls the level of its output signal in response to this control signal, and a fuzzy inference synthesis circuit which executes specified fuzzy inference operations on the output signals from said gradecontrollable membership function circuits.

By means of this invention, a fuzzy computer can be realized in such a way that the grade of membership functions in the antecedent and consequent sections can be changed. This fuzzy computer is suited to the creation of fuzzy systems which have learning functions.

A still further object of this invention is to provide a circuit which can determine the center of gravity of fuzzy information using neither multiplication circuits nor division circuits.

A center of gravity determination circuit of the invention is characterized by providing a type 1 weighted addition circuit which multiplies each electrical signal representing fuzzy information distributed over a plurality of lines by a value which depends on the number of that line and then adds the results, a type 2 simple addition circuit which adds said electrical signals distributed over a plurality of lines, and a control means which controls the circuit sections related to said electrical signals so that the output signal of the type 2 simple addition circuit represents a value which is equivalent to 1.

By means of this invention, since the related electrical circuits are controlled so that the output signal of the type 2 simple addition circuit represents a value which is equivalent to 1, the output of the type 1 weighted addition circuit, which multiplies each electrical signal in the distribution over a plurality of lines by a value which depends on the number of that line and adds the results, represents the center of gravity. Since the type 1 addition circuit's output signal which serves as the divisor (denominator) in the center-of-gravity operation is always 1, no division circuits are required. Since multiplication and addition are carried out by the type 1 weighted addition circuit, no addittioncircuits in the normal sense are required. In this manner, the center of gravity of fuzzy information can be determined with a simple structure to obtain a signal which represents this determined center of gravity.

A center of gravity determination circuit of the invention is further characterized by executing specified fuzzy inferences based on output signals from membership circuits (includes membership function circuits and membership function generator circuits) which provide output signals representing membership functions, and is suitable as a fuzzy processing device (includes a fuzzy computer or fuzzy controller) which provides output signals representing the inference results distributed over a plurality of lines, and as such it is provided, for each of the output signals representing the inference results distributed over a plurality of lines, with a type 1 weighted addition circuit which multiplies each electrical signal representing the inference results distributed over a plurality of lines by a value which depends on the number of that line and adds the results, a type 2 simple addition circuit which adds said signals representing the inference results distributed over a plurality of lines, and a grade control means which controls the level of the output signals from said membership circuits so that the output signal of the type 2 simple addition circuit represents a value which is equivalent to 1.

In the invention, since the grade of the membership function in the membership circuits within the fuzzy processing device is adjusted so that the output signal of the type 2 simple addition circuit represents a value which is equivalent to 1, determination of the center of gravity of fuzzy inference results may be accomplished without multiplication or division circuits.

BRIEF DESCRIPTION OF THE DRAWINGS

FIG. 1A shows the typical form, FIG. 1B shows triangular and truncated triangle-shaped membership functions while FIG. 1C shows the Z and S functions.

FIG. 10 illustrates the concept of an expanded parallel-type fuzzy inference engine, while

FIG. 14 is a block diagram illustrating the structure of a parallel-type fuzzy controller.

FIG. 15/is a block diagram illustrating the structure of a sweep-type fuzzy controller.

FIG. 16 is a block diagram illustrating the structure of another example of a sweep-type fuzzy controller.

FIG. 20 is a circuit diagram of a weighted addition circuit.

FIG. 21 is a circuit diagram of a simple addition circuit.

FIG. 22 is a graph showing a membership function and its labels and singleton forms.

FIG. 23 is a circuit diagram of a MIN circuit.

FIG. 24 is a circuit diagram of a MAX circuit.

FIG. 34 is a circuit diagram illustrating a gradecontrollable membership function generator circuit realized through the use of a switch matrix, while FIG. 35 illustrates the actual structure of the symbols used in FIG. 34.

FIG. 37 illustrates the actual structure of the symbols used in FIG. 36.

FIGS. 43 through 4 are circuit diagrams illustrating examples of variations on the fuzzy processor.

FIG. 50 is a block diagram of a center of gravity determination circuit illustrating Preferred Embodiment 1.

Figure 1A:
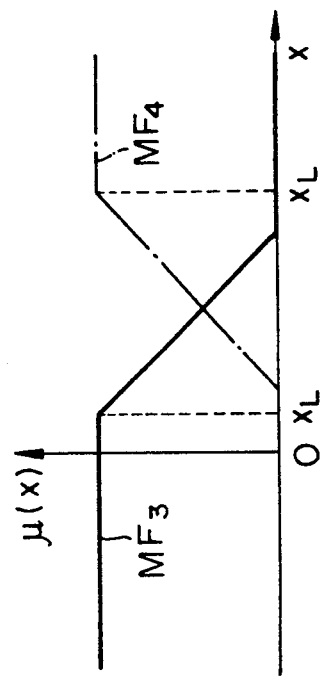
FIGS. 1A, 1B and 1C are graphs illustrating membership functions where

DESCRIPTION OF THE PREFERRED EMBODIMENTS (1) Concept of the Fuzzy Inference, Fuzzy Computers and Fuzzy Controllers Human rules of experience, simplified to the utmost degree, can be expressed by the proposition If x is A, then y is B. where "If x is A," is called the antecedent and "then y is B." is called the consequent. If A and B are in the form of vague linguistic information such as "a tall person," "an old person" or "a small positive number," they can be characterized as a membership function. Specifically, A and B are fuzzy sets (in the following explanation of specific circuits, A and B, etc., will indicate voltage signals which represent membership functions).

The above proposition can be represented simply by the notation $$x = A \rightarrow y = B.$$

Humans often make inferences which include fuzzy representations of the antecedent and consequent. This type of inference cannot be satisfactorily executed using classical Boolean logic. Consider the following inference format.

Implication: $x = A \rightarrow y = B$
Premise: $x = A'$
Conclusion: $y = B'$

This inference format, specifically when implications are present, in which the conclusion is inferred from the given premise is called a generalized modus ponens.

Many implication rules may also be present, as in the following:

Implication 1: $x = A_1 \rightarrow y = B_1$ else or and
Implication 2: $x = A_2 \rightarrow y = B_2$ else or and
.
.
.
Implication r: $x = A_r \rightarrow y = B_r$
Premise: $x = A'$
Conclusion: $y = B'$ where the many implications are linked by a logical "else" or a logical "and."

Now consider the concept of the "fuzzy relation from A to B," as represented by $R_{AB}$ (hereafter abbreviated merely as R).

Generally, when $$A = \{a_1, a_2, \ldots, a_i, \ldots, a_m\} \text{ and}$$

$$B = \{b_1, b_2, \ldots, b_j, \ldots, b_n\}$$

the fuzzy relation from A to B is represented by $$R = \begin{bmatrix} r_{11} & r_{12} & \cdots & r_{1j} & \cdots & r_{1n} \\ r_{21} & & & & & \cdot \\ \cdot & & & & & \cdot \\ r_{i1} & & & r_{ij} & & \cdot \\ \cdot & & & & & \cdot \\ r_{m1} & \cdots & \cdots & \cdots & \cdots & r_{mn} \end{bmatrix}$$

where $$r_{ij} = a_i \text{ⓡ} b_j.$$

The ⓡ operator which represents the fuzzy relation will be described hereafter.

Considering A and B to be membership functions, the above expression is equivalent to sampling a membership function and describing it with vectors.

When one premise (x = A') is given for each implication rule (x = A → y = B), from which a conclusion (y = B') is inferred, the "compositional rule of inference" can is represented by the following using the fuzzy relationship R.

$$\begin{aligned} B' &= A' * R \\ &= [a_1', a_2', \ldots, a_i', \ldots, a_m'] \\ &\quad * \begin{bmatrix} r_{11} & \cdots & \cdots & \cdots & r_{1n} \\ \cdot & & & & \cdot \\ \cdot & & r_{ij} & & \cdot \\ \cdot & & & & \cdot \\ r_{m1} & \cdots & \cdots & \cdots & r_{mn} \end{bmatrix} \\ &= [b_1', b_2', \ldots, b_j', \ldots, b_n'] \\ b_j' &= \text{ⓑ} (r_{ij} \text{Ⓐ} a_i') \quad (1) \\ &= \text{ⓑ} \{(a_i \text{ⓡ} b_j) \text{Ⓐ} a_i'\} \quad (2) \end{aligned}$$

Various operations have been proposed to represent the fuzzy relationship ⓡ. For details, refer to Masaharu Mizumoto and Hans-Jurgen Zimmermann, "Comparison of Fuzzy Reasoning Methods," Fuzzy Sets and Systems Vol.8, No.3, pp.253-283 (1982).

Representative fuzzy relations already proposed include the following:

| | |
|---|---|
| $r_{ij} = a_i \wedge b_j$ | MIN operation rule |
| $r_{ij} = (a_i \wedge b_j) \vee (1 - a_i)$ | MIN rule |
| $r_{ij} = 1 \wedge (1 - a_i \wedge b_j)$ | arithmetical rule |

The MIN operation rule above is the most well known, and its validity has been proved in industrial applications, so in the specific examples of circuits described hereafter, the MIN operation rule is employed. However, it need not be said that many other operation rules can be employed.

Various operations have also been proposed for the * operations (specifically the ⓑ and Ⓐ operations) in the above expression. For example, MIN/MAX operations, algebraic product/MAX operations and others are used. In the specific examples of circuits described hereafter, the most commonly used MIN/MAX operations will be used as the * operations. That is to say, the MAX operation will be employed as the ⓑ operation while the MIN operation will be employed as the Ⓐ operation.

Therefore, using MIN/MAX operations as the * operations and the MIN operation rule as the fuzzy relationship, the conclusion $b_j'$ of the compositional rule of inference is represented as follows:

$$b_j' = \underset{i}{v}\{(a_i \wedge b_j) \wedge a_i'\} \quad (3\text{-}1)$$

$$= \underset{i}{v}\{b_j \wedge (a_i \wedge a_i')\}$$

$$= b_j \wedge \underset{i}{v}\{(a_i \wedge a_i')\} \quad (3\text{-}2)$$

From the above expression, it is obvious that a fuzzy inference engine or fuzzy inference synthesis circuit would be comprised mainly of MIN circuits or MAX circuits.

Before describing the configuration of fuzzy computers and fuzzy controllers, here is a brief explanation of membership functions.

Membership functions are generally represented by a curved line as in the example shown in FIG. 1A. Yet whether it is represented by a curved line or not is not essential to the membership function. A more important characteristic of a membership function is that it may assume a continuous range of values from 0 to 1.

Figure 1B:
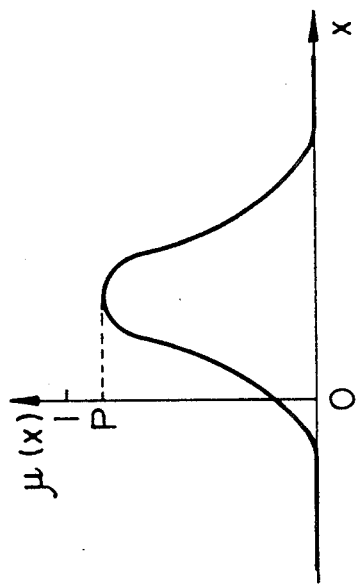

On the other hand, from the standpoint of circuit design, membership functions are simpler to handle if represented by a polygonal line made up of straight line segments as shown by $MF_1$ and $MF_2$ in FIG. 1B, so that the membership function can be characterized with a small number of parameters, simplifying design. Yet the membership function does not lose the above characteristics even when represented by a polygonal line.

Consider the triangular membership function $MF_1$ represented by the solid line on FIG. 1B, and the truncated triangle-shaped membership function MFz represented by the dashed line as the basic shapes. Assuming that triangular membership function $MF_1$ is a function $\mu(x)$ = peak value P (the peak value is not necessarily equal to 1) the function can be characterized by the value $x_L$ (called the label) of the variable x and the slope of the curve.

Note that the variable x of the membership function $\mu(x)$ and the variable y of the function $\mu(y)$ which will appear later have no particular relationship to the same symbols x and y used in the above inference format. This notation shall be followed in this specification.

Figure 1C:
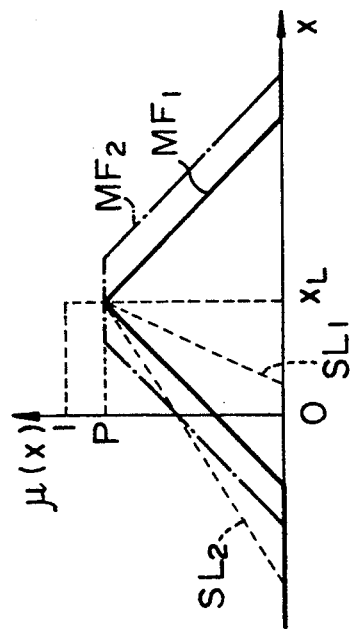

As illustrated in FIG. 1C, other membership functions include the function indicated by $MF_3$, a function $\mu(x)$ which assumes the value 1 when the variable x is small, and at a certain value $x_L$ of the variable x begin to drop off to 0 at a constant slope (this is called the Z function) and the function $MF_4$ (called the S function) which varies in the opposite manner as the Z function. In addition, many other types of membership functions are conceivable.

Figure 2:
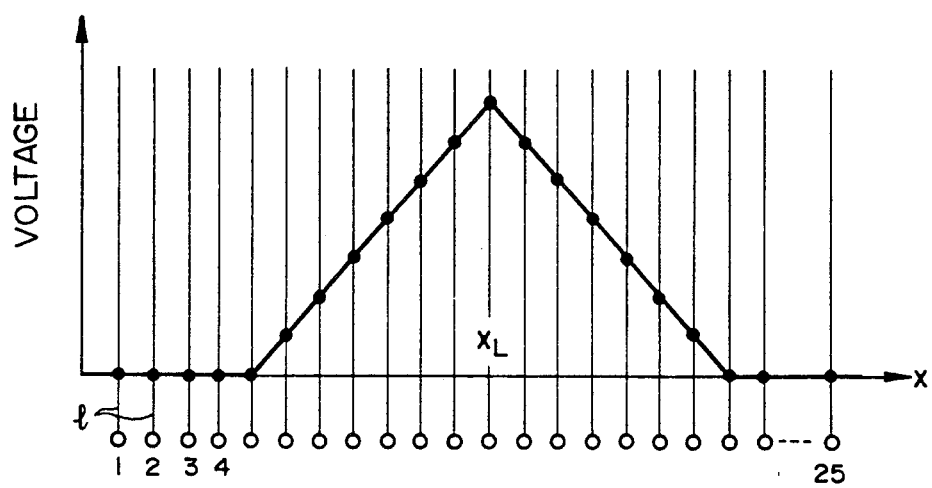
FIG. 2 illustrates a membership function represented by a distribution of voltages on a plurality of signal lines.

The membership functions described above are given concrete expression in various forms. One of these is illustrated in FIG. 2, in which a membership function is represented by an electrical signal (which may be voltage or current but only voltage signals are considered here) distributed among a plurality (25 for example) of signal lines 1. The variable of the membership function $\mu(x)$ assumes discrete values, and these variables are allocated to the various signal lines. The signal lines corresponding to the allocated variables are assigned numbers (from 1–25 in FIG. 2). The plurality of signal lines comprises a type of bus. The label $x_L$ is represented by the number of the signal line in which the peak voltage appears.

Another form of expression is achieved by representing the variable x of a membership function $\mu(x)$ on the time axis. Specifically, the variable becomes time t (for convenience in the explanation, this time variable t is differentiated from the overall time T). A sweep signal is required to generate this type of membership function $\mu(x)$. The sweep signal can take on various waveforms (e.g., a sawtooth waveform, triangular wave, sine wave, or a full wave rectification of a sine wave), but this description here will use the sawtooth waveform shown in FIG. 3 as an example.

Figure 3:
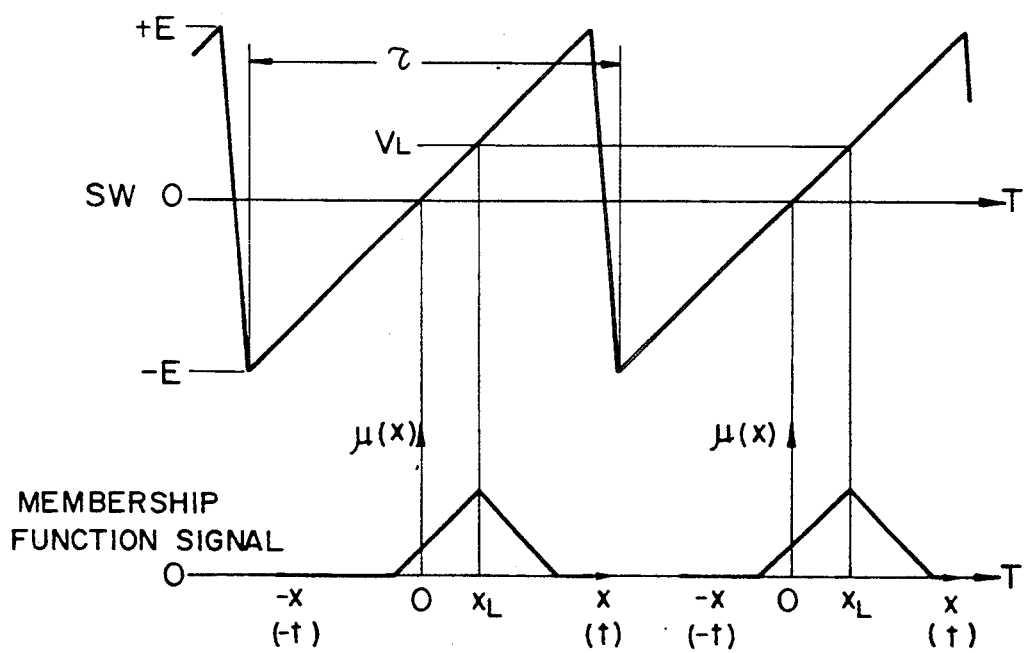
FIG. 3 is a waveform chart illustrating a sawtooth sweep signal and a membership function signal waveform.

In FIG. 3, the sawtooth sweep signal SW varies linearly from $-E$ to $+E$ with a fixed period $\tau$, and then returns to $-E$ after a short period (the flyback time). The point in time at which the sweep signal SW crosses zero corresponds to, for example, $x=0$ of the membership function $\mu(x)$. The label $x_L$ is represented by the voltage $V_L$ of the sweep signal SW at the point in time corresponding to the value $x_L$.

Figure 4:
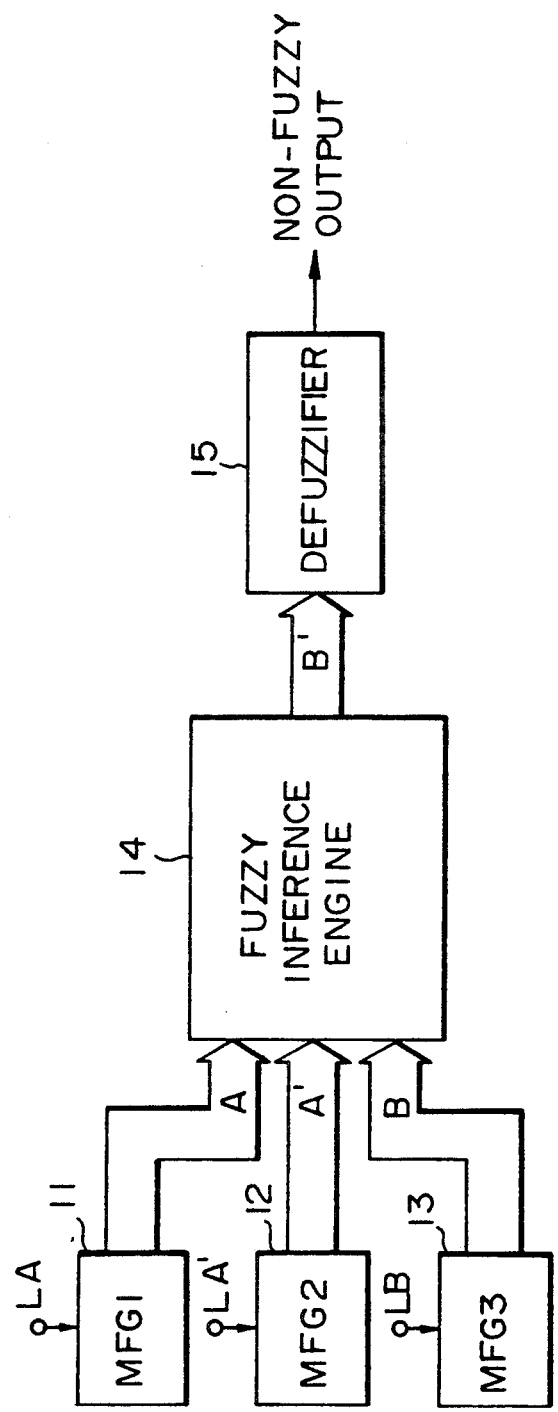
FIG. 4 is a block diagram illustrating the concept of a basic parallel-type fuzzy computer.

FIG. 4 illustrates the concept of a parallel type fuzzy computer which carries out operations using a membership function distributed over the bus lines shown in FIG. 2; this fuzzy computer is suited to the case of when one implication is present. The fuzzy computer comprises three membership function generator circuits 11, 12, and 13 which respectively provide as output the membership functions A, A' and B distributed over the bus lines shown in FIG. 2, and a fuzzy inference engine 14 which is given the output signals from these circuits 11, 12 and 13 and carries out the modus ponens fuzzy inference operations described above (specifically, equations (3-1) and (3-2)) and provides as output the inference result B'. The membership function generator circuits 11, 12, and 13 are given the labels LA, LA' and LB which define the membership functions they should generate as output. If the fuzzy computer is required to produce definitive results (non-fuzzy output), a defuzzifier 15 is connected to the back end of the fuzzy inference engine 14.

Figure 6:
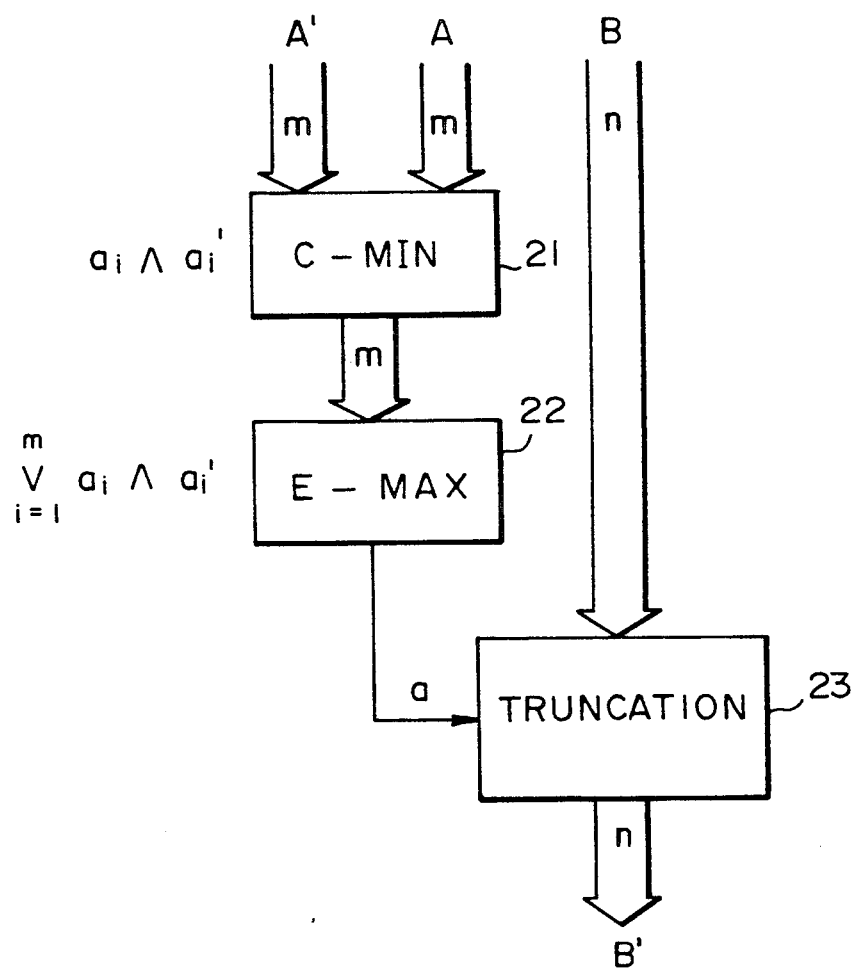
FIG. 6 is a block diagram illustrating the structure of a basic parallel-type fuzzy inference engine.

FIG. 6 illustrates an example of the structure of the fuzzy inference engine 14 described above. This engine carries out the operation represented by equation (3-2). Voltages representing the membership functions A and A' each distributed over m signal lines are given to a C-MIN circuit (correspondence MIN circuit) 21 which carries out the MIN operation $a_j \wedge b_i'$ $(1 \leq i \leq m)$. The m output voltages from C-MIN circuit 21 are input for an E-MAX circuit (ensemble MAX circuit) 22. The output of this E-MAX circuit 22 is represents $$\overset{m}{\underset{i=1}{\vee}} a_i \wedge a_i'.$$

The E-MAX circuit 22 carries out ensemble MAX operations on the m input signals. The output of the E-MAX circuit 22 is provided to a truncation circuit 23 as truncating input a. In addition, the truncation circuit 23 accepts as input a voltage distribution ($b_j$, where $1 \leq j \leq n$) representing the fuzzy membership function B distributed among n signal lines. The truncation circuit 23 is a circuit which makes common all input other than that to the EMAX circuit 22. As a result, the operation of equation (3-2) is ultimately carried out by the truncation circuit 23, so that the conclusion B' of the fuzzy inference can be obtained as a set of analog voltages $b_j'$ distributed over n output lines.

Figure 5:
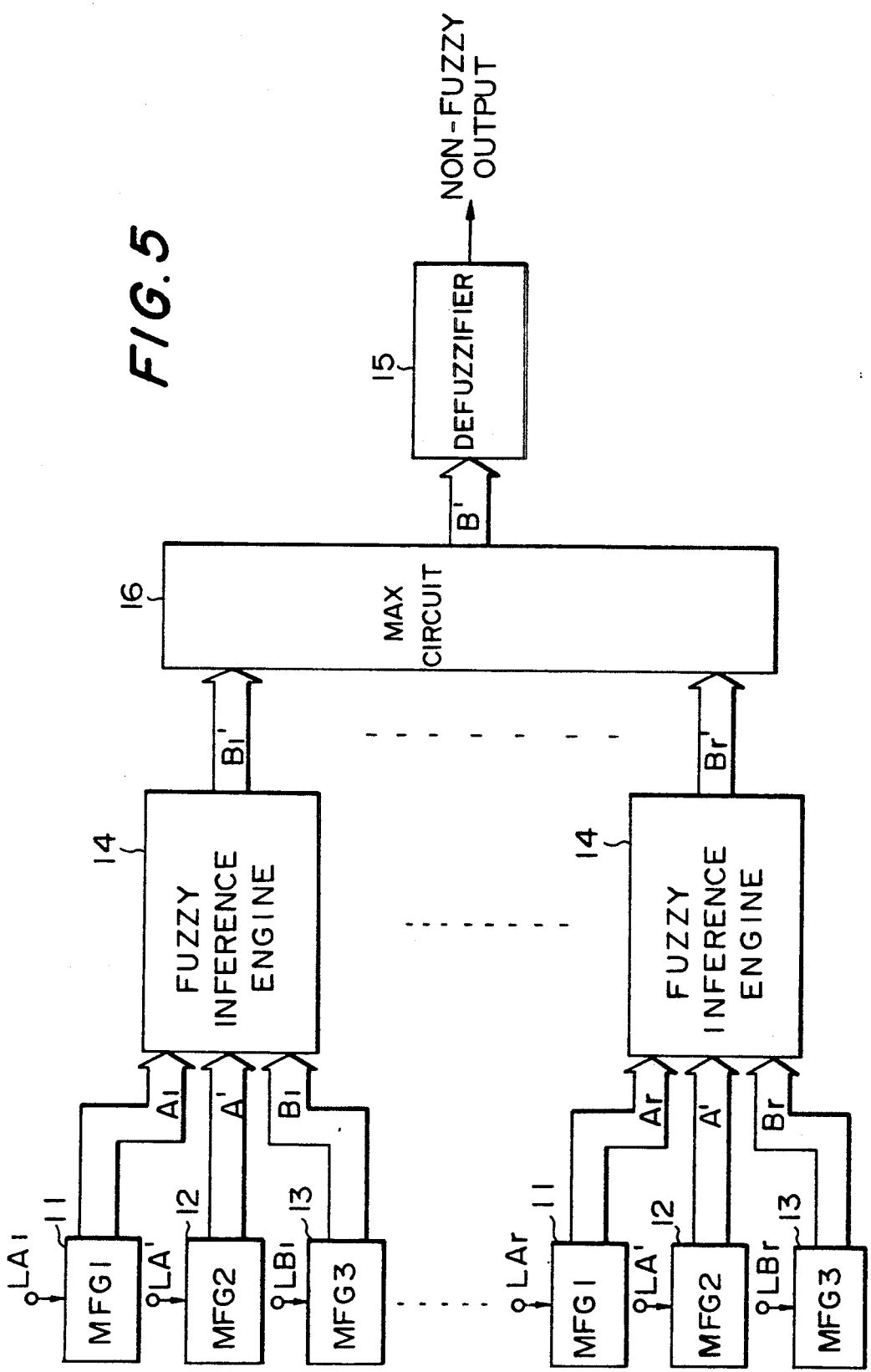
FIG. 5 is a block diagram illustrating the concept of a parallel-type fuzzy computer which includes a plurality of implications.

FIG. 5 illustrates the concept of a parallel type fuzzy computer which is effective when r implications are present. A total of r sets of three membership function generator circuits 11, 12, and 13 are provided. The labels LA and LB given to the membership function generator circuits have subscripts from 1 to r. There is no need to provide each of these sets with a separate membership function generator circuit 12, but rather one circuit 12 can be shared among all of the sets. Linkage between implications (else or and) is realized by a MAX circuit 16. Specifically, the outputs of all of the fuzzy inference engines 14 are provided to the MAX circuit 16, and the ultimate inference result B' is obtained from the MAX circuit 16. Naturally, linkage with an operation other than MAX can also be executed.

Figure 7:
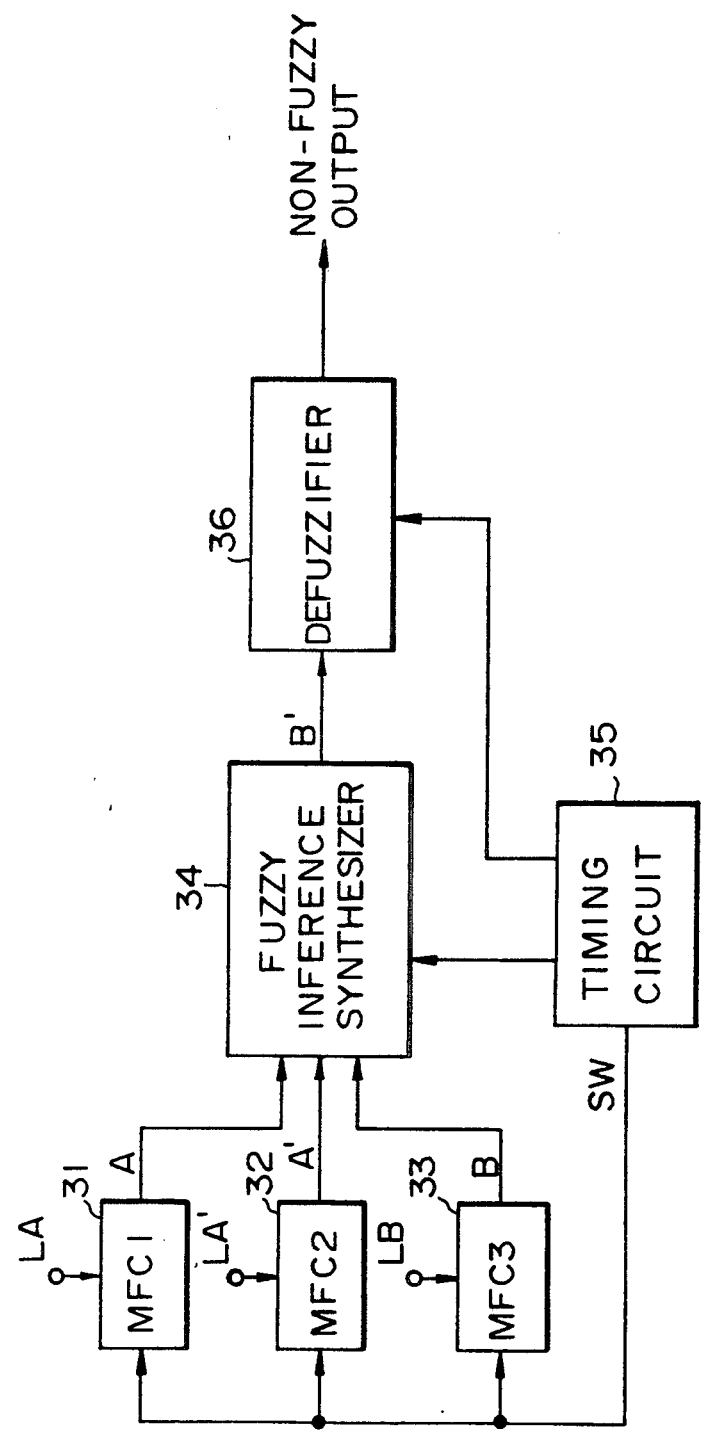
FIG. 7 is a block diagram illustrating the concept of a basic sweep-type fuzzy computer.

FIG. 7 illustrates the concept of a sweep type fuzzy computer which carries out operations using a membership function represented by the time axis shown in FIG. 3; this fuzzy computer is for the case of when one implication is present. This sweep type fuzzy computer comprises three membership function circuits 31, 32, and 33 which respectively provide as output the membership functions A, A' and B represented on the time axis, a fuzzy inference synthesis circuit 34 which is given the output signals from these circuits 31, 32 and 33 and carries out the modus ponens fuzzy inference operations described above and provides as output the inference result B', and a timing circuit 35 which not only provides a sweep signal SW as an input signal to the membership function circuits 31, 32, and 33 but also provides to the fuzzy inference synthesis circuit 34 a timing signal synchronized to this sweep signal. Not only the membership functions A, A' and B, but naturally the inference results B' are also represented as voltage appearing on the time axis. The membership function circuits 31, 32, and 33 are provided with the labels (label voltages) LA, LA' and LB respectively which define the membership functions to be provided as output by each. If the fuzzy computer is required to produce definitive results (non-fuzzy output), a defuzzifier 36 is connected to the back end of the fuzzy inference synthesis circuit 34. A constant (at least constant for one period $\tau$ of the sweep signal) voltage signal is obtained from the defuzzifier 36.

Figure 8:
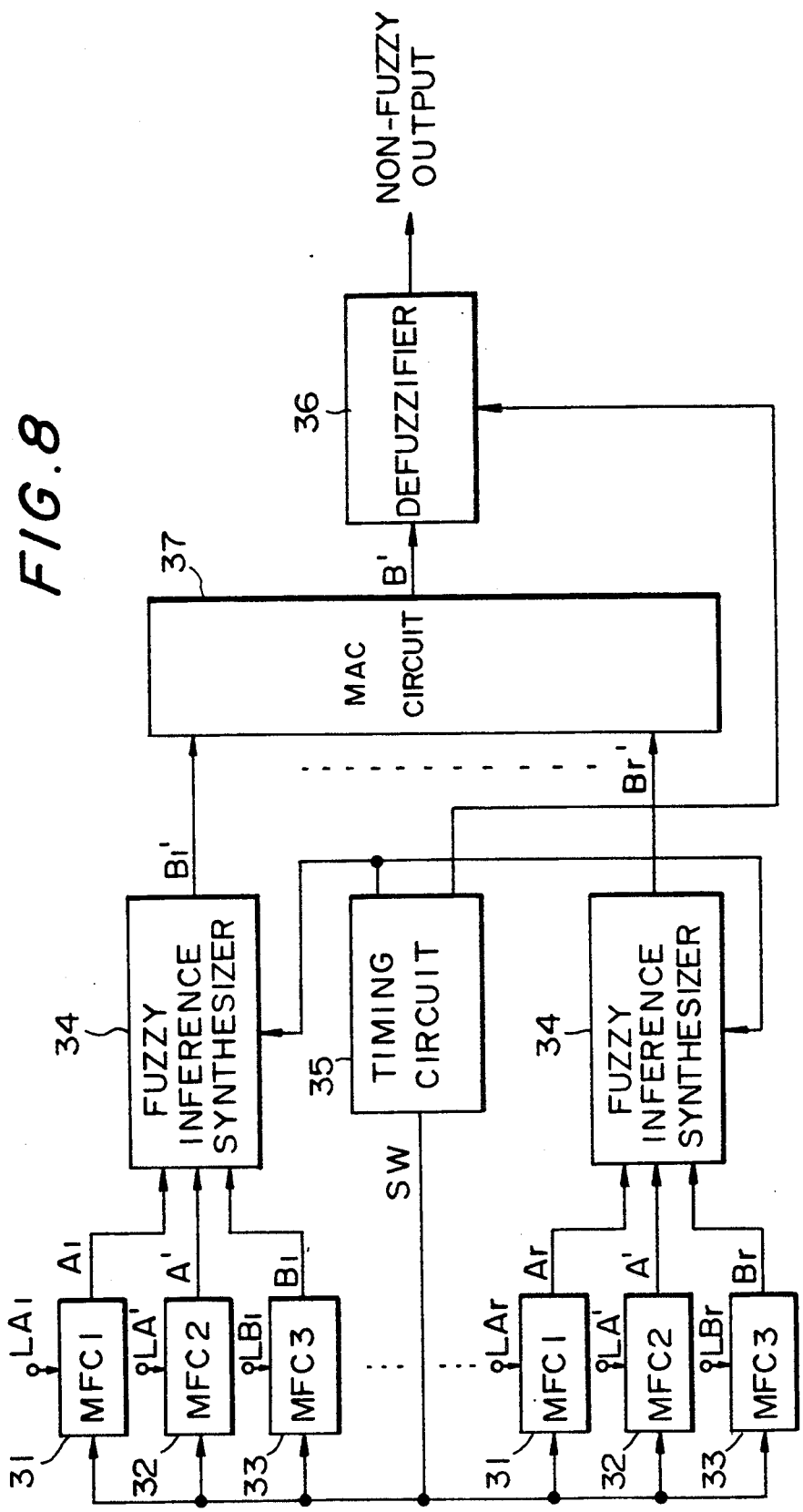
FIG. 8 is a block diagram illustrating the concept of a parallel-type fuzzy computer which is suited to fuzzy inferences using a plurality of implications.

FIG. 8 illustrates the concept of a sweep type fuzzy computer which is effective when r implications are present. Its configuration is readily understood by comparing the parallel type fuzzy computer which is effective when r implications are present shown in FIG. 5 and the basic form of the sweep type fuzzy computer shown in FIG. 7 described above.

In order to assist understanding, as an example of the fuzzy inferences made by the fuzzy inference engine 14 or fuzzy inference synthesis circuit 34 described above, FIG. 9 graphically represents an inference made according to equation (3-2). This assumes a plurality (r) of implications. Furthermore, a triangular membership function is represented. In equation (3-2), the membership functions A, A', B and such are represented using elements $a_i$, $a_i'$, $b_j$ of fuzzy sets, but in FIG. 9, the functions are represented by the functions $\mu(x)$ or $\mu(y)$ (or $\mu(t)$) of the variables x or y (or time t) on the horizontal axis.

Figure 9:
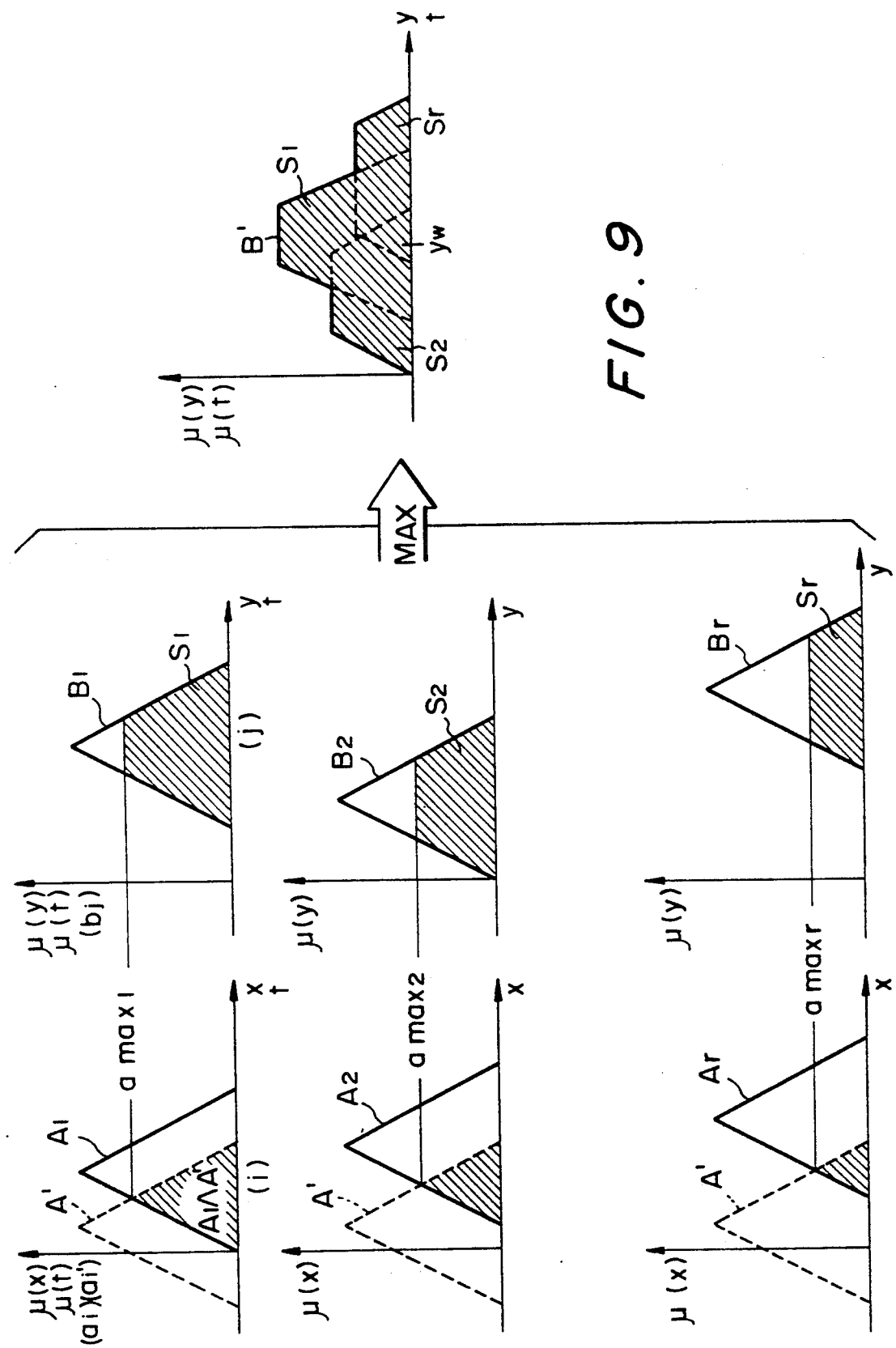
FIG. 9 is an explanatory diagram graphically illustrating the process of making fuzzy inferences.

Referring to the upper row left graph of FIG. 9, the results $A_1 \wedge A'$ of taking the MIN operation of the membership functions $A_1$ and $A'$ are shown as the region indicated with hatching. The MIN operation results' maximum value a maxl (the truncating input a shown on FIG. 6) is found. The upper row middle graph shows the results of a MIN operation on the membership function $B_1$ and the maximum value a maxl found above as the region $S_1$ indicated with hatching. The hatched portion $S_1$ is the results of one inference regarding one implication and would be the output from one fuzzy inference engine 14 or fuzzy inference synthesis circuit 34.

Inferences regarding the other implications are made using the same technique, and these inference results are represented by $S_2$ and $S_r$.

The results B' of taking a MAX operation (with circuit 16 or circuit 37) of the inference results are represented on the right of FIG. 9. As to the technique for defuzzifying the inference results, many have been proposed and one of them is the center of gravity method. According to this method, the center of gravity $y_w$ is found by the expression $$y_w = \int \mu(y) \cdot y \, dy / \tau \mu(y) dy.$$

Specifically, this expression finds the y coordinate (time t) at which the area indicated with hatching is evenly divided in half, to the left and right of the coordinate. The coordinate $y_w$ thus found becomes the output of defuzzifier 15 or 36 as a definitive value.

The fuzzy inference engines or fuzzy inference synthesis circuits described above both make inferences when only one fuzzy proposition is present in the antecedent of the implication, but as shown in the following, there are cases which require inferences which include two fuzzy propositions present in the antecedent of the implication. These are referred to as expanded fuzzy inferences. The antecedent of the implication is linked by a logical and/or. Either "and" or "or" must be selected.

Implication: If x is A and/or y is B, then z is C

| Premise: | x is A' and/or y is B' | |
|---|---|---|
| Conclusion: | | z is C' |

This can be symbolically represented as follows:

| Implication: | x = A and/or y = B → | z = C |
|---|---|---|

-continued

| Premise: | x = A' and/or y = B' | |
|---|---|---|
| Conclusion: | | z = C' |

Figure 10:
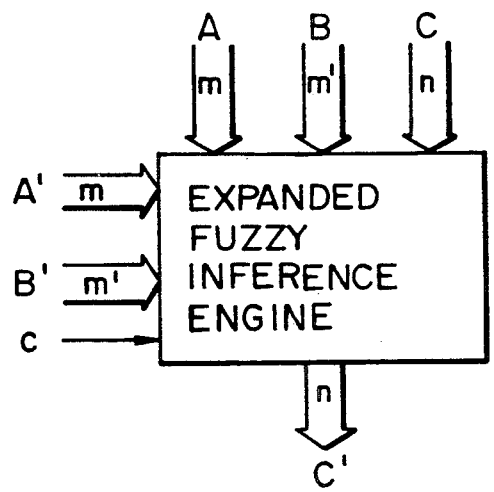

Expanded fuzzy inferences in parallel type fuzzy computers are made using expanded fuzzy inference engines. FIG. 10 illustrates the concept of the expanded fuzzy inference engine. Input is the membership functions A, B, C, A' and B', along with the linkage selection c used to select the and/or linkage. Output is the membership function C' which represents the conclusion. The membership functions A and A' are represented by voltage distributed over m signal lines, B and B' by voltage distributed over m' signal lines, and C by voltage distributed over n signal lines, respectively.

Figure 11:
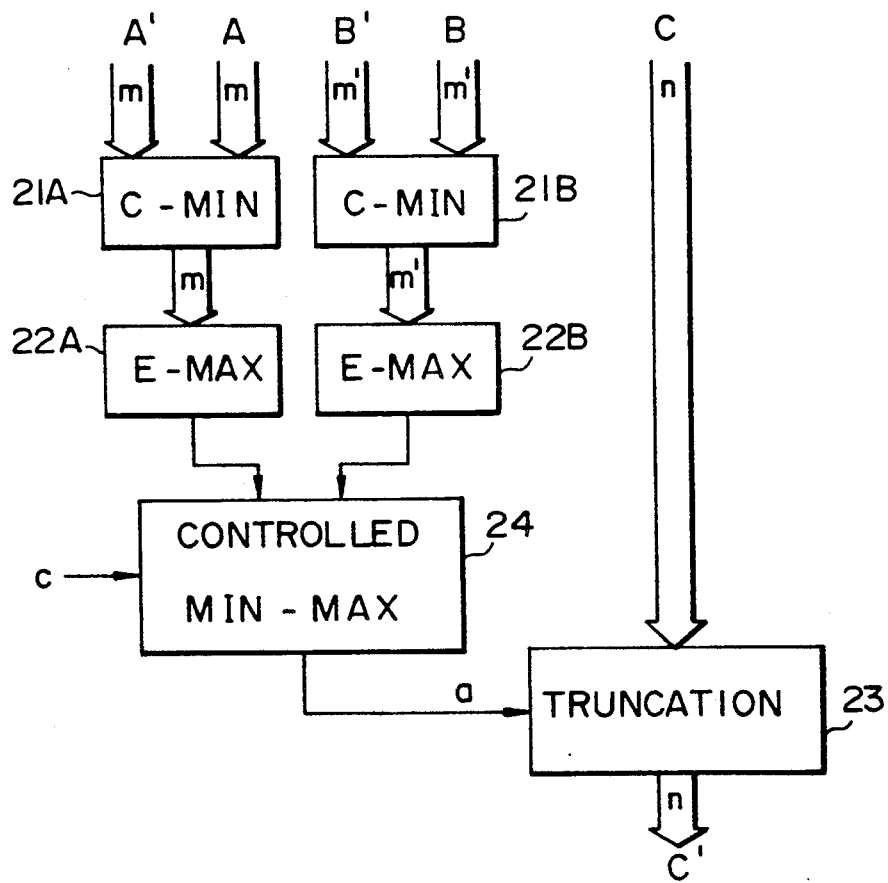
FIG. 11 is a block diagram illustrating its structure.

FIG. 11 illustrates the structure of such an expanded inference engine, obtained by slightly modifying the structure of the basic inference engine illustrated in FIG. 6. A C-MIN operation is carried out (with the C-MIN circuit 21A) on the membership functions A and A', and an E-MAX operation is carried out (with the E-MAX circuit 22A) on the m voltages which represent the results. Similarly, C-MIN and E-MAX operations are carried out (with the C-MIN circuit 21B and E-MAX circuit 22B) on the membership functions B and B'. The linkage "and" is realized in this preferred embodiment by a MIN operation, while the "or" is done with a MAX operation. So that the linkage operation and selection may be done readily, a controlled MIN-MAX circuit 24 is provided. The controlled MIN-MAX circuit 24 can be switched between its MIN operation function and MAX operation function depending on the level (H or L) of the linkage selection input signal c. The results of two E-MAX operations are provided as input to the controlled MIN-MAX circuit 24. The linkage selection input signal c is also provided to the controlled MIN-MAX circuit 24 as control input used to select "and" or "or." The membership function C is provided to the truncation circuit 23, and the output a from the controlled MINMAX circuit 24 is provided as its truncating signal. A voltage distribution of the fuzzy membership function representing the conclusion C' is obtained from the truncation circuit 23.

Next the concept of the fuzzy controller will be described.

In general, the input to a controller is controlled variables from the controlled system and its output is manipulated variables provided to the controlled system to elicit the desired control. Both the controlled variables and manipulated variables are definitive values. A fuzzy controller must accept definitive values as input, make fuzzy inferences and provide definitive values as output. Taking as an example the case in which one fuzzy proposition is present in the antecedent of the implication, the fuzzy computer described above is provided input of fuzzy sets or the membership function A', and provides as output fuzzy sets or a membership function B' (or a definitive value as the case may be).

Figure 12:
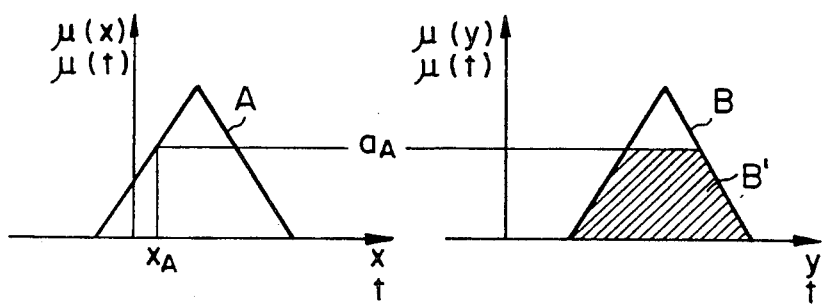
FIGS. 12 and 13 are explanatory diagrams of the process of making inferences in a parallel-type fuzzy controller.
Figure 13:
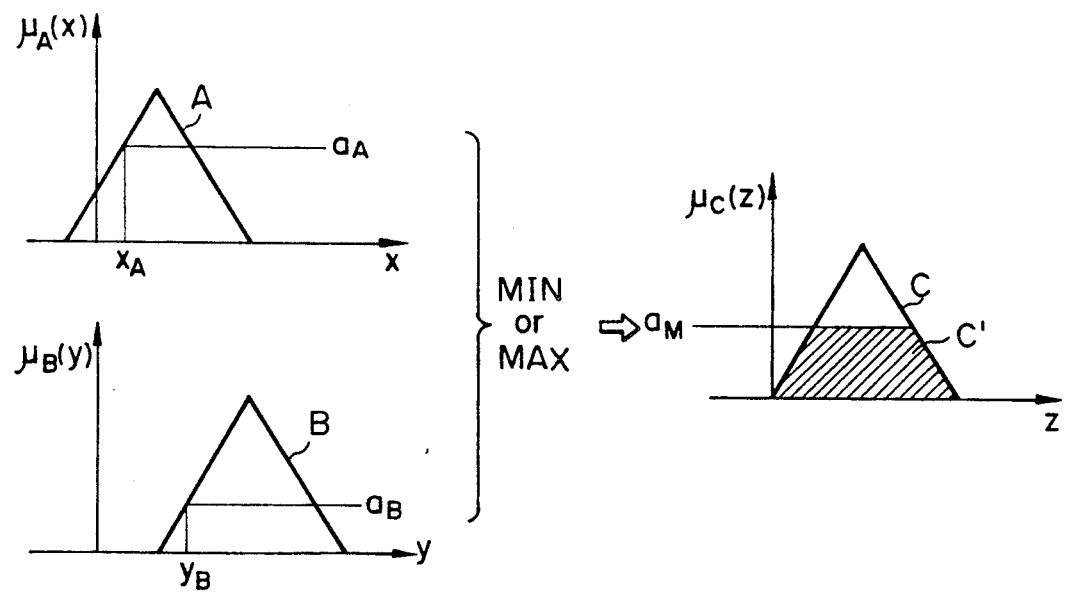

The fuzzy inferences made by a fuzzy controller in the case of one implication (where there is also one fuzzy proposition in the antecedent), in contrast to FIG. 9, are graphically represented as illustrated in FIG. 12. With respect to an implication which includes the membership functions A and B, the results of fuzzy inference when given the definitive value $x_A$ are shown by the hatched region B'. By defuzzifying these inference results, the definitive inference result $B_W'$ is obtained. FIG. 13 illustrates the case of two fuzzy propositions in the antecedent of the implication. When the two membership functions A and B in the antecedent of the implication are each provided with definitive values $x_A$ and $y_B$ respectively, the function values $a_A$ and $a_B$ are operated on with a MIN or MAX (corresponding to the linkages "and" or "or"), and then the result $a_M$ of this operation and the membership function C are operated on with a MIN operation, the results of which become the fuzzy inference results (shown by the hatched region C'). A definitive inference result $C_W'$ is obtained by defuzzifying the fuzzy inference results C'.

FIG. 14 illustrates an example of the configuration of parallel type fuzzy controller which uses fuzzy membership functions distributed over bus lines, being suited to making fuzzy inferences in which two implications are present while each implication has two fuzzy propositions in their antecedents. This fuzzy controller will be described in contrast to FIG. 5 and its fuzzy inference engine shown in FIG. 11.

The implication is represented as follows:

| Implications: | | |
|---|---|---|
| Implication 1 | $x = A_1$ and/or $y = B_1 \rightarrow$ | $z = C_1$ |
| Implication 2 | $x = A_2$ and/or $y = B_2 \rightarrow$ | $z = C_2$ |
| ... | | |
| Implication r | $x = A_r$ and/or $y = B_r \rightarrow$ | $z = C_r$ |
| Premise: | $x = x_A$ and/or $y = y_B$ | |
| Conclusion: | | $z = C'$ |

The fuzzy inference engine 14 is interchangeable with the fuzzy inference synthesis circuit 14a. Since the two inputs are given as the definitive values $x_A$ and $x_B$, the circuits 11, 12 and such which generate the membership function distributed over the bus lines are not necessary, so in their place, two membership function circuits 31a and 31b are provided. A fuzzy inference synthesis circuit 14a, two membership function circuits 31a and 31b and the like are provided for each implication, while the labels LA and LB of the membership function circuits 31a and 31b are given subscripts corresponding to the implication number. Implication 1 will be described below as a representative example.

The membership function circuits 31a and 31b provide as output the membership function values and $\mu_{A1}(x_A)$ and $\mu_{B1}(Y_B)$ corresponding to the input variables $x_A$ and $x_B$. The output of these circuits 31a and 31b is provided to the MIN or MAX circuit 24a. This MIN or MAX circuit 24a corresponds to the controlled MIN-MAX circuit 24, and can be replaced with this circuit 24. The output of circuit 24a becomes the truncating input $a_{M1}$. The output of membership function generator circuit 13 which generates membership function $C_1$ as voltage distribution appearing on the bus line (plurality of signal lines) is provided to the truncation circuit 23 where the MIN operation of it and $a_{M1}$ is taken, and the results of this MIN operation becomes $C_1'$.

For the remaining $(r-1)$ implications, $C_2'$ through $C_r'$ are obtained in similar fashion, and the results of a MAX operation on $C_2'$ through $C_r'$ (done by MAX circuit 16) becomes the fuzzy inference result C' from which the defuzzified result $C_w'$ is obtained.

FIG. 15 illustrates the configuration of a sweep type fuzzy controller for when a plurality of implications are present (but there is one fuzzy proposition in the antecedent of the implication). In contrast to FIG. 8, since input is provided as the definitive value $x_A$, the circuits 32 (MFC2 in the computer) which generate the membership function A' are not needed. Circuit 31 of membership function A1 is provided with $x_A$ as input. The output of this circuit 31 is provided to the MIN circuit 38 to which the output from circuit 33 is also provided. A sweep signal is provided as input to circuit 33. The output $B1'$ of the MIN circuit 38 is provided to the MAX circuit 37 as input. Since each of the above circuits are provided for each of a plurality of implications, all of their MIN circuit 38 outputs $B_1'$ through $B_r'$ are provided as input to the MAX circuit 37. The output B' of the MAX circuit 37 determines the definitive value output from the defuzzifier 36.

In the event that two fuzzy propositions are present in the antecedent of the implication, as shown in FIG. 16, two membership function circuits 31a and 31b are provided and definitive input values $x_A$ and $x_b$ are provided to these circuits 31a and 31b. The output of these circuits 31a and 31b is provided to the MIN or MAX circuit 24a. A MIN operation is carried out on the output of this circuit 24a and the membership function C which is the output of a membership function circuit 33c provided with input of a sweep signal, the results of which, C', becomes output from the MIN circuit 38. Since this inference result C' is a fuzzy function, its definite value is determined by a defuzzifier.

Naturally, in the event that three or more propositions are present in the antecedent of the implication, a fuzzy controller (regardless of whether parallel type or sweep type) to carry out such processing can be constructed as an extension of the above thinking.

(2) Center of Gravity Determination Circuits

Figure 17:
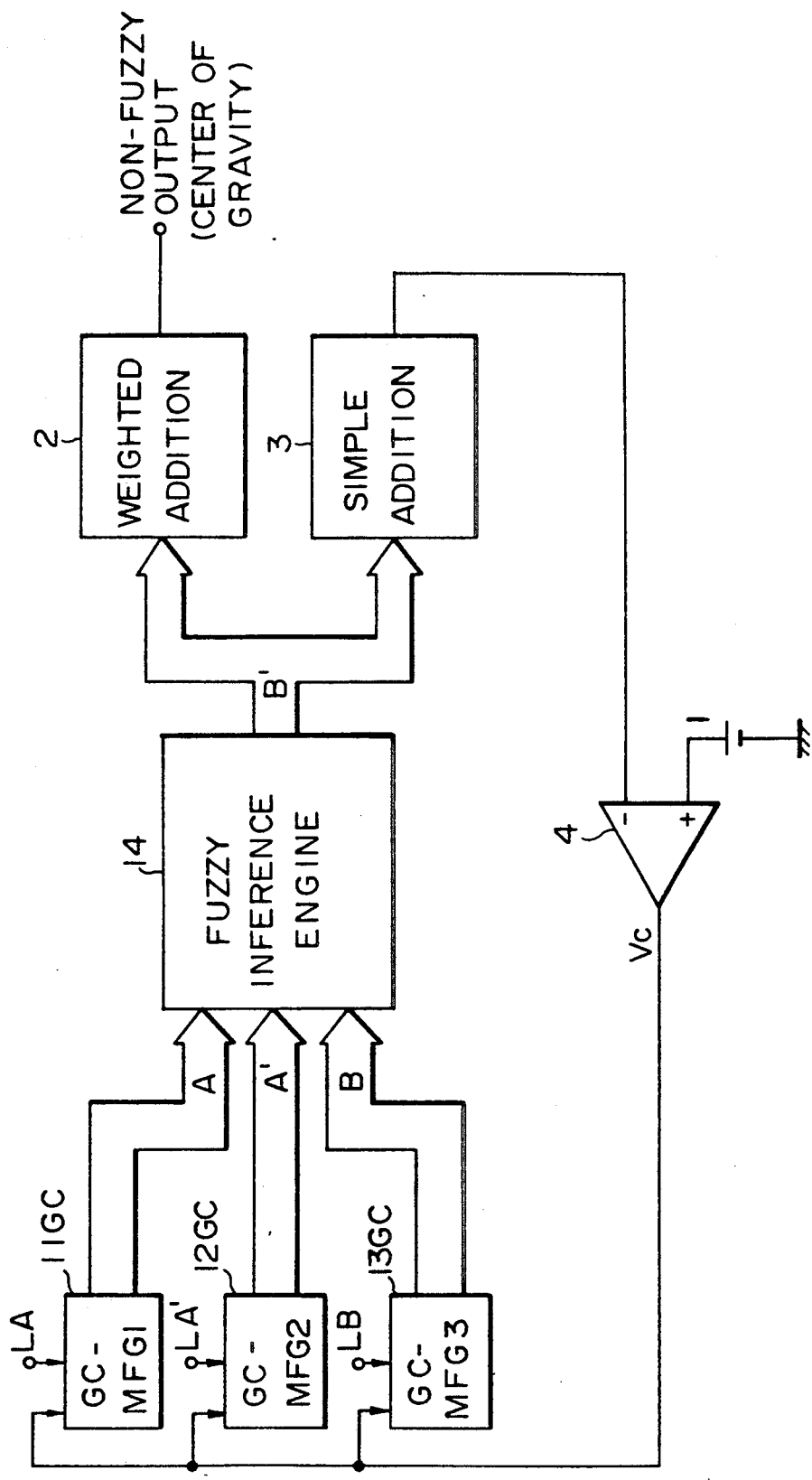
FIG. 17 is a block diagram illustrating an example of a fuzzy computer which employs a center of gravity determination circuit.

FIG. 17 illustrates an example of a center of gravity determination circuit of the invention employed in the fuzzy computer shown in FIG. 4. Instead of the membership function generator circuits 11, 12, and 13, grade-controllable membership function generator circuits (GC-MFG) 11GC, 12GC and 13GC are prepared. In addition, as a concrete example of defuzzifier 5, a center of gravity determination circuit comprising a weighted addition circuit 2 and simple addition circuit 3 is prepared. While its specific configuration will be described later, the GC-MFG changes the voltage (grade) of the voltage distribution it generates to represent a membership function depending on the control voltage $V_c$ provided. This control voltage $V_c$ is generated by the voltage regulator circuit 4. The output of the control voltage $V_c$ from the voltage regulator circuit 4 provided to the GC-MFG circuits 11GC, 12GC and 13GC is varied so that the output of the simple addition circuit 3 is always 1 (specifically, so that the denominator of equation (12) described hereafter, is always 1). Thus a definitive value (defuzzified output) representing the center of gravity of the inference results is obtained from the weighted addition circuit 2.

This thinking can naturally be applied to the fuzzy computers illustrated in FIGS. 5, 10 and 11.

Figure 18:
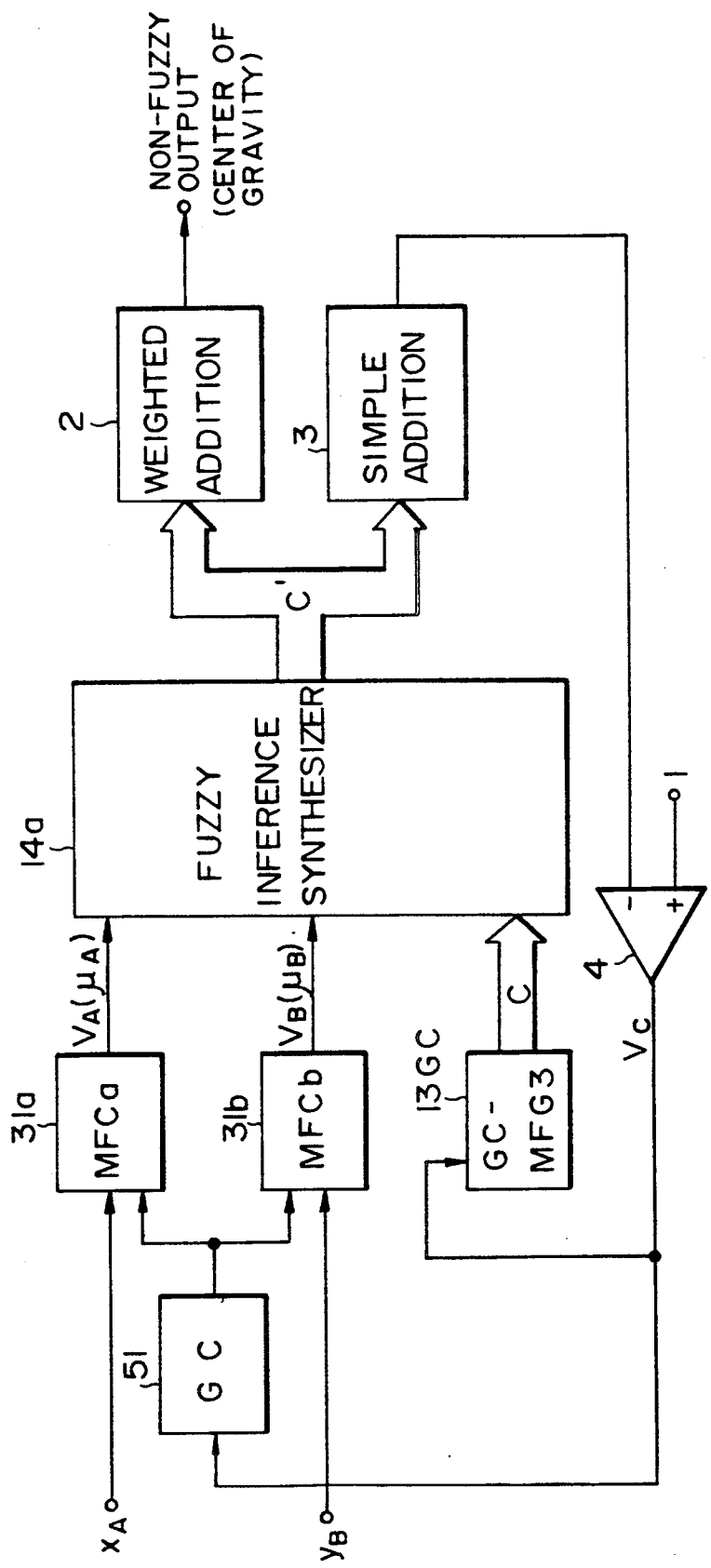
FIG. 18 is a block diagram illustrating an example of a fuzzy controller which employs a center of gravity determination circuit.

FIG. 18 illustrates an example of a center of gravity determination circuit of the invention employed in the fuzzy controller illustrated in FIG. 14. Here the MAX circuit 16 is omitted, and only the circuits which process one implication rule are diagrammed, but naturally this can be applied also to fuzzy controllers which include the MAX circuit 16 for a plurality of implications. A grade control circuit 51 is provided to control the peak value (grade) of the membership function circuits 31a and 31b. The output control voltage $V_c$ of a voltage regulator circuit 4 is provided to this grade control circuit 51 and GCMFG 13GC, thus controlling the grade of the membership functions of the membership function circuits 31a and 31b and the GC-MFG 13GC so that the output of the simple addition circuit 3 is always 1. The combination of the grade control circuit 51 and membership function circuit 31a or 31b is called a gradecontrollable membership function circuit (GC-MFC).

(3) Fuzzy Processors

Figure 19:
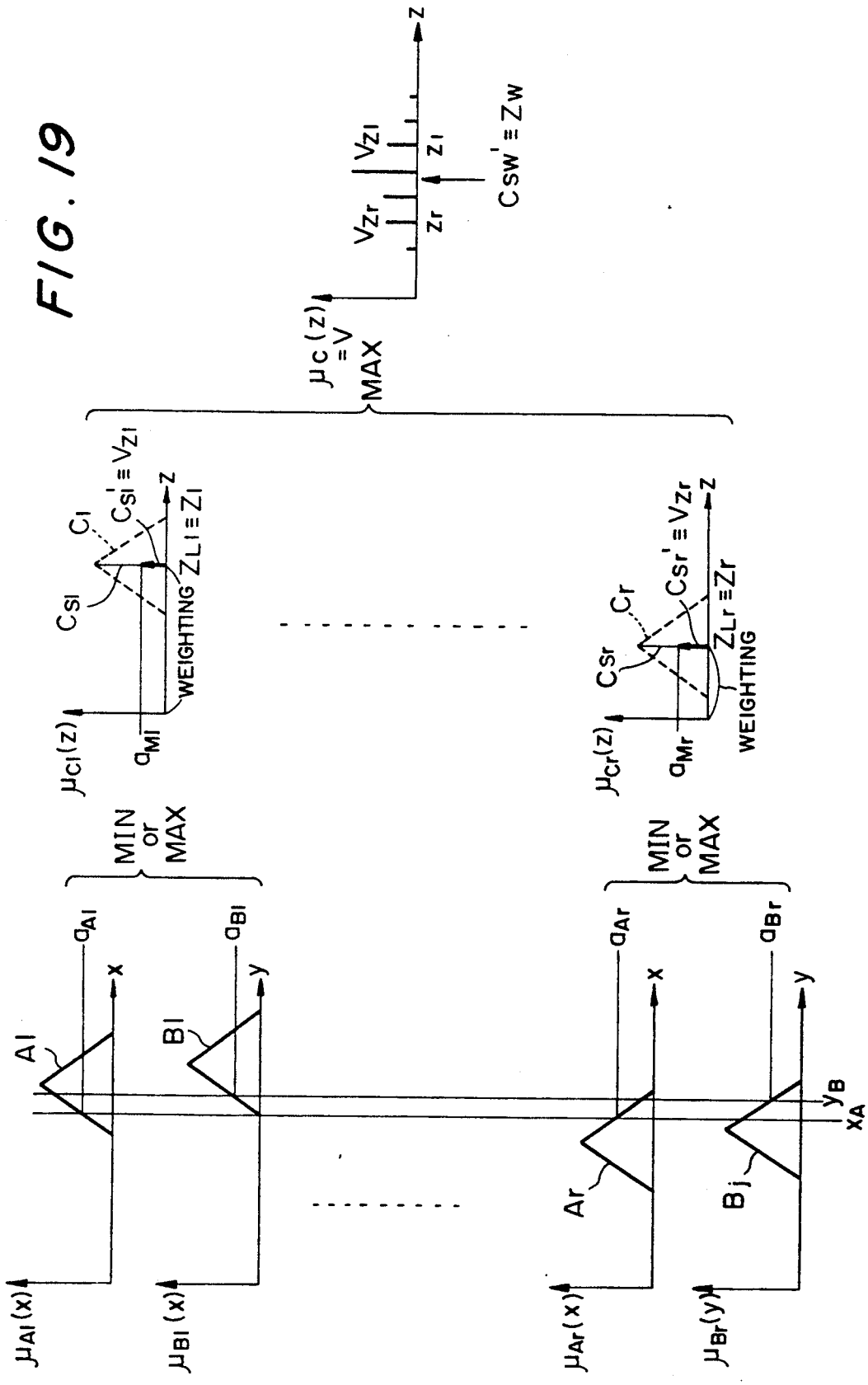
FIG. 19 is a diagram used to explain the process of making inferences when the consequent section of the implication is represented as a singleton.

Consider the case of a plurality (r) of implications with two fuzzy propositions, in reference to FIG. 19. Looking at the first implication, when definitive-valued inputs $x_A$ and $y_B$ are provided to the membership functions A1 and B1 respectively, the function values $a_{A1}$ and $a_{B1}$ are obtained. The result of a MIN (or MAX) operation on these function values is $a_{M1}$. For the other implications, definitive-valued inputs $x_A$ and $y_B$ are provided and the results $a_{Mi}$ ($2 \leq i \leq r$) are obtained.

Each of the membership functions $C_i$ ($1 \leq i \leq r$) in the consequent of the implication can be represented by one function $C_{si}$ ($1 \leq i \leq r$) extended to the peak on its label position $Z_{Li}$ ($1 \leq i \leq r$). This function is known as a singleton and is a nonfuzzy quantity. The result of a MIN operation (equivalent to the truncating described above, but as described hereafter, the MIN operation is unnecessary) on the above MIN operation results and the singletons $C_{si}$ are represented by thick arrows $C_{si}'$ ($1 \leq i \leq r$).

In order to simplify symbols in the following explanation, $Z_{Li}$ will be replaced with $Z_i$ ($1 \leq i \leq r$), and $C_{si}'$ with $V_{zi}$.

When the linkage between a plurality of implications is the MAX operation, the final fuzzy implication results are illustrated in the form of the bar graph on the right-hand side of FIG. 17. Since the implication results are defuzzified in this way, the center of gravity technique described above can be used here. The center of gravity $C_{SW}'$ (set equal to $Z_W$) is found with the following equation.

$$Z_W = \sum_{i=1}^{r} z_i \cdot V_{zi} / \sum_{i=1}^{r} V_{zi} \quad (4)$$

The numerator of equation (4) can be calculated by a weighted addition circuit such as that illustrated in FIG. 20, while the denominator can be calculated by a simple addition circuit such as that illustrated in FIG. 21.

In FIG. 20, the weighted addition circuit comprises an operational amplifier 41, input resistors $R_1, \ldots, R_r$ connected in parallel and a feedback resistor $R_f$. Each of the input resistors $R_1$ through $R_r$ is provided at one end with a voltage $V_{z1}$ through $V_{zr}$. Thus, the output $V_{o1}$ of this weighted addition circuit is found by the following equation:

$$V_{o1} = - \sum_{i=1}^{r} (R_f/R_i) \cdot V_{zi} \quad (5)$$

And by setting $$R_f/R_i = Z_i \ldots (6)$$

equation (5) becomes the denominator of equation (4) (with the sign reversed).

From equation (6), it can be seen that the label of the singleton $C_{si}$ which represents the membership $C_i$ takes shape as the input resistors $R_i$ and the feedback resistor $R_f$.

As shown in FIG. 22, when considering the membership functions or singletons represented by the seven labels from NL (negative large) through PL (positive large), these labels are defined by the input resistors $R_i$ ($1 \leq i \leq r$) and the feedback resistor $R_f$. In FIG. 22, the N in NL, NM, and NS stands for negative, the P in PS, PM and PL for positive, while ZR is zero.

The simple addition circuit in FIG. 21 comprises an operational amplifier 45, input resistors $R_o$ connected in parallel and a feedback resistor $R_o$ with the same value as the input resistors (but not necessarily the same value). Each of the input resistors is provided at one end with a voltage $V_{z1}$ through $V_{zr}$. Thus the output $V_{o2}$ of this simple addition circuit is represented by the following equation:

$$V_{o1} = - \sum_{i=1}^{r} (R_o/R_o) \cdot V_{zi} \quad (7)$$
$$= \sum_{i=1}^{r} V_{zi}$$

This represents the denominator of equation (4) (with the sign reversed).

Like the fuzzy controller, the fuzzy processor graphically illustrated in FIG. 19 is characterized by being provided with definitive inputs $x_A$ and $x_B$ and making fuzzy inferences based on specified implications and then providing a definitive value (center of gravity $Z_w$) as output. This fuzzy processor is also characterized by its fuzzy inferences in which, while fuzzy functions are used in the antecedent of the implications, the consequents are represented by non-fuzzy quantities (singletons). Furthermore, the value of the MIN operation results $a_{mi}$ ($1 \leq i \leq r$) for each implication represents the results of that implication operation so the truncation circuits in the fuzzy computers or fuzzy controllers described above are unnecessary. By carrying out weighted addition (the weighting represents the level of the singleton of the consequent as described above) of the operation results from a plurality of implications, the final output (the center of gravity $Z_w$) is obtained. Naturally, while the simple addition described above is required, the division of equation (4) can be omitted as described hereafter. While examples of specific configurations of fuzzy processors which have these several characteristics will be described later, before that the MIN and MAX circuits which are the basic operation circuits will be described.

FIG. 23 illustrates an example of an n-input, 1-output MIN circuit comprised of bipolar transistors. If the input voltages are $x_1, x_2, \ldots, x_n$ and the output voltage is z, this circuit carries out the operation $$z = \bigwedge_{1}^{n} x_i.$$

This is to say, an output voltage equal to the smallest input voltage is generated.

This MIN circuit is comprises a comparator and a compensator. The comparator comprises n different PNP transistors $Q_{11}, Q_{12}, Q_{13}, \ldots,$ and $Q_{1n}$, each with emitters linked to each other, and a current source $CS_1$ of current $I_1$ which drives these transistors. The input voltages $x_1$ through $x_n$ are provided to the bases of each of the transistors $Q_{11}$, through $Q_{1n}$. The transistor with the lowest input voltage ($V_{min}$) of any of the transistors $Q_{11}$, through $Q_{1n}$ will enter the conducting state and other transistors will enter the cut-off state. Therefore, a voltage of the input voltage $V_{min}$ added to the emitter/base voltage $V_{Eb}$, specifically $$v_{min} + V_{EB} = \bigwedge_i^n x_i + V_{EB}$$

would appear at the emitter. If two input voltages are equal and are lower than the other input voltages, a current of $I_1/2$ would flow in each of these two transistors with the same input voltage, giving the same results. This also holds for cases in which three or more input voltages are equal and lower than the other input voltages.

The compensator compensates for any voltage $V_{EB}$ which should appear as a MIN operation error in the comparator output. This compensator comprises an NPN transistor $Q_1$ and a current source $CS_2$ of current $I_2$ which drives this transistor $Q_1$. The emitter of transistor $Q_1$ is coupled to the output terminal of this MIN circuit. As a result of subtracting the base/emitter voltage $V_{BE}$ of transistor $Q_2$ from the output voltage of the comparator the output voltage z represents $$\bigwedge_1^n x_i.$$

The current of current sources $CS_1$ and $CS_2$ would preferably have the relationship $I_1 = I_2$.

FIG. 24 is an example of a MAX circuit. This MAX circuit also comprises a comparator and compensator. The comparator comprises NPN transistors $Q_{21}$, $Q_{22}$, ..., $Q_{2n}$ which are base-controlled by their input voltages $x_1, x_2, \ldots, x_n$ and have their emitters coupled to each other, and a current source $CS_1$ which drives these transistors. Only the transistor with the highest input voltage ($V_{max}$) of any of the transistors $Q_{21}$, through $Q_{2n}$ will enter the conducting state and a voltage of $V_{max} - V_{EB}$ would appear at the emitter. This error of $-V_{EB}$ is compensated by the compensator comprised of a PNP transistor $Q_2$ and a current source $CS_2$, resulting in an output voltage z of $$V_{max} = \bigvee_1^n x_n$$

being obtained at the output terminal.

Since all of the transistors in the MIN and MAX circuits described above have their emitters coupled to each other, this circuit is named an emitter-coupled fuzzy logic gate (ECFL gate).

The MIN and MAX circuits described above can be considered as a cascade connection of two emitter followers driven by current sources. Therefore, these circuits exhibit extremely high input impedance and extremely low output impedance. This fact demonstrates that these circuits will be highly resistant to external noise and cross-talk of signals, meaning that many different types of circuits can be connected to their back ends.

Since the MIN and MAX circuits described are driven by current sources, no saturation of transistors will occur. This is to say, the phenomenon of minority carriers accumulating in the base regions will not occur. Therefore, these circuits exhibit extremely high processing speeds. The response time has been experimentally demonstrated to be 10 nsec or less.

Even if one or more of the input terminals of the circuits described above would be open, this would have no effect on the I/O static characteristics of the whole circuit.

The PNP or NPN transistors in the circuits described above can be replaced by p-channel or n-channel MOSFETs, respectively. This is true for not only the MIN and MAX circuits described above, but any of the other circuits to be described hereafter.

Figures 25, 25A:
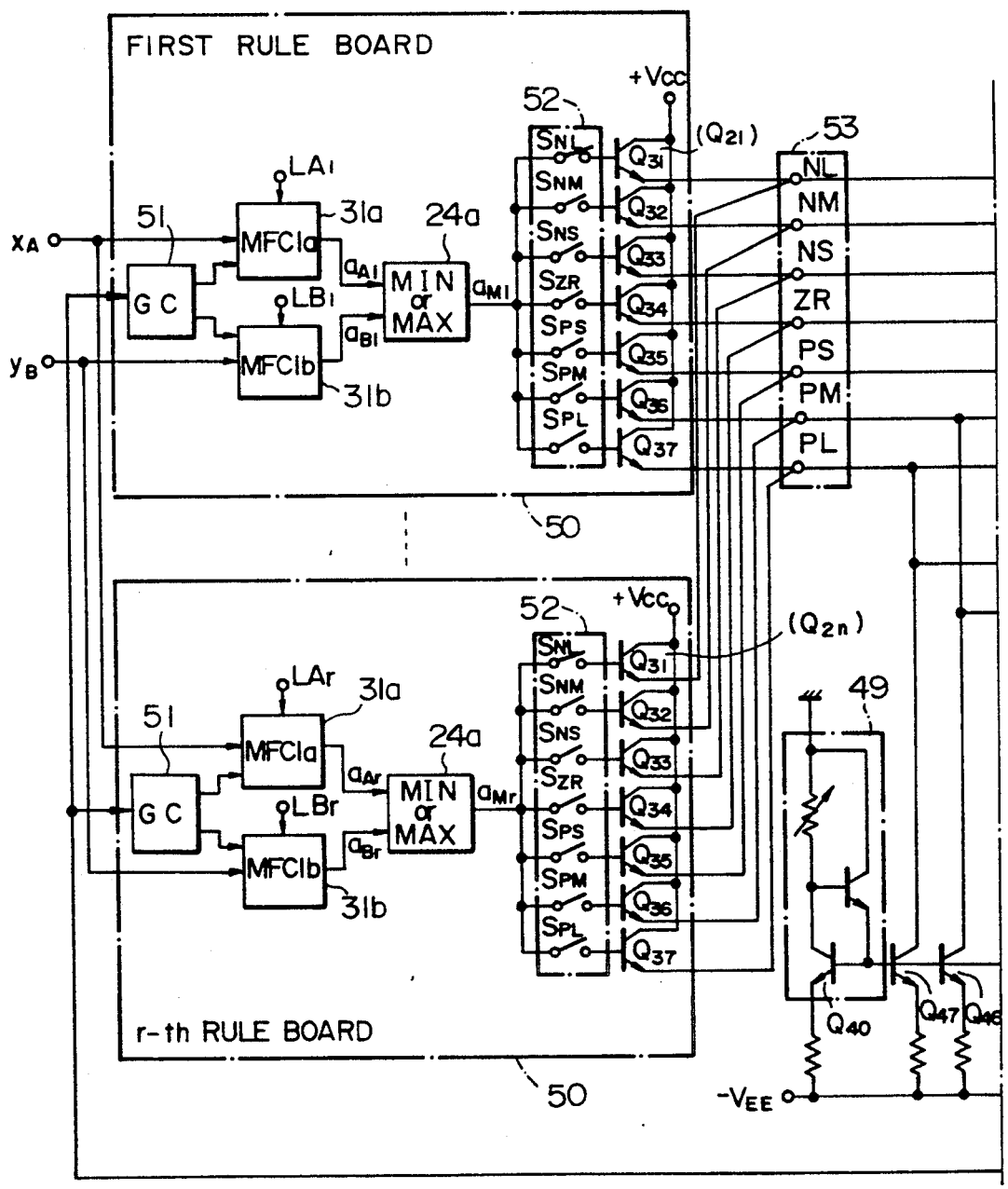
FIG. 25, consisting of FIGS. 25A and 25B, is a circuit diagram illustrating the structure of a fuzzy processor.
Figure 25B:
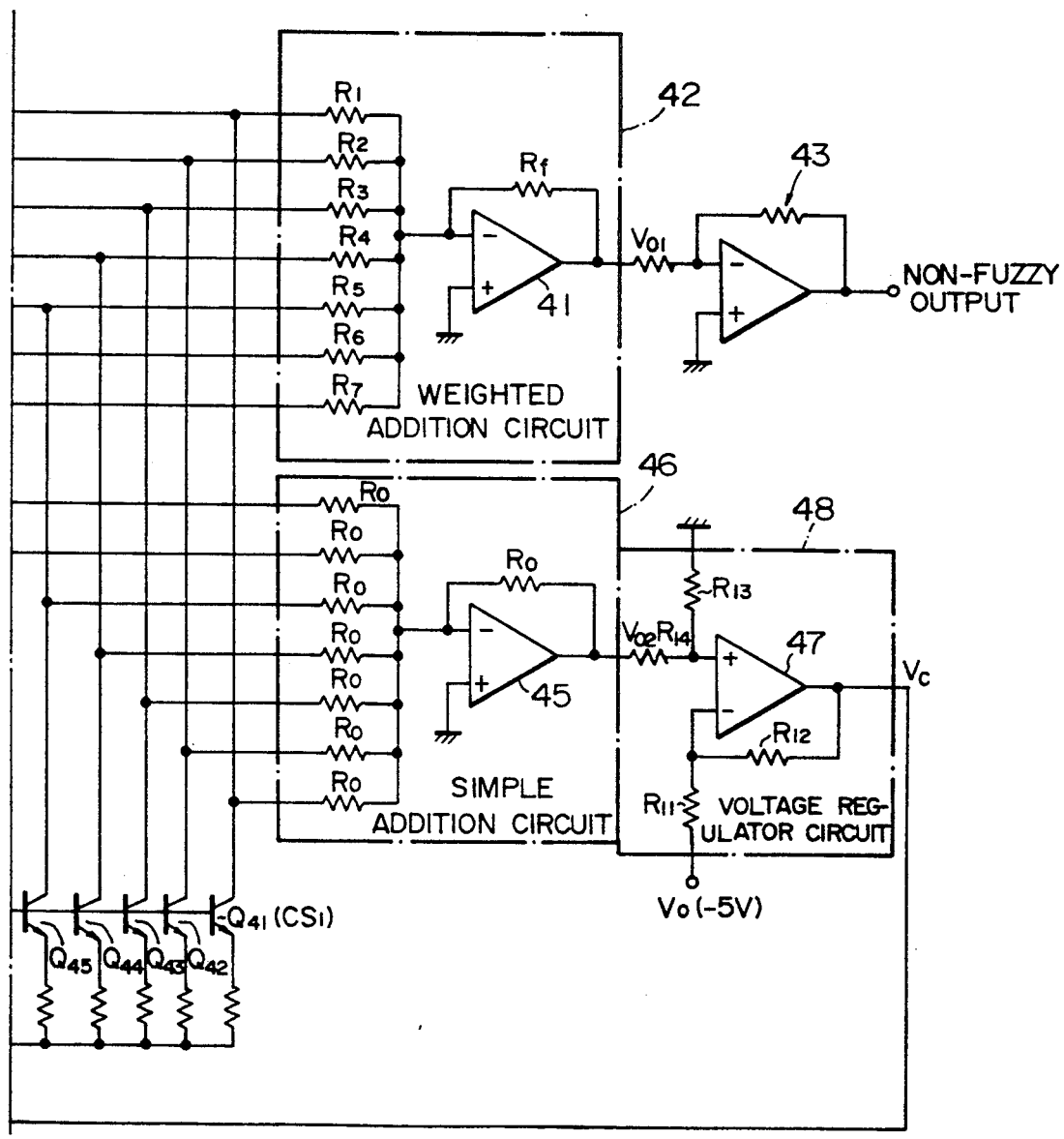

FIG. 25 illustrates the overall structure of a fuzzy processor which carries out the operations illustrated in FIG. 19. In order to carry out fuzzy inferences including r implications, r rule boards 50 are provided, so that inferences for each implication are carried out on a different rule board. On each rule board 50 (using the notation of the first rule board as a representative), two definitive-value inputs $x_A$ and $x_B$ are provided to membership function circuits 31a and 31b, whose outputs $a_{A1}$ and $a_{B1}$ are provided as input to a MIN (or MAX) circuit 24a obtaining the result $a_{M1}$ of the MIN operation. The structure so far is identical to that of the fuzzy controller illustrated in FIG. 14.

In a fuzzy processor, as explained above, the truncation circuit is unneeded. The output of the MIN circuit 24a is provided to a switch array 52. The switch array 52 is used to select the weighting described above. In this preferred embodiment, the seven singleton labels NL through PL illustrated in FIG. 22 are employed. Therefore, the switch array 52 is equipped with seven switches $S_{NL}$ through $S_{PL}$, and one terminal of each of these switches is provided with the operation results $a_{M1}$. The switches $S_{ML}$ through $S_{PL}$ are preferably able to be manually turned off and on, like DIP switches. The other terminals of the switches $S_{NL}$ through $S_{PL}$ are each connected the base of one of the transistors $Q_{31}$ through $Q_{37}$, the collectors of which are connected to the power source $V_{cc}$, and the emitters of which are connected output terminals.

On each rule board 50, one of the seven switches in the switch array 52 is selectively turned on. For example if switch $S_{NL}$ on the first rule board is turned on, the weighting NL would be selected. If switch $S_{PM}$ on the second rule board is turned on, the weighting PM is set. When a certain rule board is to beee not working, all of the switches on that board are turned off.

One board (with no particular notation) contains the defuzzifier, and this board has seven input terminals corresponding to the labels NL through PL. The corresponding output terminals on each rule board is connected to these input terminals through the connector 53. For example, connected to the input terminal of label NL are all of the output terminals (emitters of the transmitters $Q_{31}$) corresponding the switch $S_{NL}$ on each of the rule boards 50. Thus a wired OR connection of the output of all rule boards is accomplished for each label.

The seven input terminals NL through PL on the defuzzifier board are each connected a corresponding input resister $R_1$ through $R_7$ on the weighted addition circuit 42 and to one of the input resistors $R_o$ on the simple addition circuit 46. The weighted addition circuit 42 is identical to the one illustrated in FIG. 20, where r=7. The weighting NL through PL is carried out depending on the values of the input resistors $R_1$ through $R_7$. The simple addition circuit is identical to the one illustrated in FIG. 21.

The seven input terminals NL through PL on the defuzzifier board are also connected to transistors $Q_{41}$ through $Q_{47}$ which act as power sources. These transistors $Q_{41}$ through $Q_{47}$ comprise a transistor $Q_{40}$ comprising a current source 49 and a multi-current mirror, so that a constant current determined by the current source 49 flows through each of these transistors $Q_{41}$ through $Q_{47}$;

The output-side transistor (one of the transistors $Q_{31}$ through $Q_{37}$) corresponding to the switches belonging to the same label on the switch arrays 52 on each rule board, and the corresponding transistor (the corresponding one of transistors $Q_{41}$ through $Q_{47}$) on the defuzzifier board acting as the current source, and the corresponding wired OR on the connector 53 between the output terminal of each rule board 50 and the input terminal of the defuzzifier board each comprise a respective MAX circuit. For example, the first rule board transistor $Q_{31}$ annotated with the marking ($Q_{21}$) to clarify its relationship with FIG. 24, and the r-th rule board transistor $Q_{31}$ annotated with ($Q_{2n}$), and the defuzzifier board transistor $Q_{41}$ annotated with ($CS_1$), along with the I/O terminals of the label NL on the connector 53 which connects them comprise one MAX circuit.

In this way, since the output terminals of a plurality of rule boards 50 and the input terminals of the defuzzifier board can be simply connected by the connector 53 to form a wired OR of corresponding elements, thus comprising a MAX circuit, the construction becomes simple. Additionally, since even if one or more rule boards 50 would be removed, a constant current will flow due to the current sources ($Q_{41}$ through $Q_{47}$), the input impedance on the defuzzifier board will not change, so that the correct input voltage will be added to the addition circuits 42 and 46. Since a current source need be provided only on the defuzzifier board, there is no need to provide current sources on the individual rule boards 50, simplifying the rule boards. With the circuit of FIG. 25, the compensator illustrated on FIG. 24 is omitted.

The configuration of the above MAX circuit may also be applied to the MAX circuits 16 and 37 illustrated in FIGS. 5, 8, 14 and 15.

Figure 43:
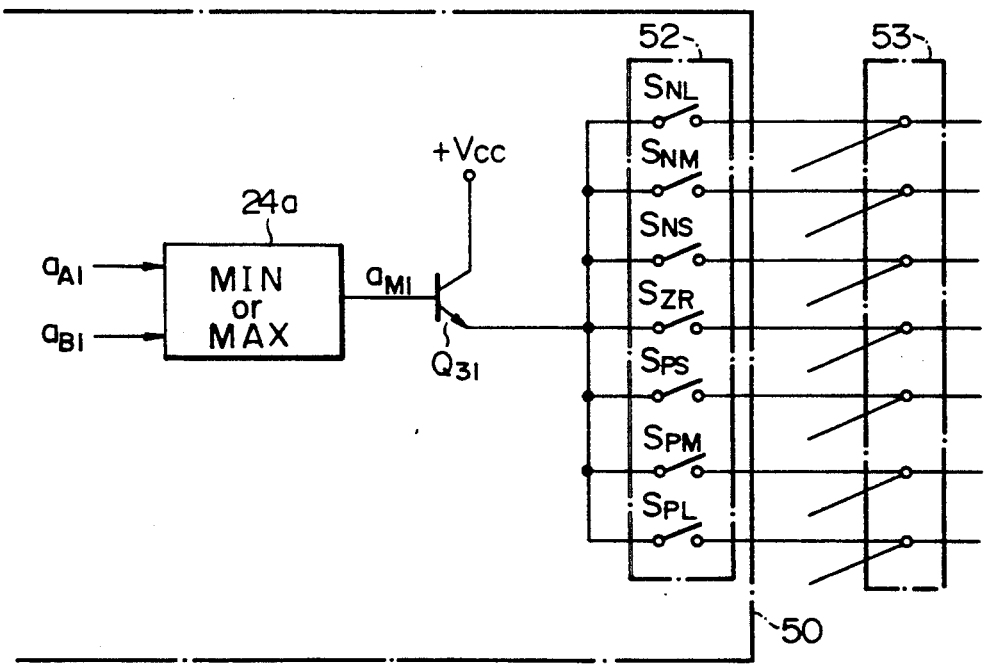

While transistors $Q_{31}$ through $Q_{37}$ are shown connected to the output side of switches $S_{NL}$ through $S_{PL}$ in FIG. 25, the order of connection for these transistors and switches may be reversed as shown in FIG. 43. In this case, one transistor (marked by $Q_{31}$) is sufficient to control the output of the MIN circuit 24a, and the switch array 52 would then be connected to the emitter of this transistor $Q_{31}$.

Figure 44:
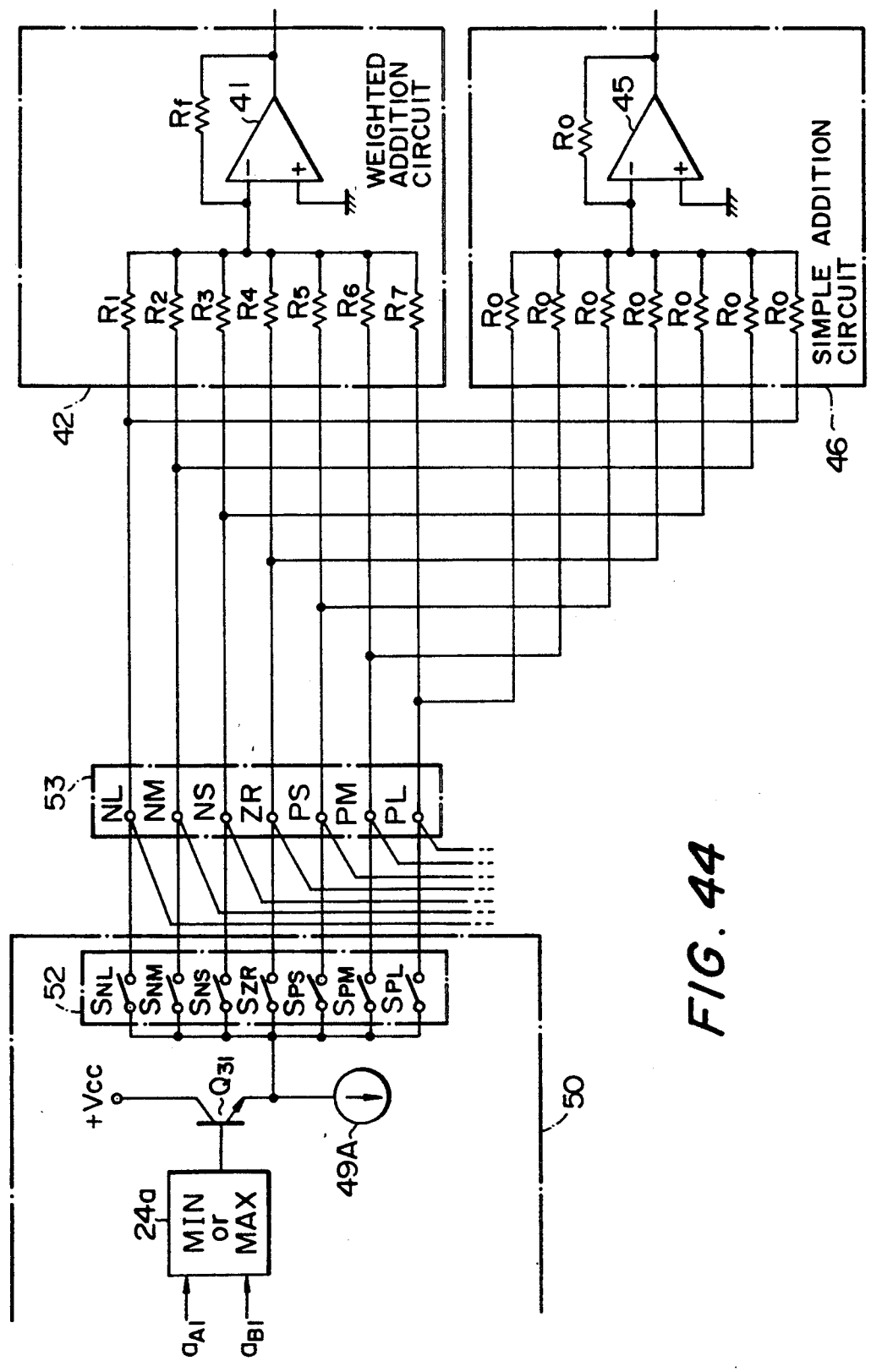

Also, as illustrated in FIG. 44, the defuzzifier board current source 49 and the transistors $Q_{41}$ through $Q_{47}$ driven by this the current source 49 can be omitted and a current source 49A provided on each rule board 50, connected to the emitter of the transistor $Q_{31}$.

Figure 45:
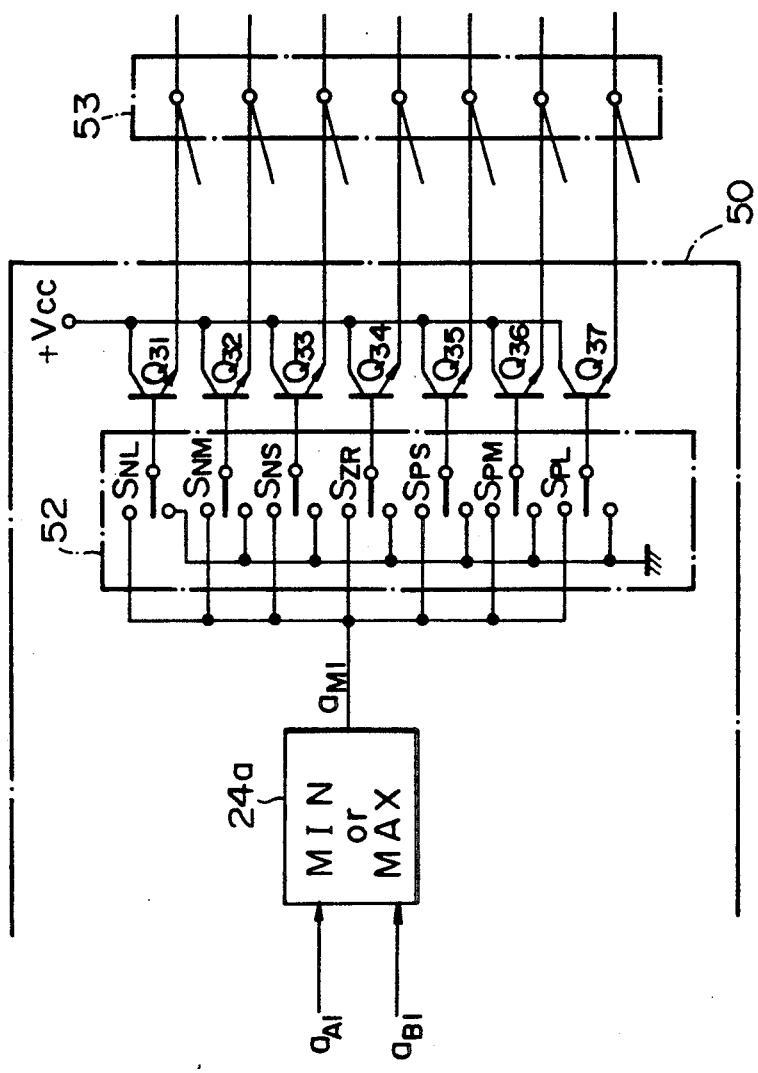

Also, as illustrated in FIG. 45, SPDT (single-pole dual throw) switches are preferably used as the switches of the switch array 52. These SPDT switches will naturally comprise semiconductor switching elements. One of the two input terminals of these SPDT switches will be grounded. The switches of the switch arrays illustrated in FIGS. 41 and 42 can also be replaced in this way with SPDT switches.

The output voltage $V_{o2}$ of the simple addition circuit 46 is provided as input to a nonreversed input terminal of an operational amplifier 47 through a resistor $R_{14}$. A constant standard voltage $V_o$ is provided to the reversed input terminal of the operational amplifier 47 through a resistor $R_{11}$, and the output voltage is fed back through a feedback resistor $R_{12}$. The resistor $R_{11}$ has a resistance sufficiently greater (e.g., 10 to 100 times) than the feedback resistor $R_{12}$. The above nonreversed input terminal is grounded through a resistor $R_{13}$, but this resistor $R_{13}$ is not absolutely necessary.

This voltage regulator circuit 48 generates a control voltage $V_c$ such that the simple addition circuit 46 output $V_{o2}$ becomes a voltage which represents a fuzzy logic value of 1.0, and this control voltage is fed back to the grade control circuits 51 which control the peak value (grade) of the membership functions of the membership function circuits 31a and 31b on each rule board 50. In this preferred embodiment, the fuzzy logical values between 0.0 and 1.0 correspond to voltage between 0 V and 5 V. Since this voltage is reversed by the operational amplifier 47 of the simple addition circuit 46, the reversed input terminal is provided a standard voltage $V_o$ of $-5$ V.

Thus, since the output voltage $V_{o2}$ of the simple addition circuit 46 is always $-5$ V (corresponding to a fuzzy logical value of 1), the denominator of the equation (4) described above becomes 1, and ultimately the output voltage V of the weighted addition circuit 42 will indicate the center of gravity of the fuzzy inference results. The output of the weighted addition circuit 42 is reversed by a reverse amplifier circuit 43, becoming the final non-fuzzy output as a positive voltage.

Next the concrete structure of a rule board 50 will be described using the first rule board as an example with reference to FIG. 26. Since this circuit includes the membership function circuits 31a and 31b which generate membership functions represented by voltages, their labels $LA_1$ and $LB_1$ are provided as voltages (these label voltages are $V_{LA}$ and $V_{LB}$ respectively), while the inputs $x_A$ and $y_B$ are also provided as voltage signals (these input voltage signals are $V_x$ and $V_y$ respectively). The membership function circuits 31a and 31b provide output voltage signals which represent the triangular membership function $MF_1$ described above. Since the two membership function circuits 31a and 31b have identical structures, only the one circuit 31a will be described. Since the membership function circuit 31a includes differential circuits 61 and 62, the operation of these circuits will be described using the differential circuit 62 as an example with reference to FIGS. 27 and 28.

Figure 27:
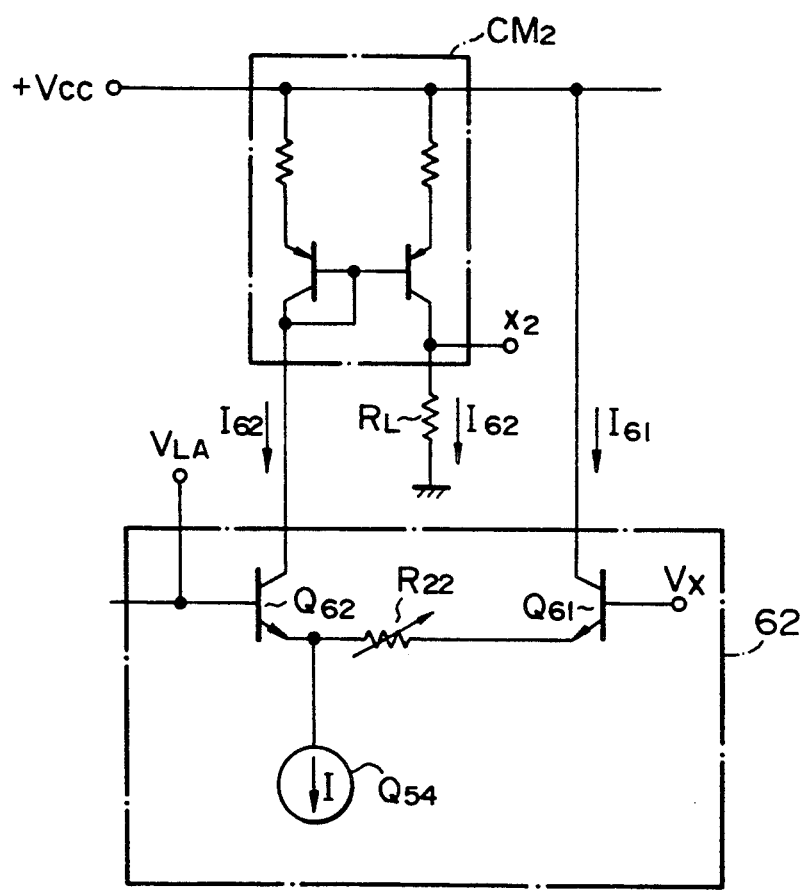
FIG. 27 is a circuit diagram used to explain a membership function circuit, illustrating part of the circuit cut away, while FIG. 28 (A) through (E) are graphs illustrating the signals of the circuit.

In FIG. 27, the differential circuit 62 includes two transistors $Q_{61}$ and $Q_{62}$ with a variable resistor $R_{22}$ connected between the emitters of these transistors. An input voltage $V_x$ is provided (if the circuit is to be used in a sweep type fuzzy computer, a sweep signal SW is provided) to the base of one of the transistors, $Q_{61}$, (this will become the input terminal for the membership function circuit), while a voltage $V_{LA}$ representing a label is provided to the base of the other transistor, $Q_{62}$. A current I is supplied by the current source to the emitters of both transistors $Q_{61}$ and $Q_{62}$.

Figure 28A:
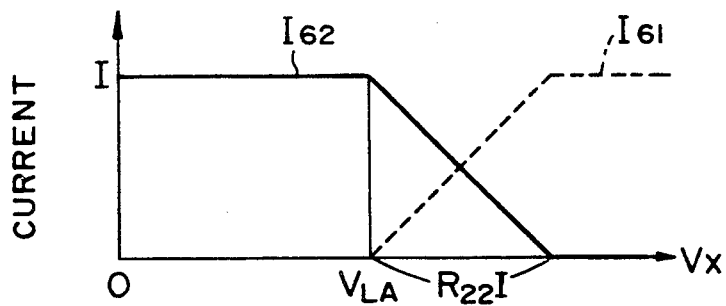
Figure 28B:
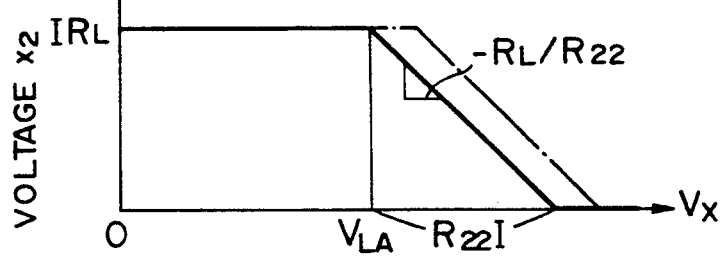

Assuming the current flowing in transistor Q1 to be $I°_1$, and the current flowing in transistor $Q_{62}$ to be $I_{62}$, as shown in FIG. 28(A), when $V_x < V_{LA}$, the current I flowing in transistor $Q_{62}$ is $I_{62}$, but no current flows in transistor $Q_{61}$ ($I_{62} = 0$). If the input voltage $V_x$ becomes greater or equal to the label $V_{LA}$, the transistor $Q_{62}$ current $I_{62}$ will decrease linearly and the current $I_{61}$ flowing in transistor $Q_{62}$ will increase linearly from 0. When $V_x = V_{LA} + R_{22}I$, $I_{62} = 0$ and $I_{61} = I$, and this state will be maintained in the region over which $V_x$ becomes even larger.

A current mirror $CM_2$ is provided, and this current mirror is driven by the current $I_{62}$ flowing in the transistor $Q_{62}$. Connected to the output side of the current mirror $CM_2$ is a resistor $R_L$, and the voltage appearing at this resistor $R_L$ is the voltage $x_2$. Since the voltage $x_2$ is provided as $x_2 = I_{62}R_L$, this voltage $x_2$ will change as the solid line in FIG. 28(B) with respect to changes in the input voltage $V_x$. The slope of the section in which voltage $x_2$ is changing linearly is given as $-R_i/R_{22}$. Therefore, this slope can be changed by changing the resistance value of resistor $R_{22}$.

Figures 26, 26A:
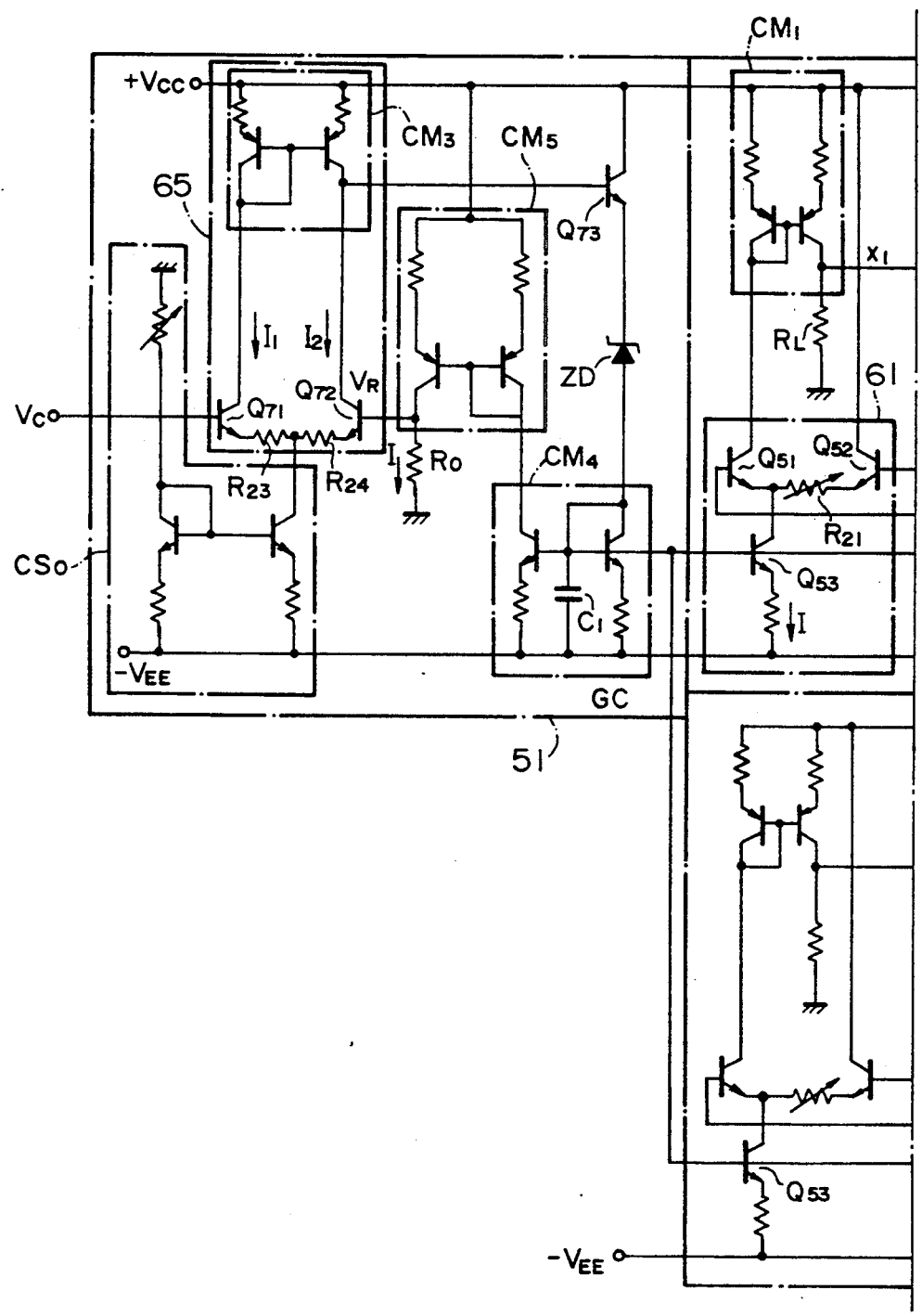
FIG. 26, consisting of FIGS. 26A and 26B, is a circuit diagram illustrating the structure of a fuzzy processor rule board.
Figure 26B:
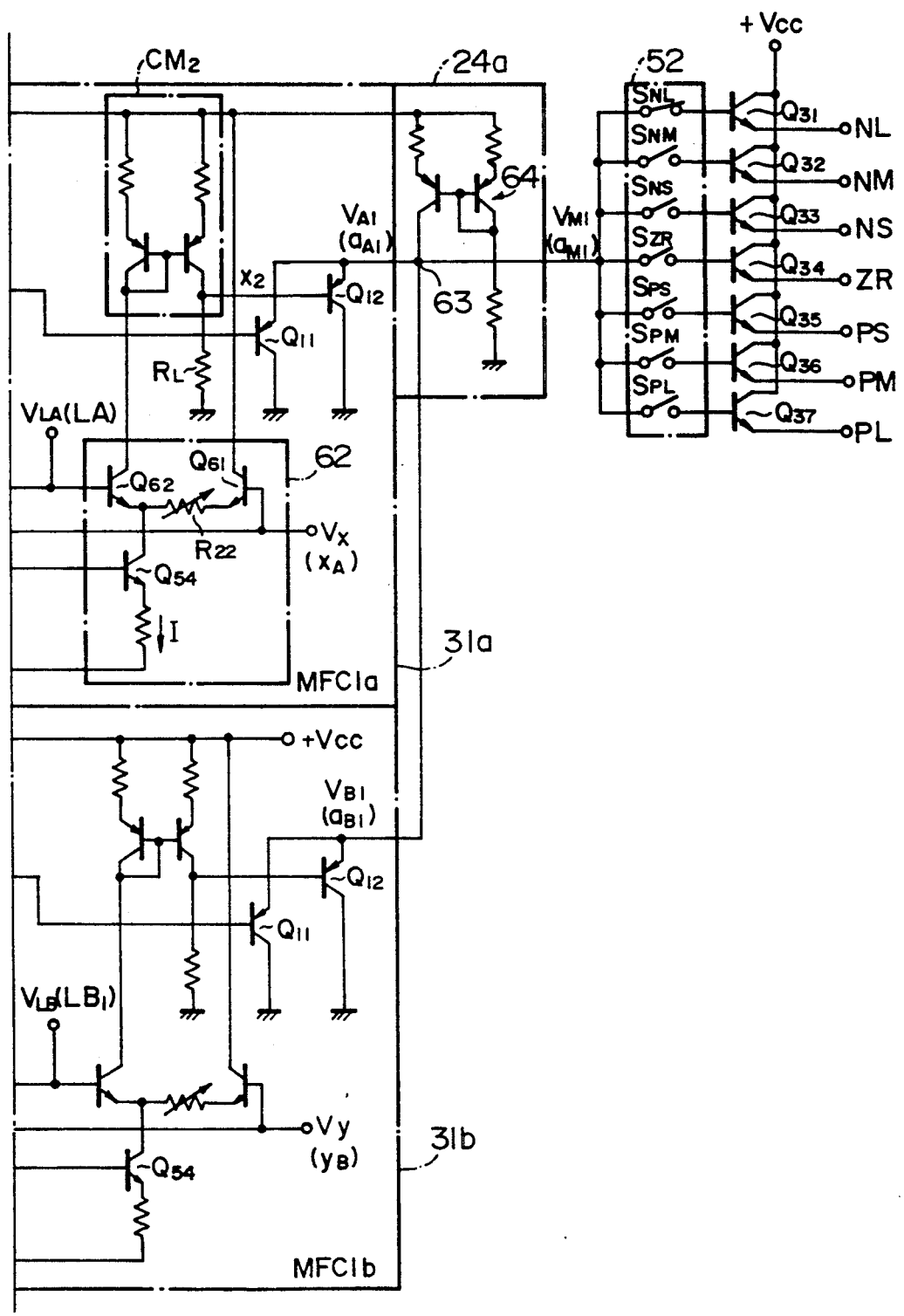
Figure 28C:
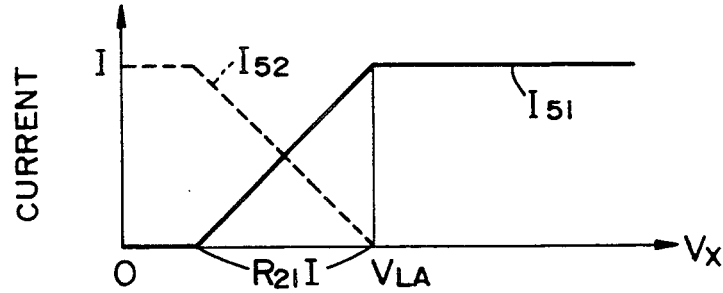
Figure 28D:
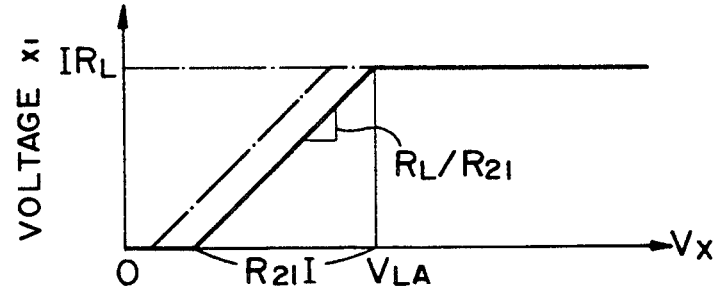

The other differential circuit 61 in FIG. 26 has the same structure as differential circuit 62. The currents flowing in transistor $Q_{51}$ which provides the input voltage $V_x$ and in transistor $Q_{52}$ which provides the label voltage $V_{LA}$ are $I_{51}$ and $I_{52}$ respectively, and these currents vary with the input voltage $V_x$ as shown in FIG. 28(C).

A current mirror $CM_1$ is driven by the current $I_{51}$ flowing in the transistor $Q_{51}$. Since the current $I_{51}$ is flowing through a resistor $R_L$ connected to the output side of the current mirror $CM_1$, the dropping voltage $x_1$ at the resistor $R_L$ is $x_1 = I_{51}R_L$. The changes in voltage $x_1$ with respect to the input voltage $V_x$ are represented by the solid line in FIG. 28(D). The slope of the section in which voltage $x_1$ is increases linearly is given as $R_L/R_{21}$. Resistor $R_{21}$ is the resistor connected between the emitters of the two differential circuit 61 transistors $Q_{51}$ and $Q_{52}$, so this slope can be changed by changing the resistance value of this resistor $R_{22}$.

The membership function circuit 31a includes a 2-input MIN circuit. In order for the figure to be more readily understood, the components of this MIN circuit are given the same notation $Q_{12}$ and $Q_{13}$ of the corresponding components of the MIN circuit of FIG. 23. The current source 64 of the MIN circuit 24a to be described later is used as current source $CS_1$. No compensator is provided. As described above, the compensator of a MIN circuit is used to subtract the emitter-/base voltage $V_{EB}$ of the transistor, while the compensator of a MAX circuit is used to add the emitter/base voltage $V_{EB}$ of the transistor. Therefore, when a MIN circuit and a MAX circuit are connected by cascade connection, the compensators of these circuits may be omitted. Since the MAX circuit containing transistors $Q_{31}$ and $Q_{41}$ and a wired OR described above is not provided with a compensator, the compensator of the MIN circuit including transistors $Q_{11}$ and $Q_{12}$ may be omitted.

The voltages $x_1$ and $x_2$ described above are provided to the bases of transistors $Q_{11}$ and $Q_{12}$ which comprise the MIN circuit. The output voltage $V_{A1}$ ($a_{A1}$) is the result of a MIN operation on the voltages $x_1$ and $x_2$, a graph of which is shown as the solid line on FIG. 28(E). The output voltage $V_{A1}$ becomes triangularly shaped with respect to input voltage $V_x$, representing the triangular membership function $MF_1$. Furthermore, the input voltage corresponding to the peak value is the label voltage $V_{LA}$. Depending on the resistors $R_{21}$ or $R_{22}$, the slope will vary as shown by $SL_1$ and $SL_2$ on FIG. 1B.

While not particularly relevant to FIG. 26, for the sake of completeness, if the input voltage $V_x$ were a sweep described above, the output voltage $V_{A1}$ would change to a triangular wave on the time axis. The input voltage $V_x$ and label voltage $V_{LA}$ could take on positive or negative values.

Similarly, the other membership function circuit 31b also uses a set label voltage $V_{LB}$ to obtain an output voltage $V_{B1}$ representing a membership function value ($a_{B1}$) corresponding to the input voltage $V_y$.

The MIN circuit 24a includes a wired OR 63 and a current source 64. Furthermore, the output voltages $V_{A1}$ and $V_{B1}$ of the above membership function circuits 31a and 31b are provided to this wired OR 63. The output of the wired OR becomes the voltage $V_{M1}$ which represents the results of the MIN operation corresponding to a1

To describe this in further detail, transistors $Q_{11}$ and $Q_{12}$ of membership function circuit 31a, transistors $Q_{11}$ and $Q_{12}$ of membership function circuit 31b, the wired OR 63 and the current source 64 comprise a 4-input MIN circuit.

Figure 28E:
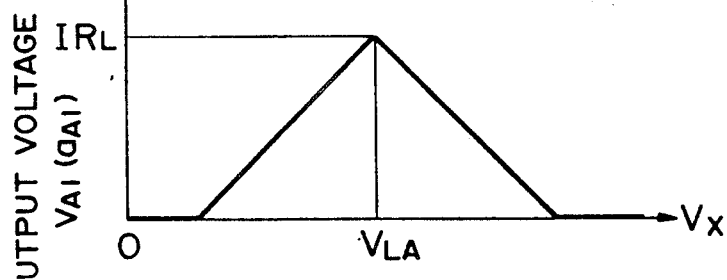

As can be seen from the graph of FIG. 28(E), the peak value of the membership function of membership function circuits 31a and 31b is determined by $IR_L$. If resistance $R_L$ is constant, the peak value varies as the current I changes.

The grade control circuits 51 are used to vary the current I depending on a given control voltage $V_c$. The grade control circuits 51 include a current mirror $CM_4$ which acts as a current source. This current mirror $CM_4$, transistors $Q_{53}$ and $Q_{54}$. which act as the current source for the membership function circuit 31a and transistors $Q_{53}$ and $Q_{54}$ which act as the current source for the membership function circuit 31b comprise a multicurrent mirror. Therefore, a current equal to the current I which flows through the current mirror $CM_4$ will flow through these transistors $Q_{53}$ and $Q_{54}$. The current mirror $CM_4$ contains a capacitor $C_1$. This capacitor $C_1$ is a capacitor used for phase compensation. As shown in FIG. 25, this capacitor can prevent fluctuations when the output of the voltage regulator circuit 48 is fed back to the input $V_c$ of the grade control circuit 51.

This current mirror $C_4$ drives another current mirror $CM_5$. The collector of one of the current mirror $CM_5$ transistors is connected to a resistor $R_o$. Since a current I flows through this resistor $R_o$, the voltage $V_R = IR_o$ appears.

The grade control circuit 51 is provided with a differential circuit 65 and a current source $CS_o$. The differential circuit 65 includes two transistors $Q_{71}$ and $Q_{72}$, the emitters of which are connected to two resistors $R_{23}$ and $R_{24}$ of the same resistance values, and their point of connection is connected to the output side of current source $CS_o$.

The base of one of the transistors $Q_{71}$ is provided with the control voltage $V_c$, while the base of the other transistor $Q_{72}$ is provided with the above voltage $V_R$. If these voltages $V_c$ and $V_R$ are equal, an equal current will flow through the two transistors $Q_{71}$ and $Q_{72}$ from the current mirror $CM_3$.

If these voltages $V_c$ and $V_R$ are not equal, a difference in the currents $I_1$ and $I_2$ flowing through the two transistors will occur. The current mirror $CM_3$ acts to keep equal currents flowing through the two transistors $Q_{71}$ and Q$_{72}$, so any difference in currents I$_1$ and I$_2$ will flow to the base of transistor Q$_{73}$ connected to the collector side of transistor Q$_{72}$, so current of a value the amplification factor $\beta$ times this difference will flow through emitter of transistor Q$_{73}$. The emitter of transistor Q$_{73}$ is connected to the current mirror CM$_4$ through a Zener diode ZD, so the current flowing through the current mirror CM$_4$ will change. This change in current will appear as a change in the current I flowing through the resistor R$_o$, acting to make the voltage V$_R$ equal to the control voltage V$_c$. The Zener diode ZN gives the emitter of transistor Q$_{73}$ an appropriate potential, but can also be replaced by providing a plurality of transmitters.

Assuming the difference between the voltages V$_C$ and V$_R$ to be $\Delta V$, and that R$_{23}$=R$_{24}$=r$_c$, the current I and voltage V$_R$ are found by the following equations.

$$\begin{aligned} I &= (1/r_e) \cdot \beta \cdot \Delta V \\ V_R &= R_o \cdot I = (1/r_e) \cdot \beta \cdot \Delta V \\ &= (1/r_e) \cdot \beta \cdot R_o(V_c - V_R) \end{aligned}$$

Therefore, $$V_R = [(1/r_e)\cdot\beta\cdot R_o/\{1(1/r_e)\cdot\beta\cdot R_o\}]\cdot V_c$$

and assuming $(1/r_e)\cdot\beta\cdot R_o >> 1$, $$V_R = V_c.$$

Therefore, the current I flowing in resistor R$_o$ becomes $$I = V_c/R_o.$$

In this way, the current I will be controlled by the control voltage V$_c$, and the peak voltage of the membership function circuits 31a and 31b will be controlled so that the output voltage V$_{o2}$ of the simple addition circuit 46 illustrated in FIG. 25 will be equal to the standard voltage V$_o$ (equivalent to a fuzzy logical 1). Since the control voltage V$_c$ is provided to each rule board 50, the above control will be carried out on each rule board 50.

The combination of a membership function circuit 31a or 31b and a grade control circuit 51 is called a grade-controllable membership function circuit (GC-MFC).

While not particularly relevant to this preferred embodiment, when the peak value of the grade-controllable membership function circuits on each rule board are controlled, the output voltage V$_{o2}$ (V$_c$) of the simple addition circuit 46 is not fed back to each rule board. So the output voltage V$_{o1}$ of the weighted addition circuit 42 is divided by the output voltage V$_{o2}$ of the simple addition circuit 46 according to equation (4) so that the final non-fuzzy output is obtained.

FIG. 46 illustrates another preferred embodiment. As described above, the label (weighting) of the singletons in the consequent is defined by the resistors R$_i$($1 \leq i \leq r$) and the resistor R$_f$. In FIG. 25 these resistors R$_i$ and R$_f$ are all provided on the defuzzifier board. In the circuits of FIG. 46, the input resistor R$_i$ of the weighted addition circuit 42 and input resistors R$_o$ of the simple addition circuit 46 are provided on each rule board. Moreover, the weighting can be changed by using variable resistors for the resistors R$_i$. One of the switches S$_P$ and S$_N$ will generally be on. If a certain rule board is not in use, both switches S$_P$ and S$_N$ are turned off, or the resistors R$_i$ is given infinite resistance.

In FIG. 46, the output voltage a$_{M1}$ of each rule board 50 is provided to the resistors R$_i$ and R$_o$ through a buffer circuit 50a. Each of the resistors R$_i$ are connected to the output terminals T$_P$ and T$_N$ through switches S$_P$ and S$_N$. Switch S is turned on for a positive singleton, while switch S$_N$ is turned on for a negative singleton. The voltages appearing at the output terminals T$_P$ and T$_N$ through these switches S$_P$ and S$_N$ are V$_{Pi}$ and V$_{Ni}$ respectively. On the other hand, the resistor R$_o$ is connected to a rule board output terminal T$_o$. The voltage appearing at this terminal is V$_{oi}$.

The output terminals T$_p$ of all of the rule boards 50 are connected to the input terminals T$_p$ of the defuzzifier board, the output terminals T$_N$ to the input terminals T$_N$, while the output terminals T$_o$ of all of the rule boards 50 are connected to the input terminals T$_o$ of the defuzzifier board.

On the defuzzifier board, the weighted addition circuit 42 comprises operational amplifier circuits 41A and 41B connected to the input terminals T$_P$ and T$_N$ respectively, and an operational amplifier circuit 41C which subtracts the output of these operational amplifier circuits 41A and 41B. The operational amplifier circuit 41A carries out the summation $$\sum_i (R_f/R_i)V_{Pi},$$

while the operational amplifier circuit 41B carries out the $$\sum_i (R_f/R_i)V_{Ni},$$

is obtained from the operational amplifier circuit 41C. Naturally, a signal representing $$\sum_i V_{oi}$$

is obtained from the simple addition circuit 46.

In the preferred embodiment illustrated in FIG. 46, no MAX circuit is provided. This is because this preferred embodiment uses addition/subtraction rules instead of MIN/MAX operation rules.

(4) Fuzzy Controller Based on Algebraic Product Rules

Next, a sweep type fuzzy controller based on algebraic product rules, will be described as a practical application of grade-controllable membership function circuits (GC-MFC).

Consider the most simple example, in which one implication is present and this implication includes one fuzzy proposition in its antecedent. In the sweep type controller illustrated in FIG. 15, the MIN operation (with the MIN circuit 38) was used for the fuzzy inference synthesis operation. The fuzzy controller described here uses the algebraic product (or so-called multiplication) for the fuzzy inference synthesis operation.

Figure 29A:
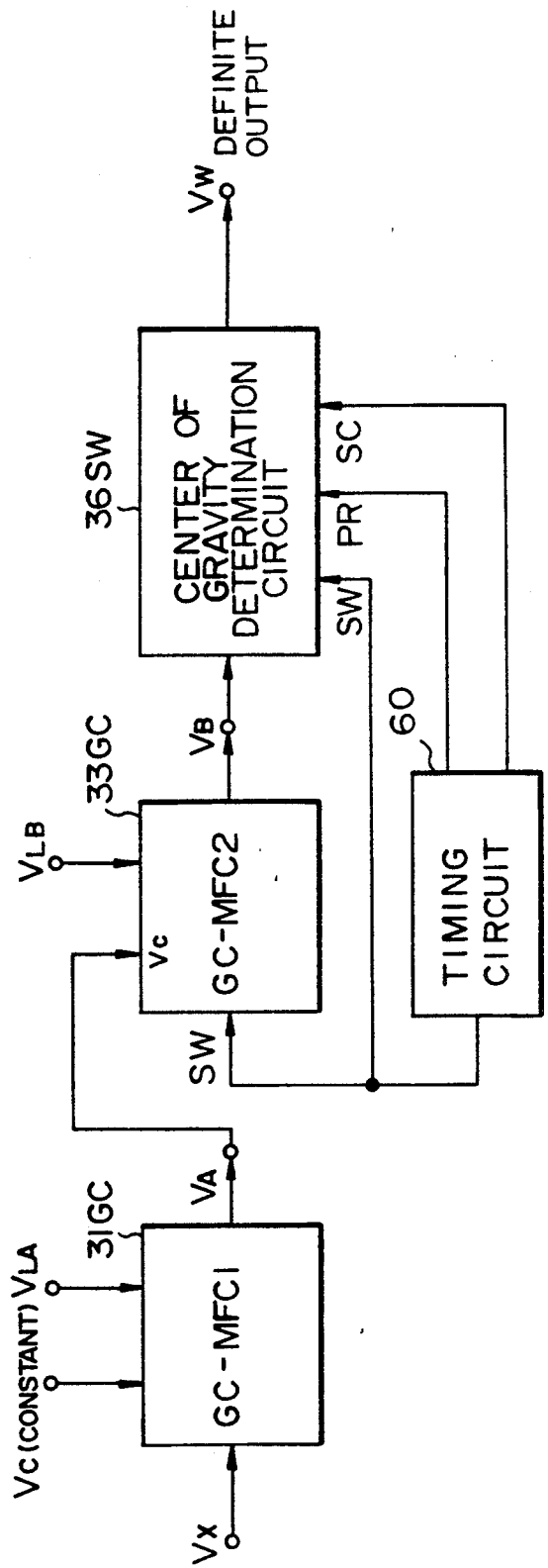
FIGS. 29A and 29B are each block diagrams illustrating examples of the structure of a fuzzy controller which carries out inferences based on algebraic product operations.

In reference to FIG. 29A, two GC-MFC, 31GC and 33GC, are provided. These GC-MFC are combinations of the membership function circuit 31a (MFC 1a) and the grade control circuit 51 illustrated in FIG. 26. One of the circuits, GC-MFC 31GC is provided with the definitive-value input $V_x$. The label voltage $V_{LA}$ is also set. A constant voltage $V_c$ (corresponding to $V_c$ in FIG. 26) is provided as the grade control voltage for this circuit 31GC. Naturally, this control voltage $V_c$ can be changed if necessary (e.g., to add weighting as described hereafter). If the control voltage $V_c$ is a constant, a membership function circuit (which provides a constant current to transistors $Q_{53}$ and $Q_{54}$ of circuit 31a in FIG. 26) can be used instead of this GC-MFC 31GC.

The other circuit, GC-MFC 33GC is provided a sweep signal SW from the timing circuit 60. It is also provided the output voltage $V_A$ (corresponding to the output voltage $V_{A1}$ in FIG. 26) from the previous GC-MFC 31GC. This circuit 33GC also has a characteristic label voltage $V_{LB}$ set.

As described above, the grade control voltage sets the grade (peak value) of the GC-MFC. Since the output voltage $V_A$ from GC-MFC 31GC is provided as the grade control voltage for GC-MFC 33GC, GC-MFC 33GC multiplies the output voltage $V_A$ by appropriate values to obtain the output $V_B$ which represents a membership function distributed over the time axis. In short, fuzzy inference operations of algebraic products are carried out.

The output voltage $V_B$ the GC-MFC 33GC is next provided to the center of gravity determination circuit 36SW, where the voltage $V_W$ which represents the center of gravity is produced, becoming the definitive output of this fuzzy controller.

In the event that a plurality of implications are present, in the same manner as is illustrated in FIG. 15, as many pairs of circuits, made up of the two GC-MFC circuits 31GC and 33GC, as the number of implications are prepared. A MAX operation on the output of these circuits is carried out and the results of this MAX operation is defuzzified with a defuzzifier (center of gravity determination circuit).

In the event that two fuzzy propositions are present in the antecedent of one implication, the output of the MIN or MAX circuit 24a illustrated in FIG. 16 is provided as a grade control voltage for the GC-MFC 33GC, and this GC-MFC 33GC is made into the membership function circuit of the consequent of the implication. The case of three or more fuzzy propositions is handled similarly. If there is a plurality of implications with two or more fuzzy propositions present in the antecedents, naturally, the output of each GC-MFC 33GC should be provided to a MAX circuit 37 (FIG. 15).

Figure 29B:
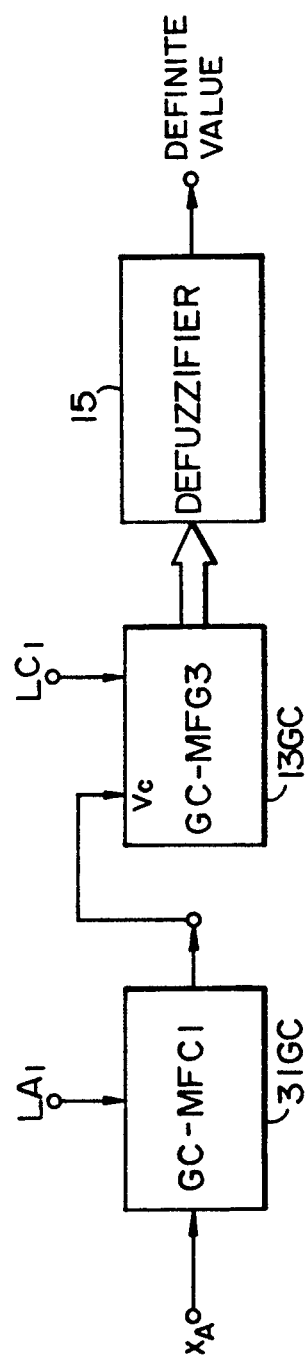

FIG. 29B illustrates an example of a parallel type fuzzy controller based on algebraic product rules. To explaining it in contrast to FIG. 29A, the GC-MFC 33GC is replaced with a grade-controllable membership function generator circuit GCMFG 13GC and the output of the former GC-MFC 31GC is provided as the grade control voltage for the GC-MFG 13GC. The output of the GC-MFG 13GC is provided to a defuzzifier 15 so no truncation circuit is required. By using a MAX circuit, this controller is expandable if a plurality of implications are present, and by providing the output of the MIN or MAX circuit 24a illustrated in FIG. 14 to the GC-MFG 13GC as a control voltage $V_c$, it can be expanded to be applicable to cases in which two or more fuzzy propositions are present in the antecedent of the implications.

Figure 30:
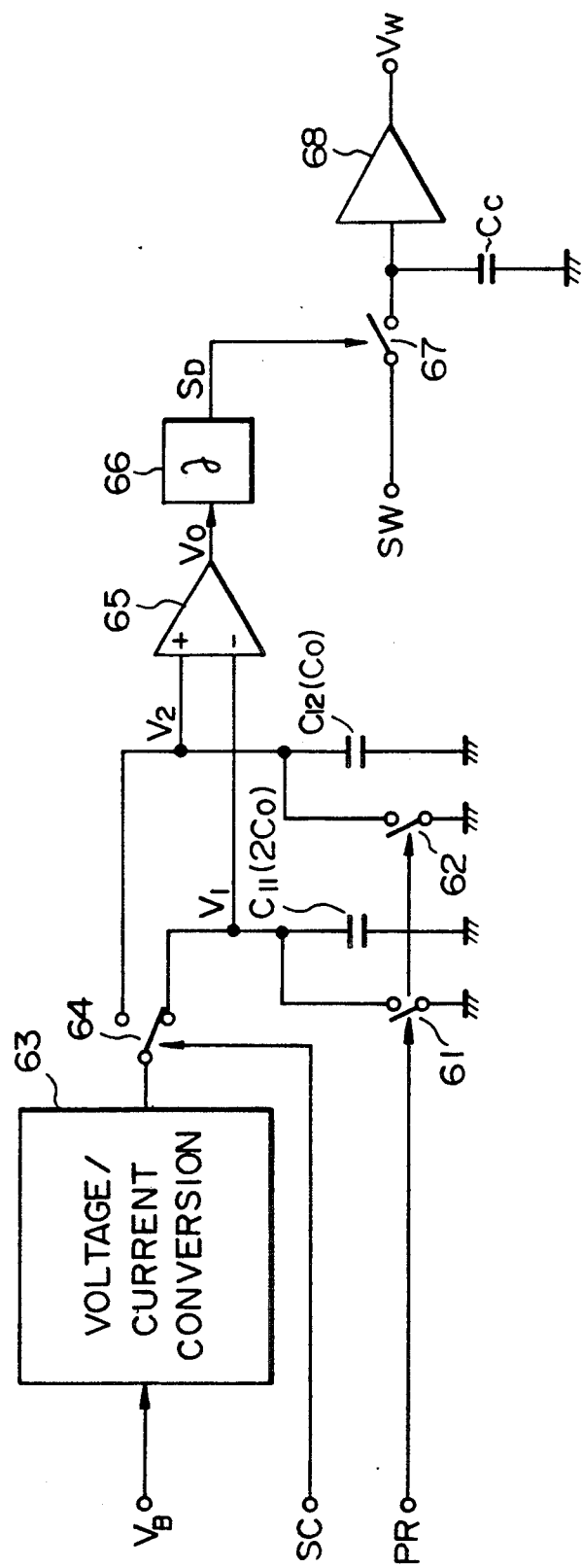
FIG. 30 is a circuit diagram illustrating the structure of a center of gravity determination circuit.
Figure 31:
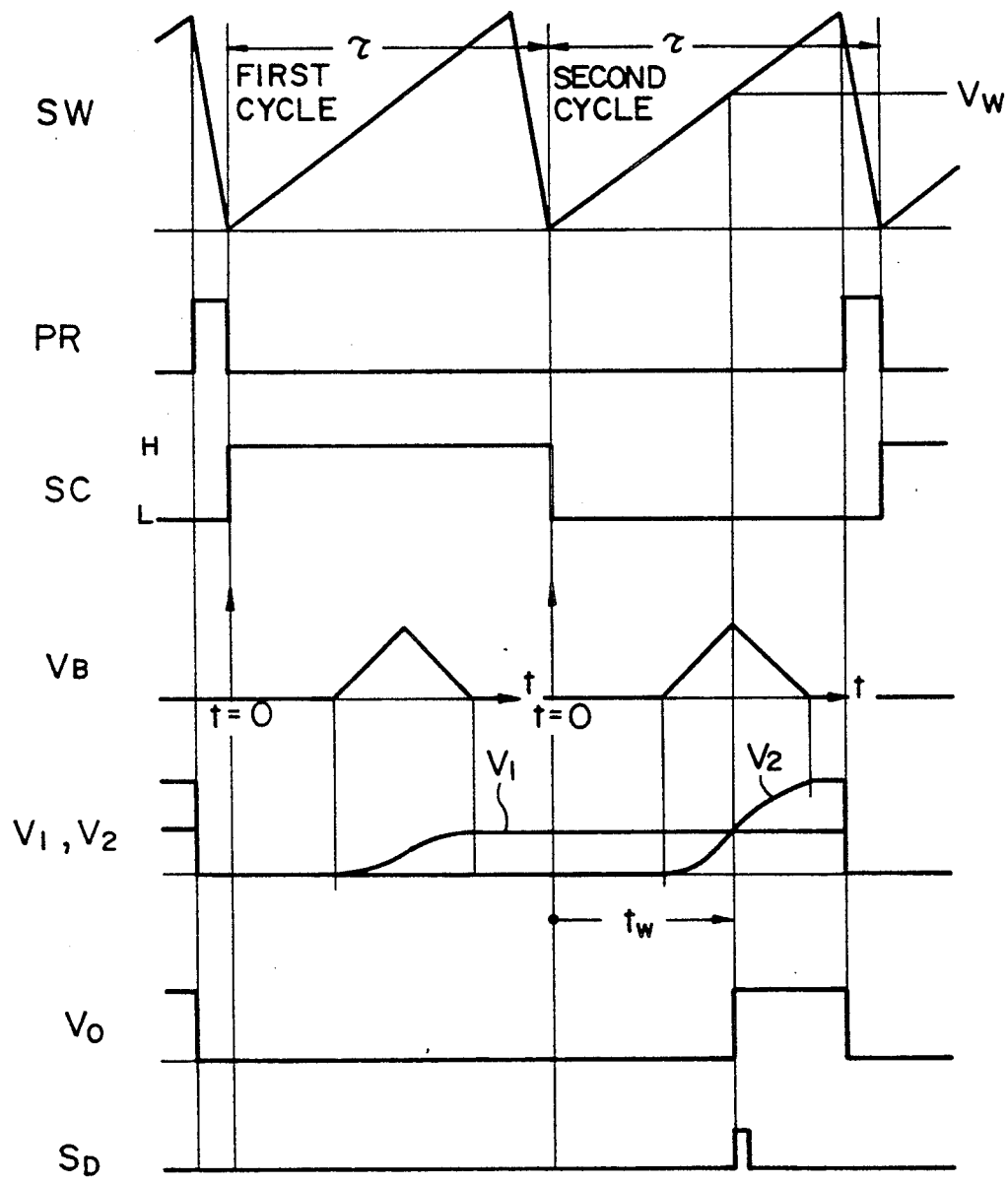
FIG. 31 is a waveform diagram illustrating the operation of the circuits shown in FIG. 29 and FIG. 30.

One example of the center of gravity determination circuit 36SW in FIG. 29A is described simply here with reference to FIGS. 28 and 31. FIG. 30 is one example of the structure of the center of gravity determination circuit 36SW. FIG. 31 is a waveform diagram illustrating the operation of the fuzzy controller illustrated in FIG. 29, including this center of gravity determination circuit. In a sweep type fuzzy controller, the voltage signals which represent inference results are expressed on the time axis. Fuzzy inferences are made every period $\tau$ of the sweep signal SW, and one center of gravity determination operation is carried out every two periods $(2\tau)$1. Therefore in the space of two periods $(2\tau)$, the input voltage $V_x$ is maintained as a constant. If the time axis of the sweep signal SW is T, the local time variable for the voltage $V_B(t)$ which represents the inference results is t. The origin of time t is, for example, the point at which the sweep signal SW crosses zero.

As explained in reference to FIG. 9, the center of gravity position of the inference results B' is the point on the time axis at which the surface area of the function $B' = \mu(t)$ is divided equally with left and right (before and after) symmetry. First the surface area $S_0$ of the inference results B' from the first period is found. Then in the second period, the integral control action is carried out on the time axis, and the time $t_w$ at which the integral value becomes exactly $S_0/2$ represents the center of gravity position. This is to say the center of gravity of the interference results B' can be represented as the time on the time axis t when the above integral value becomes $S_0/2$, or the time on the time axis T at this time, or the phase of the sweep signal SW at that time. This phase on the sweep signal SW can also be expressed as the corresponding sweep signal SW voltage $V_w$. Therefore, this voltage $V_w$ becomes the definitive output of the inference results B' from the center of gravity determination circuit 36SW.

In reference to FIGS. 30 and 31, the above integral control action can be embodied as the charging of a capacitor, in which the charging voltage represents the integral value. A capacitor $C_{11}$ with a capacitance of 2 $C_0$ ($C_0$ may be any value) and a capacitor $C_{12}$ with a capacitance of $C_o$, half this amount, are provided. The voltage signal $V_B$ which represents the inference results is converted by a voltage/current converter circuit 63 to a current $I_B$ which corresponds to that voltage and provided to a selector switch 64. The selector switch 64 is switched between sending current to capacitor $C_{11}$ or sending current to capacitor $C_{12}$, being controlled by the selector control signal SC. The selector control signal SC is provided by the timing circuit 60, being H level during the first period and L level during the second period, repeating after two periods $2\tau$.

In the first period, the input current $I_B$ is provided to capacitor $C_{11}$, thus charging capacitor $C_{11}$. When the first period ends, the voltage $V_1$ of capacitor $C_{11}$ represents the above surface area $S_0$, and this is provided to the negative input terminal of comparator 65. In the second period, the current $I_B$ flows into capacitor $C_{12}$ through the selector switch 64. Since the capacitance of capacitor $C_{12}$ is one half the capacitance of capacitor $C_{11}$, when capacitor $C_{12}$ is charged with half the electric charge of capacitor $C_{11}$ (meaning that the integrated surface area has become $S_0/2$), the voltage $V_2$ of capacitor $C_{12}$ becomes equal to the voltage $V_1$ of capacitor $C_{11}$. The voltage of capacitor $C_{12}$ is provided to the positive input terminal of comparator 65. Therefore, the point in time when the output $V_0$ of comparator 65 rises is the point $t_w$ representing the center of gravity. When the second period ends, the reset signal PR generated from the timing circuit 60 will turn on switches 61 and 62 thus discharging capacitors $C_{11}$ and $C_{12}$.

The rise of the output voltage $V_o$ of comparator 65 is then detected, and the point in time of that rise $t_w$ is sent to a circuit which converts the rise into a corresponding sweep signal SW voltage $V_w$. The rise of signal $V_o$ is detected by a differential circuit 66, and furthermore this rise detection pulse is converted by a monostable multivibrator, etc., to a single pulse signal $S_0$ of constant amplitude which is then provided as output. The pulse duration of this pulse signal $S_0$ is preferably as short as possible as long as it is of sufficient duration to charge capacitor $C_c$ to be described hereafter. The pulse signal $S_0$ is used to control an analog switch 67, and this switch 67 is on for only a time period equal to the duration of the pulse signal $S_0$. Thus the capacitor $C_c$ is charged by the sweep signal SW provided to this switch 67 up to a voltage equal to the voltage of the signal at that time. The voltage of capacitor $C_c$ is maintained until next pulse signal $S_0$ is generated. When the switch 67 is turned on by the next pulse signal $S_0$, if the voltage of the sweep signal SW is higher than the voltage of the capacitor $C_c$, the capacitor $C_c$ is charged to a voltage equal to that of the sweep signal SW, if lower, the capacitor $C_c$ is discharged to a voltage equal to that of the sweep signal SW. In this way, the voltage of capacitor $C_c$ always represents the determined center of gravity position. This voltage could be the output of a center of gravity position voltage $V_W$ provided through, for example, an FET input operational amplifier 68.

The theory of center of gravity determination using the circuits of FIG. 30 is as follows: a first capacitor of capacitance 2 $C_0$ is charged by input current during the first period, then in the second period, a second capacitor of capacitance $C_0$, half of that of the first capacitor, is charged with the same input current. The time $t_W$ at which the voltage of the second capacitor becomes equal to the voltage of the first capacitor is detected as the time which represents the center of gravity. Instead of using two capacitors with capacitances of 2 $C_o$ and $C_o$, two capacitors of equal capacitance can also be used. In this case, during the second integral control action of the inference results, a current of twice that of the input current is used. Specifically, in this method, the first capacitor of a certain capacitance is charged by the input current, and then the second capacitor of the same capacitance as the first capacitor is charged by a current of twice the input current. The time $t_W$ at which the voltage of the second capacitor becomes equal to the voltage of the first capacitor is detected as the time which represents the center of gravity. The voltage can also be doubled instead of the current.

(5) Fuzzy Controller Able to Apply Weighting for Each Rule

As described earlier, FIG. 14 illustrates a parallel type fuzzy controller suited to the case of a plurality of implication rules with two fuzzy propositions in their antecedents. Fuzzy inferences for one implication rule are made using a fuzzy inference synthesis circuit 14a which uses as input the output from two membership function circuits 31a and 31b and one membership function generator circuit 13. These circuits 31a, 31b, 13 and 14a are together called a rule board.

For fuzzy inferences predicated upon the existence of a plurality of implication rules, all of the implication rules are not necessarily of the same importance. In some instances an implication may be extremely important, while others may be not very important at all. For this reason, the implication rules will be weighted according to their importance. This weighting is applied to each rule board. The weighting is accomplished by simultaneously controlling the grades (peak values) of both the antecedents and consequents, so that implications of high importance are given high grade settings. The membership function circuits and membership function generator circuits belonging to one rule board will be weighted identically, specifically the membership peaks of the antecedents and consequents will be set to the same values.

Figure 32:
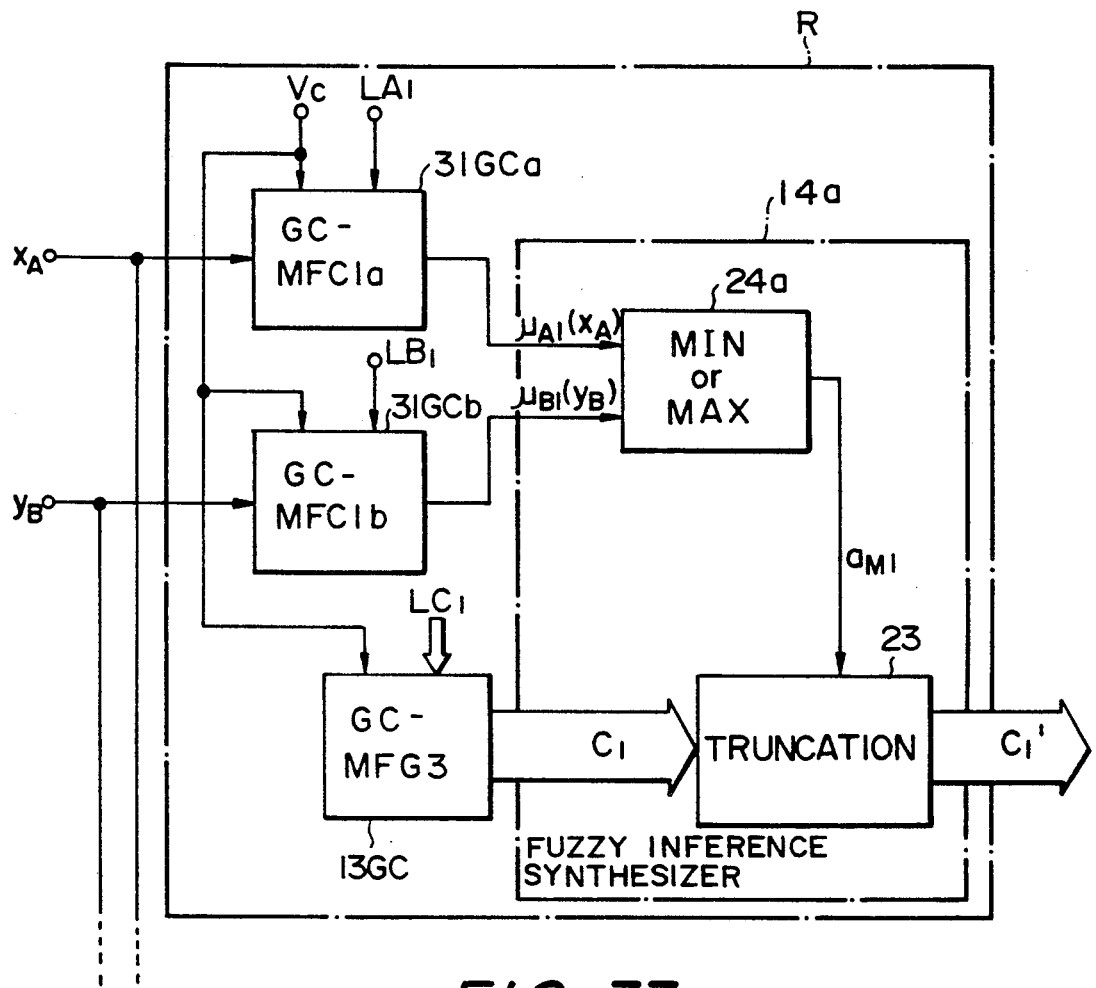
FIG. 32 is a block diagram illustrating a rule board for a parallel-type fuzzy controller which carries out weighting for each rule board.

To weight the membership functions of the membership function circuits, the grade-controllable membership function circuits (GC-MFC) described above are used. To weight the membership functions generated by the membership function generator circuits, grade-controllable membership function generator circuits (GC-MFG) to be described below are used. FIG. 32 illustrates one rule board R of the fuzzy controller of FIG. 14 rewritten to use such GC-MFC and GC-MFG circuits. FIG. 32, aside from the membership function circuits 31a and 31b and the membership function generation circuit I3 being replaced by GC-MFC 31GCa, 31GCb and GC-MFG 13GC, is exactly identical to one of the rule boards illustrated in FIG. 14. The maximum grades (peak value of the membership functions) of GC-MFC 31GCa, 31GCb and GC-MFG 13GC are all controlled by one grade control voltage $V_c$ to be exactly equal. This grade control voltage $V_c$ can be set manually from the outside, or it can be adjusted by a digital computer or the like based on the results of some sort of learning with respect to the controlled system for which the fuzzy controller is used.

The control voltage $V_c$ of the GC-MFC can be provided instead of the control voltage $V_c$ of the GC-MFC illustrated in FIG. 26 (comprising a combination of a grade control circuit 51 and a membership function circuit 31a or 31b).

The GC-MFG will be described hereafter.

Figure 33:
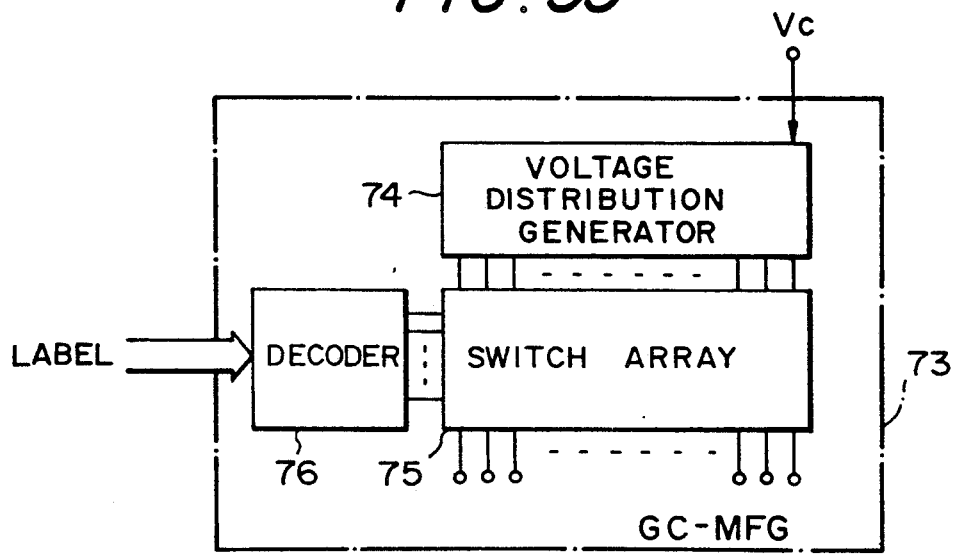
FIG. 33 is a block diagram illustrating the basic structure of a grade-controllable membership function circuit.

In FIG. 33, the GC-MFG 73 comprises a voltage distribution generator circuit 74 which generates the specified voltage distribution on a plurality of signal lines, a switch array 75 used to send the generated voltage distribution to the specified output signal line, and a decoder which deciphers the codes which represent the provided labels and controls the switches of switch array 75. The form of the voltage distribution generated by the voltage distribution generator circuit 74 is previously determined but the position on the output signal lines is changed by the switch array 75 controlled by the output of the decoder 76. Therefore, the voltage distribution representing the membership function corresponding to the given label will appear on the output lines. The grade (voltage value) of the voltage distribution generated by the voltage distribution generator circuit 74 is adjusted by the grade control signal $V_c$.

Several concrete examples of GC-MFG circuits will be described hereafter, and these will generate seven types of membership functions. The labels of these membership functions are the NL, NM, NS, ZR, PS, PM and PL labels described above. In addition, the number of points in the domain of variables of the membership function (corresponding to the number of elements in the fuzzy set) is limited to 25. Therefore, there are 25 output terminals from the membership function generator circuit.

Figures 34, 35:
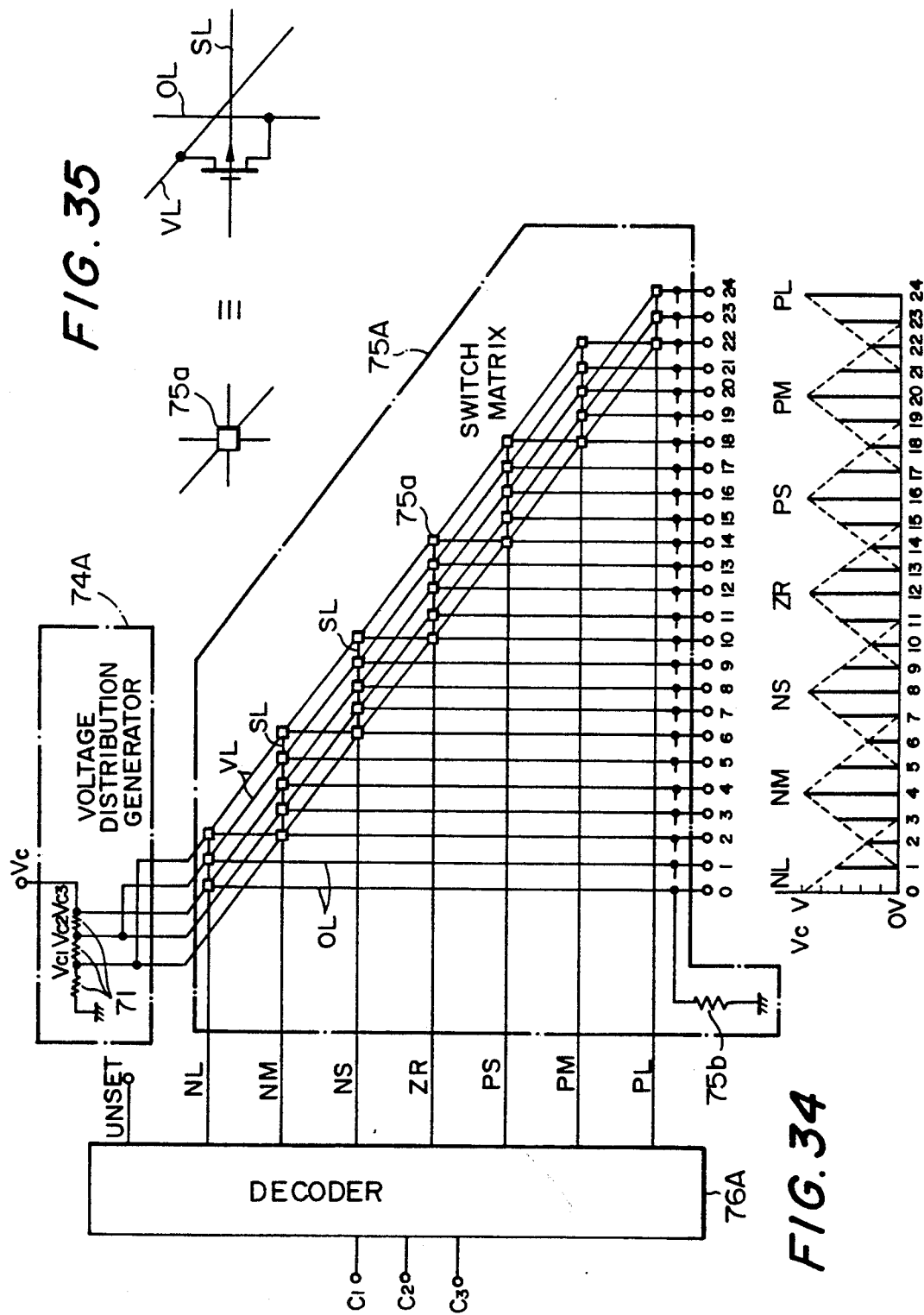

FIG. 34 and FIG. 35 illustrate an example of a GCMFG in which a switch matrix is used as the switch array. In FIG. 34, beneath the GC-MFG output terminals numbered from 0 to 24 are diagrammed the seven types of membership functions provided as output from these output terminals.

The output values of the fuzzy membership functions are quantized into four levels for simplicity. These four levels are 0, $V_{c1}$, $V_{c2}$, and and the maximum value of the control voltage $V_c$ is, for example, 5 V. These four levels of voltage are generated by a voltage distribution generator circuit 74A. This circuit 74A includes three resistors 71 connected in series, so the control voltage $V_c$ applied to this resistance circuit results in voltages of $V_{c1}$ and $V_{c2}$ at the points of connection to the resistors 71. Therefore, $V_{C1}=V_c/3$ and $V_{c2}=2V_c/3$. Five voltage lines VL from this voltage distribution generator circuit 74A are drawn on a slant in FIG. 34. The middle line is provided a voltage of $V_{C3}$, the lines to each side are provided with voltages of $V_{c2}$ and the outermost two lines with voltages of $V_{c1}$.

A decoder 76A is a 1-of-8 decoder. Input to the decoder 76A is a 3-bit ($c_1$, $c_2$ and $c_3$) binary signal representing the labels. The decoder 76A provides output of an H level signal on one of its eight output terminals depending on the code represented by the input signal. The eight output terminals correspond to "unset" or one of the seven labels described above. For example, if the input code is 000, an H level signal is generated on the unset output terminal, or if the input code is 001, an H level signal is generated on the NL output terminal. With the exception of the unset output terminal, signal lines SL lead from these output terminals as shown by the parallel lines on FIG. 34.

In the switch matrix 75A, 25 output lines OL lead from specified intersections of the voltage lines VL and signal lines SL. The symbols 75a indicated by small squares at these intersections, as shown in FIG. 35, are switches provided between the voltage lines VL and the output lines OL. The switches comprise MOSFETs, for example, and are toggled on and off by the voltage of the signal lines SL. Naturally, two or more switches 75a may be provided on one output line OL. Each of the output lines OL is grounded on its output terminal side through a resistor 75b.

In the above structure, when the label of a certain membership function is provided to the decoder 76A, a signal of the H (enable) level appears on the signal label SL which corresponds to that label, and the switches 75a provided on that signal line are turned on. As a result, the various voltages of the voltage distribution generator circuit 74A pass through the toggled-on switches 75a and through the output lines OL to appear at the corresponding output terminals, thus producing output of a voltage distribution representing the membership function described above. Furthermore, the grade of the output membership function is controlled by the control voltage $V_c$.

Figure 36B:
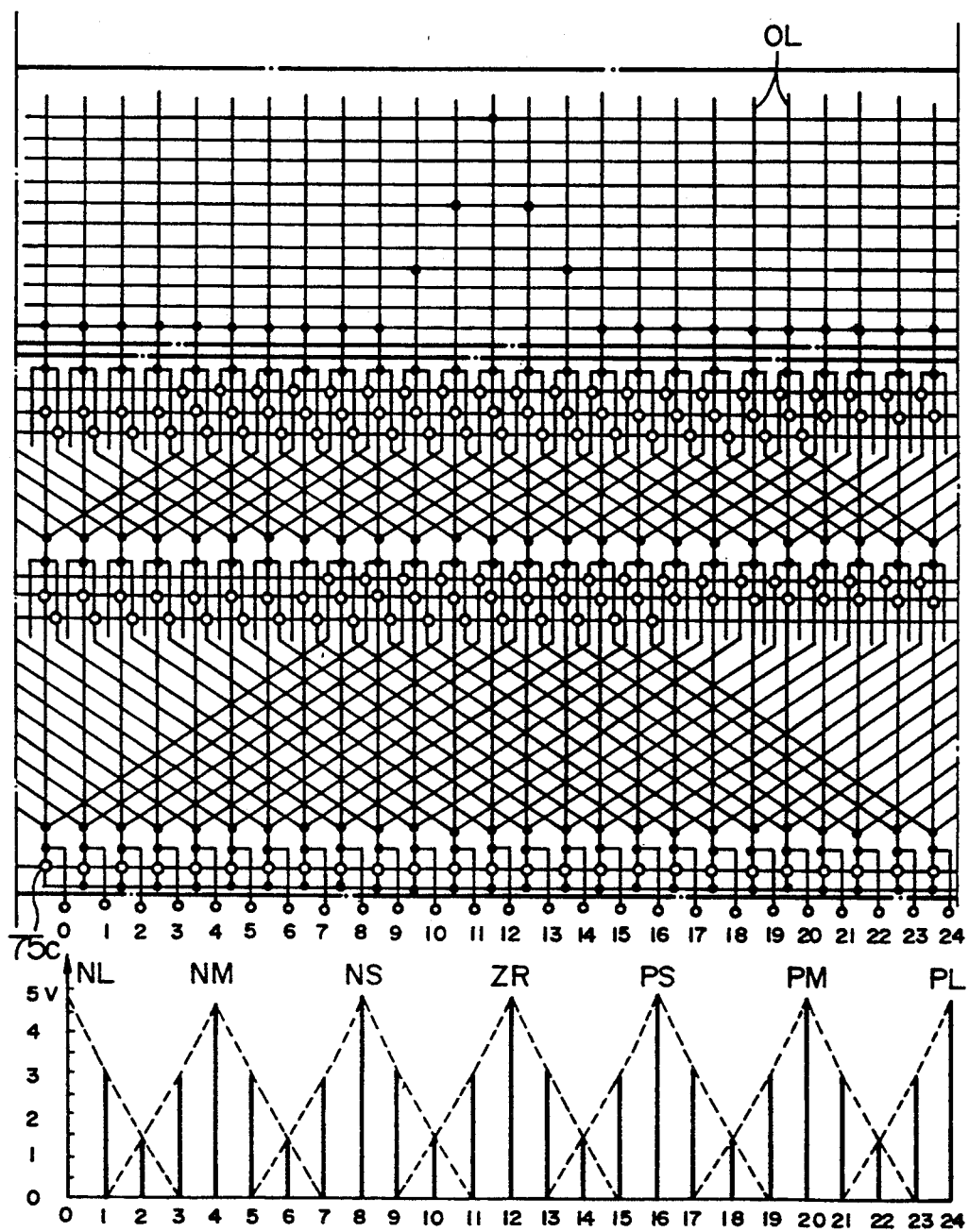
FIG. 36, consisting of FIGS. 36A, 36B and 36C, is a circuit diagram illustrating a grade-controllable membership function generator circuit realized through the use of a pass transistor array.
Figure 36C:
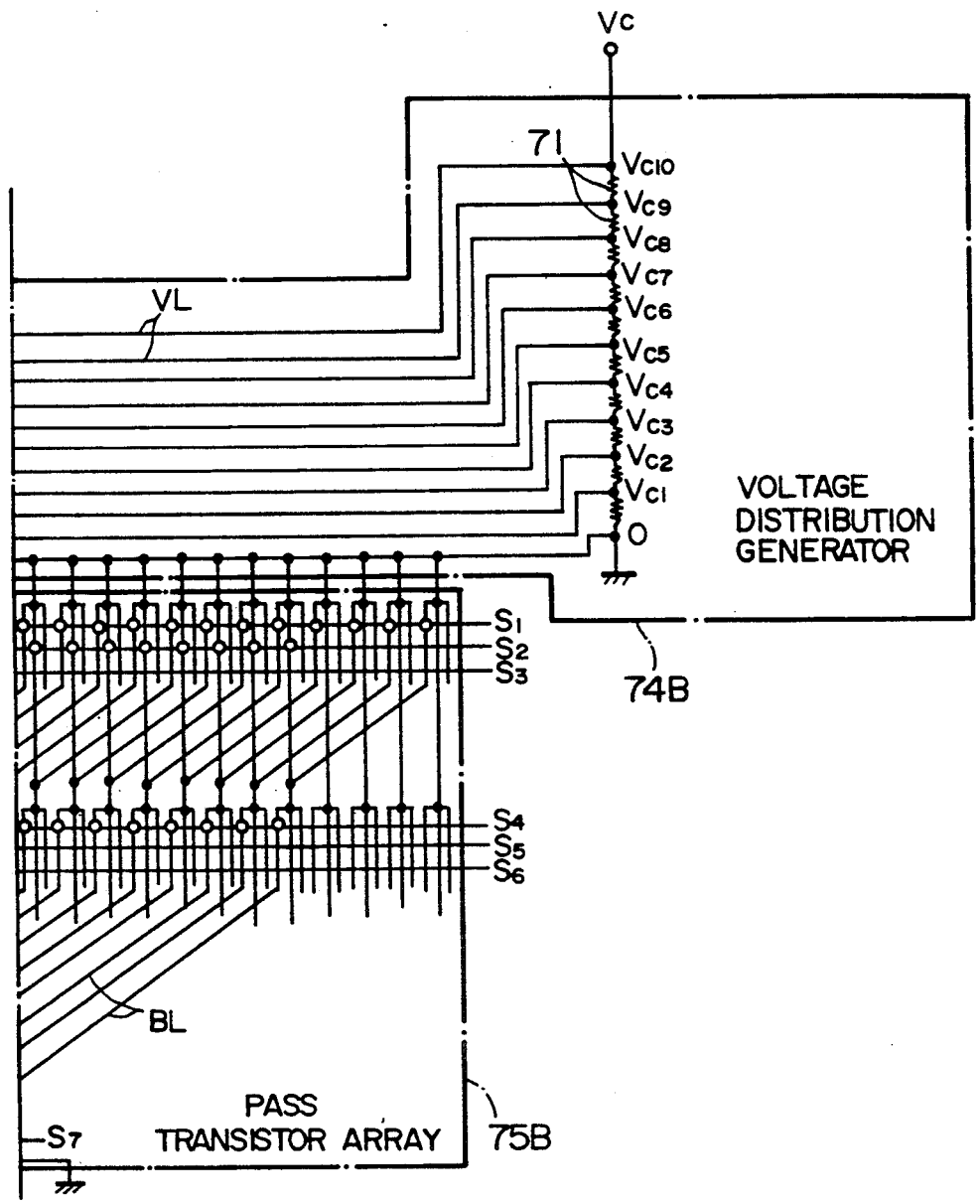

FIGS. 36 and 37 illustrate a GC-MFG which uses a pass transistor array as its switch array.

A voltage distribution generator circuit 74B quantizes the membership function into 11 discrete levels, having a voltage divider circuit made up of ten series resistors 71. The control voltage $V_c$ is applied to this voltage divider circuit. Appearing at the earth terminal and the junctions between resistors are the fuzzy truth value voltages 0, $V_{c1}=V_c/10$, $V_{c2}=2V_c/10$, . . . , $V_{c9}=9V_c/10$, and $V_{310}=V_c$, which represents the fuzzy truth values 0, 1/10, . . . , 9/10 and 1 respectively. These voltage $V_{c1}$ through $V_{C10}$ are also variable depending on the control voltage $V_c$. This voltage distribution generator circuit 74B is also equipped with a PROM programmed with the value of the membership function of the label ZR. This PROM is also provided with the voltage lines VL connected between the above voltage source and the ground, and the output lines OL connected through the pass transistor array to the output terminals. The PROM is comprised of two A layers, a top and bottom layer, such that the output lines OL are formed on the first layer, while the voltage lines VL are formed on the second layer. These two layers are insulated by an insulating layer of a material such as photosensitive polyimide. The shape of the membership function can be programmed by forming through holes between these two layers. Since the through holes can be formed using masked ROM technology, a membership function of any shape can be programmed. The black circles indicating nodes between a line VL and line OL indicate represent through holes. A voltage line VL and an output line OL are connected at the points where through holes are formed, so the fuzzy truth value voltages are transferred to the pass transistor array 75B. The nodes between two lines, a VL and an OL, can also be formed using field ROM technology, in which high voltage is applied to induce dielectric breakdown at the desired intersections, thus shortcircuiting the lines.

The pass transistor array 75B comprises output lines 0L extending from the voltage distribution generator circuit 74B, signal lines SL connected to the seven output terminals of the decoder 76A, diagonal lines BL used to shift the voltages at the intersections of these lines by four or eight digits to the right or left, along with switching devices which are PMOS FETs 75c provided at the junctions of the signal lines SL, output lines OL and the diagonal lines BL and controlled by the voltage of the signal lines SL. The connections of these switching devices 75c are illustrated in detail in FIG. 37. The seven signal lines SL connected to the decoder 76B and the rows of switching devices controlled by these lines are named switch row $S_1$, $S_2$, . . . , $S_7$ respectively. The notation $S_1$ through $S_7$ can also designate the signals on these lines SL.

Switch row $S_1$ shifts the membership function programmed in the voltage distribution generator circuit 74B four digits to the left, while switch rows $S_3$, $S_4$ and $S_6$ shift the function four digits to the right, eight digits to the left and eight digits to the right, respectively. Switch rows $S_2$ and $S_5$ do not shift the programmed membership function to the left or right, but rather send it directly to the output terminals. Switch row $S_7$ is a grounded switch array, so when this switch $S_7$ is on and the other switches $S_1$ through $S_6$ are off, the output terminals are dropped to ground level.

Figures 38, 40:
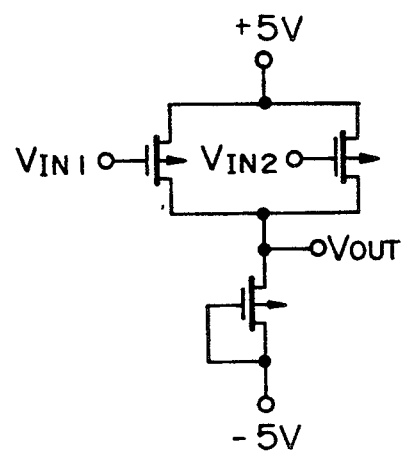
FIG. 38 is a table illustrating the operation of the decoder of FIG. 36.
FIG. 40 is a circuit diagram illustrating the NAND gate used in the circuits of FIG. 36.
Figure 39:
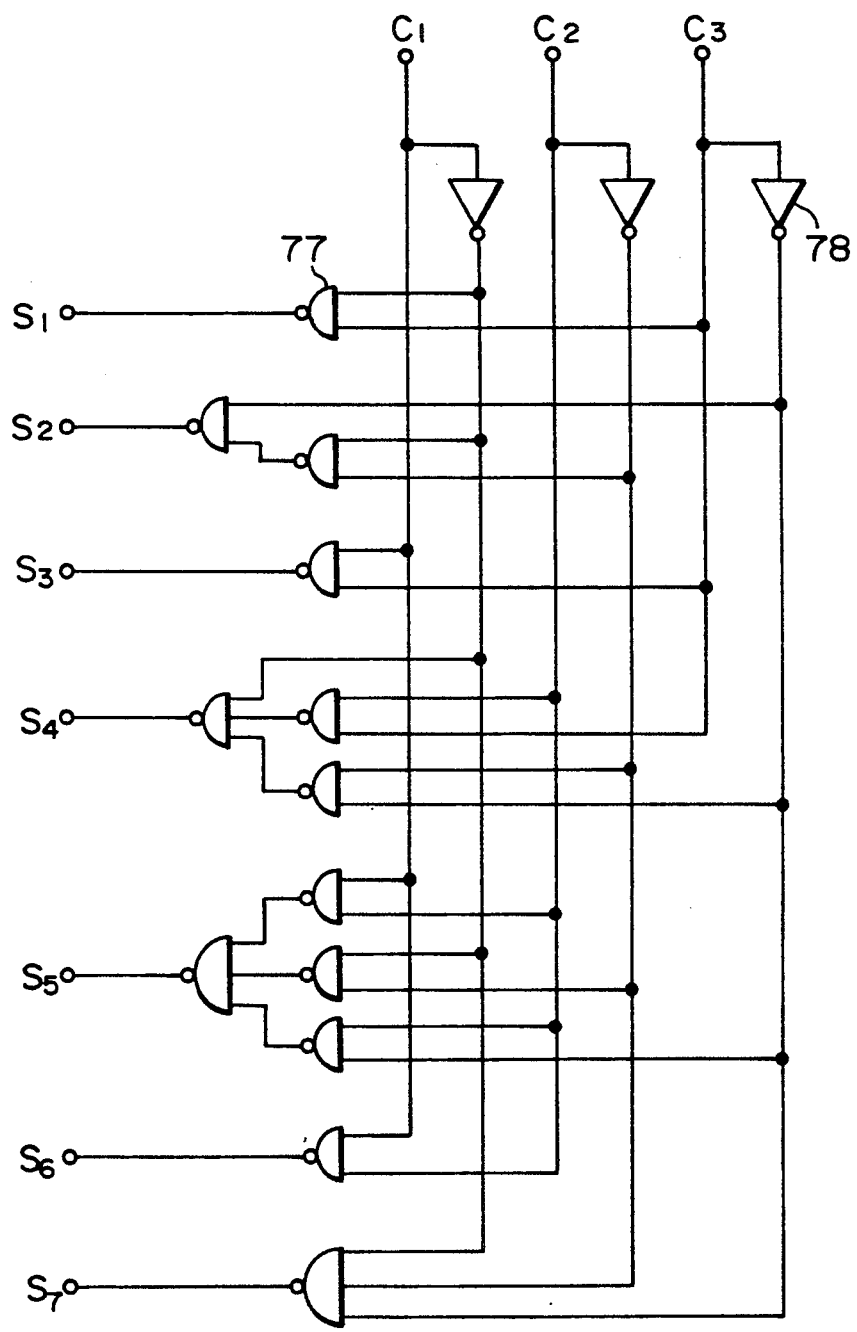
FIG. 39 is a circuit diagram illustrating the actual structure of the decoder of FIG. 36.

The relationship between the membership function labels and the binary levels of signals $S_1$ through $S_7$ is illustrated in FIG. 38. The decoder 76B converts the input of 3-bit binary signals $c_1$, $c_2$, and $c_3$ (either 0 V or +5 V) into the 7-bit binary signals $S_1$ through $S_7$ (either −5 V "L level" or +5 V "H level") according to the table shown in FIG. 38. As shown in FIG. 39, the decoder physically comprises a combination of NAND gates 77 and inverters 78.

For example when the input label is PL, switch rows $S_3$ and $S_6$ are toggled on. The membership function programmed in the voltage distribution generator circuit 74B passes through switch row $S_3$ and is shifted four digits to the right, and then passes through switch row $S_6$ and is shifted eight digits to the right. Therefore, the programmed membership function is shifted a total of 12 digits to the right, so the membership function appearing at the output terminals is PL (positive large).

In FIG. 36, the line VL connected to the ground level of the voltage distribution generator circuit 74B is connected to the central 25 output lines OL and an additional 12 lines both on the left and right, all of which are parallel to the output lines OL, along with the diagonal lines BL. Switch rows $S_1$, $S_2$, $S_3$, $S_4$ and $S_6$ are provided at the points of intersection of these lines and the signal lines SL. These lines and switches are provided to be certain that the ground level signal is provided to the output terminals no matter how the programmed membership signal may be shifted.

The pass transistor array 75B must pass the fuzzy truth value voltages (0 to 5 V) to the output terminals without attenuation. In normal PMOS circuits, when the fuzzy truth value voltage would be lower than the PMOS FET threshold voltage, the PMOS FET will not be completely in the on state if the gate voltage $V_G$ (decoder output) is 0 V. In order to put a PMOS FET completely in the on state, Ve must be approximately $-5$ V. For this reason, as described above, the decoder 76B is configured so that it generates output which takes the values $-5$ V (L) and $+5$ V (H). FIG. 40 illustrates an example of one of the NAND gates 77 which make up the decoder of FIG. 39 which generates these output signals $S_1$ through $S_7$.

In the above explanation, the fuzzy membership function is illustrated as being angular or triangular in shape. Yet many shapes are conceivable for the membership function, so it is preferable to be able to select a different shape if necessary.

Figure 41:
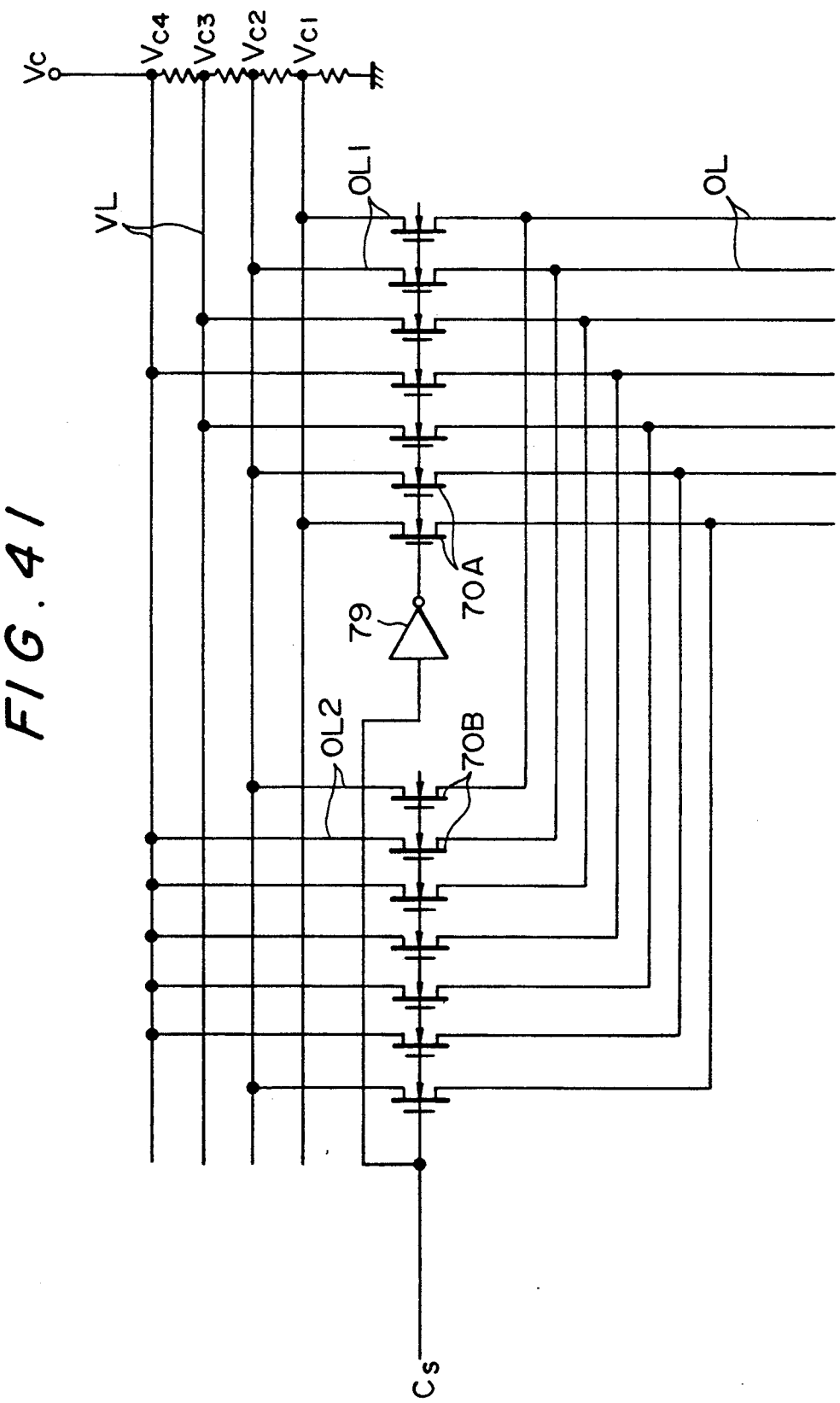
FIG. 41 is a circuit diagram illustrating a voltage distribution generator circuit which can select the shape of the membership function.

FIG. 41 illustrates a voltage distribution generator circuit which is applicable to the type of GC-MFG illustrated in FIG. 34, and in which the shape of the fuzzy membership function can be selected. Voltage lines VL are connected to nodes at which appear voltages $V_{c1}$ through $V_{c4}$ which controlled by control voltage $V_c$. One set of output lines OL1 is connected to voltage lines VL in such a way that a voltage distribution representing an angled or triangular fuzzy membership function shape is produced. Another set of output lines OL2 is connected in such a way that a voltage distribution representing a truncated triangle-shaped function shape is produced. Connected to each of these lines OL1 and OL2 are switching devices, NMOS FET 70A and 70B, and through the output side of these switching devices, the lines OLI and OL2 are connected to the output lines OL connected to the output terminals. The switching devices 70B are controlled directly by the selection signal c, while the devices 70A are controlled indirectly through an inverter 79.

When the selection signal $c_S$ is L level, the switching devices 70A are on, so voltages representing an angled or triangular fuzzy membership function shape are produced on the output lines OL. When the selection signal $c_S$ is H level, the switching devices 70B are on, so voltages representing a truncated triangle-shaped function shape are produced. Thus the shape of the fuzzy membership function can be selected.

In the circuits of FIG. 41, if the threshold value voltage is $V_{TH}$ (normally approximately 1 V), the binary levels of the selection signal c which controls this FET should be set so the L level is $V_{TM}$ or less, and H is $+5$ V or more. In this case, 5 V is the maximum voltage of the control voltage $V_c$.

The shape of the voltage distribution generated by the voltage distribution generator circuit, and hence the shape of the fuzzy membership function is not limited to the two shapes described above, but rather three or more shapes can be created in advance and one of them may be selected. Naturally, selection of the function shape is also applicable to the GC-MFG illustrated in FIG. 36.

Figure 42:
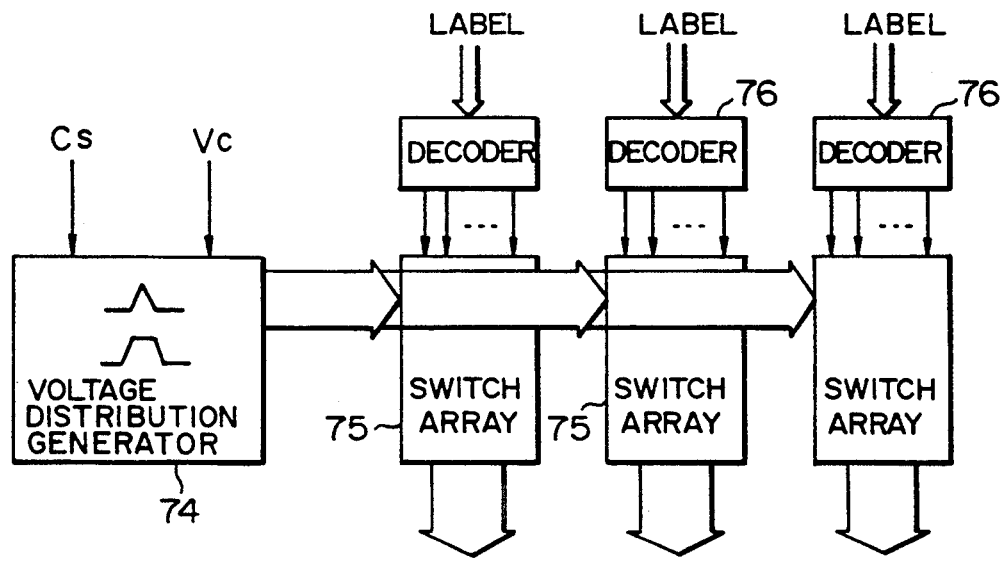
FIG. 42 is a block diagram illustrating the progression of a grade-controllable membership function generator circuit.

The voltage distribution generator circuit generates a voltage signal which is distributed over a plurality of lines. Therefore, the output voltages from one voltage distribution generator circuit may be provided to a plurality of switch arrays 75. FIG. 42 illustrates a GC-MFG which contains one voltage distribution generator circuit 74 and a plurality of switch arrays 75 to which this output voltage is provided. Each of the switch arrays 75 is driven by its own decoder 76. The various decoders may be provided with code signals of the same or different labels. Therefore, a plurality of voltage distributions representing the same or different membership functions may be obtained from this GC-MFG. Furthermore, the grades of this plurality of membership functions are equally and simultaneously controlled by means of the control voltage $V_c$.

The GC-MFG illustrated in FIG. 42 is particularly suited for use in the parallel type fuzzy computers illustrated in FIGS. 4 and 5. In this case also, the grade for each implication can naturally ge controlled.

The GC-MFG is can also be applied to the sweep type fuzzy computer illustrated in FIG. 8. In this case also, it is preferable to adjust the grade for each implication.

(6) GC-MFC

Figures 47, 47A:
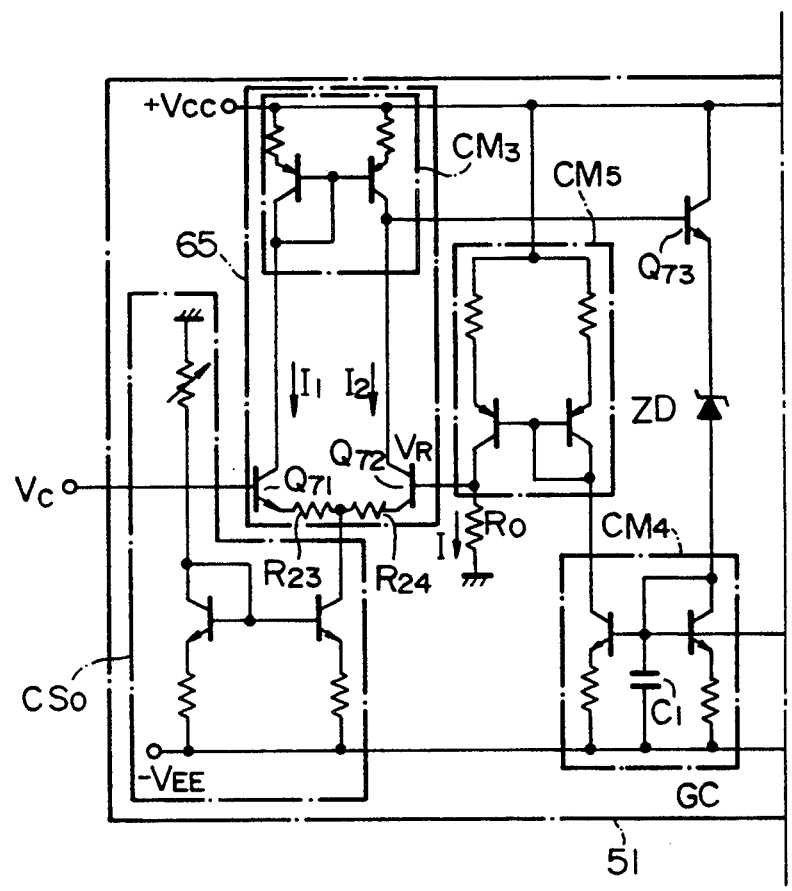
FIG. 47, consisting of FIGS. 47A and 47B, is a block diagram illustrating a concrete example of the structure of a grade-controllable membership function circuit.
Figure 47B:
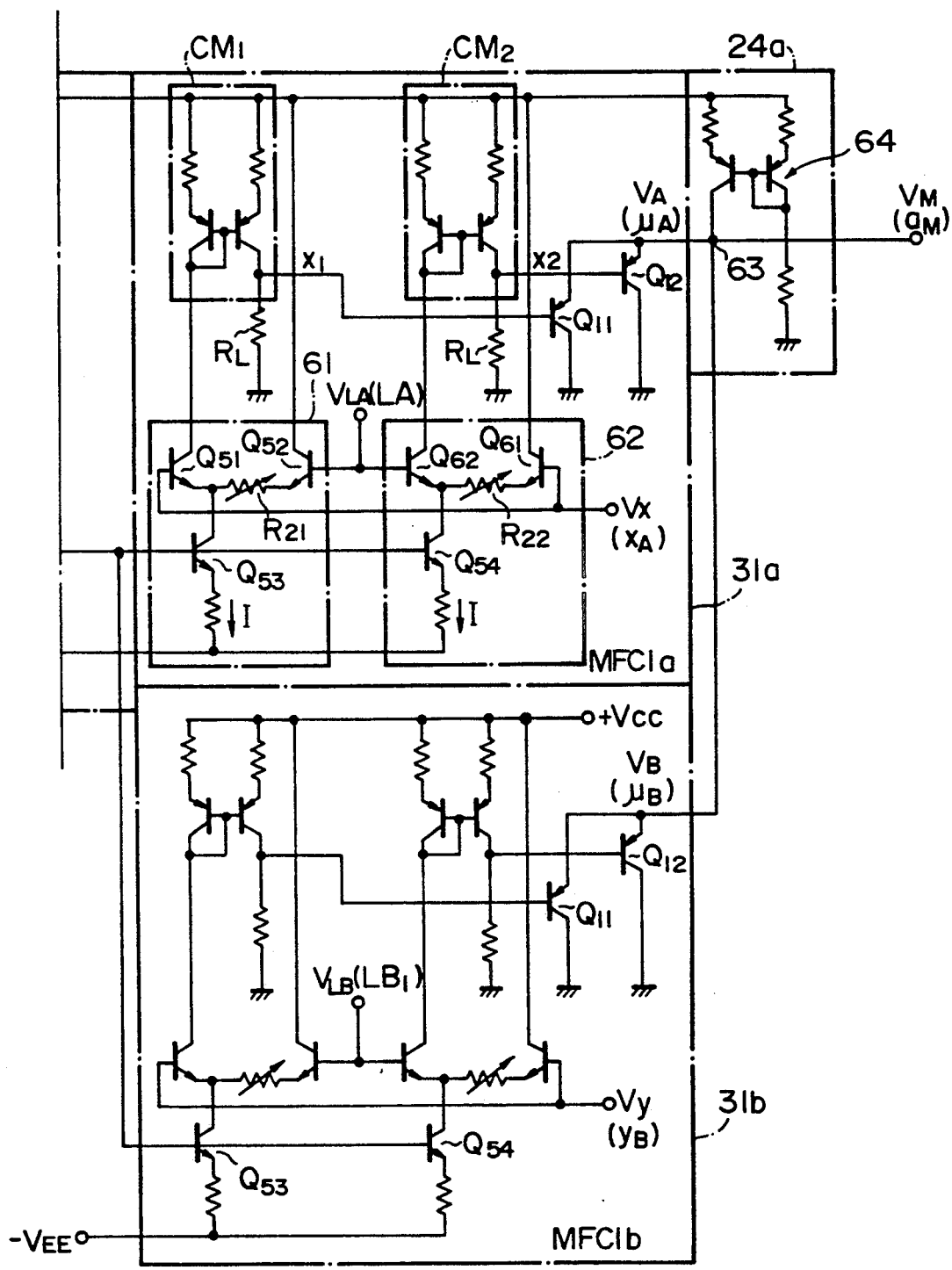

Next, a specific example of a GC-MFC will be explained in reference to FIG. 47. Since the membership function circuits 31a and 31b generate membership functions represented by voltages, their labels $LA_1$ and $LB_1$ are provided as voltages (these label voltages are $V_{LA}$ and $V_{LB}$ respectively), while the inputs $x_A$ and $y_B$ are also provided as voltage signals (these input voltage signals are $V_X$ and $V_Y$ respectively). The membership function circuits 31a and 31b provide output voltage signals which represent the triangular membership function $MF_1$ described above. Since the two membership function circuits 31a and 31b have identical structures, only the one circuit 31a will be described. Since the membership function circuit 31a includes differential circuits 61 and 62, the operation of these circuits will be described using the differential circuit 62 as an example with reference to FIGS. 48 and 49.

Figure 48:
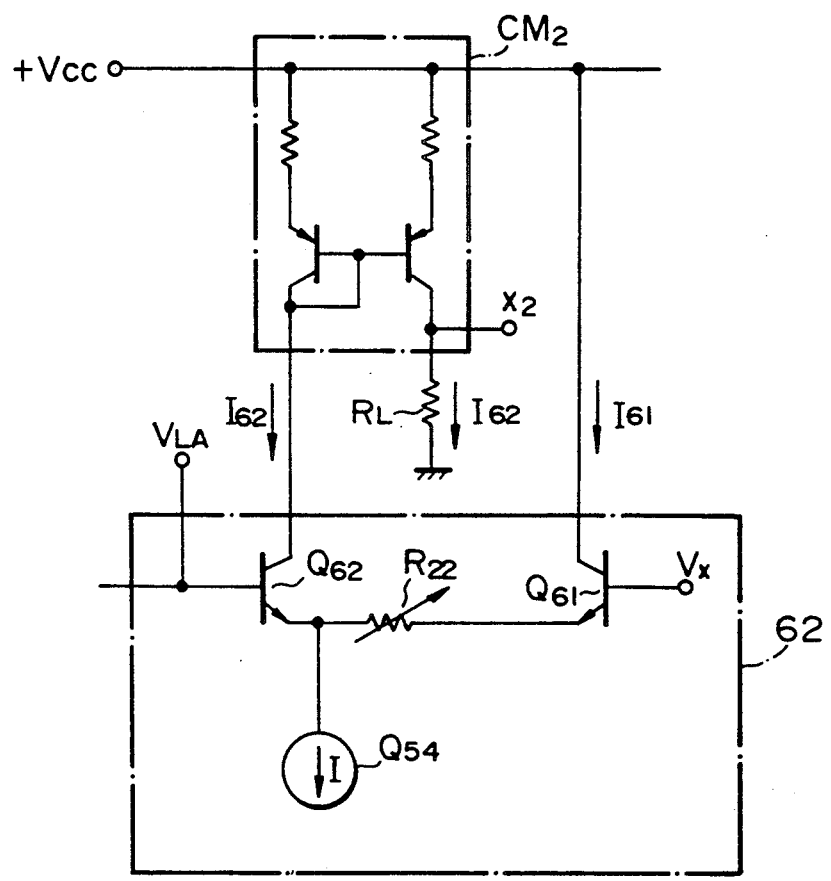
FIG. 48 is a circuit diagram used to explain a membership function circuit, illustrating part of the circuit in detail, while FIG. 49 (A) through (E) are graphs illustrating the signals of the circuit.

In FIG. 48, the differential circuit 62 includes two transistors $Q_{61}$ and $Q_{62}$ with a variable resistor $R_{22}$ connected between the emitters of these transistors. An input voltage $V_x$ is provided to the base of one of the transistors, $Q_{61}$, (this will become the input terminal for the membership function circuit), while a voltage $V_{LA}$ representing a label is provided to the base of the other transistor, $Q_{62}$. A current I is supplied by the current source to the emitters of both transistors $Q_{61}$ and $Q_{62}$.

Figure 49A:
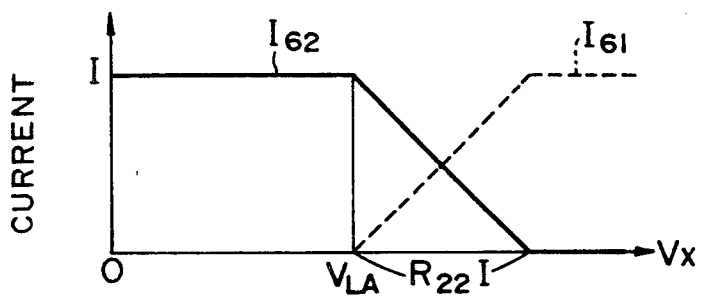
Figure 49B:
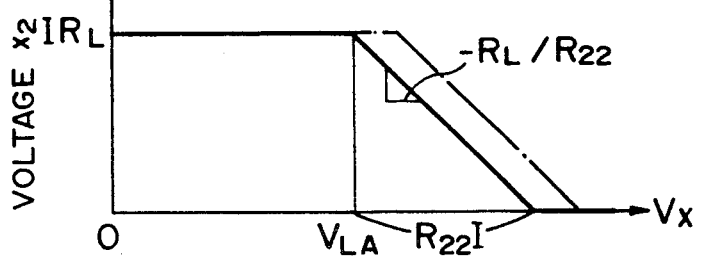

Assuming the current flowing in transistor $Q_{61}$ to be $I_{61}$, and the current flowing in transistor $Q_{62}$ to be $I_{62}$, as shown in FIG. 49(A), when $V_x < V_{LA}$, the current I flowing in transistor $Q_{62}$ is $I_{62}$, but no current flows in transistor $Q_{61}$ ($I_{62} = 0$). If the input voltage $V_x$ becomes greater or equal to the label $V_{LA}$, the transistor $Q_{62}$ current $I_{62}$ will decrease linearly and the current $I_{61}$ flowing in transistor $Q_{62}$ will increase linearly from 0.

When $V_x = V_{LA} + R_{22}I$, $I_{62} = 0$ and $I_{62} := I$, and this state will be maintained in the region over which $V_x$ becomes even larger.

A current mirror $CM_2$ is provided, and this current mirror is driven by the current $I_{62}$ flowing in the transistor $Q_{62}$. Connected to the output side of the current mirror $CM_2$ is a resistor $R_L$, and the voltage appearing at this resistor $R_L$ is the voltage $x_2$. Since the voltage $x_2$ is provided as $x_2 = I_{62}R_L$, this voltage $x_2$ will change as the solid line in FIG. 49(B) with respect to changes in the input voltage $V_x$. The slope of the section in which voltage $x_z$ is changing linearly is given as $-R_L/R_{22}$. Therefore, this slope can be changed by changing the resistance value of resistor $R_{22}$.

Figure 49C:
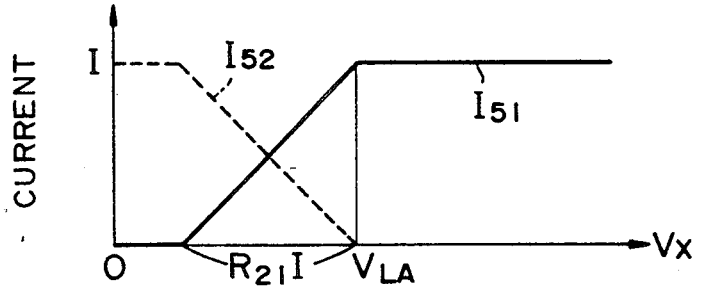
Figure 49D:
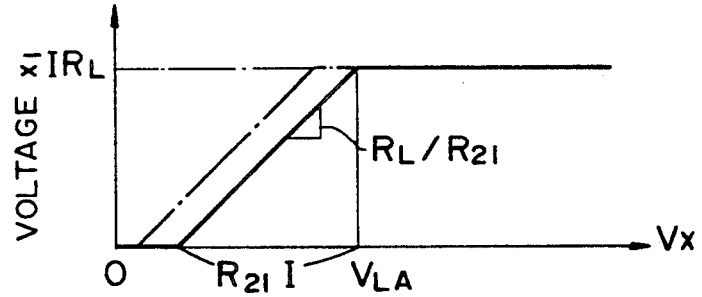

The other differential circuit 61 in FIG. 26 has the same structure as differential circuit 62. The currents flowing in transistor $Q_{51}$ which provides the input voltage $V_x$ and in transistor $Q_{52}$ which provides the label voltage $V_{LA}$ are $I_{51}$ and $I_{52}$ respectively, and these currents vary with the input voltage $V_x$ as shown in FIG. 49(C).

A current mirror $CM_1$ is driven by the current $I_{51}$ flowing in the transistor $Q_{51}$. Since the current $I_{51}$ is flowing through a resistor $R_L$ connected to the output side of the current mirror $CM_1$, the dropping voltage $x_1$ at the resistor $R_L$ is $x_1 = I_{51}R_L$. The changes in voltage $x_1$ with respect to the input voltage $V_x$ are represented by the solid line in FIG. 49(D). The slope of the section in which voltage $x_1$ is increases linearly is given as $R_L/R_{21}$. Resistor $R_{21}$ is the resistor connected between the emitters of the two differential circuit 61 transistors $Q>$: and $Q_{52}$, so this slope can be changed by changing the resistance value of this resistor $R_{22}$.

The membership function circuit 31a includes a 2-input MIN circuit. The voltages $x_1$ and $x_2$ described above are provided to the bases of transistors $Q_{11}$ and $Q_{12}$ which comprise the MIN circuit. The output voltage $V_{A1}$ ($\mu_A$) is the result of a MIN operation on the voltages $x_1$ and $x_2$, a graph of which is shown as the solid line on FIG. 49(E). The output voltage $V_A$ becomes triangularly shaped with respect to input voltage $V_x$, representing the triangular membership function $MF_1$. Furthermore, the input voltage corresponding to the peak value is the label voltage $V_{LA}$. Depending on the resistors $R_{21}$ or $R_{22}$, the slope will vary as shown by $SL_1$ and $SL_2$ on FIG. 1B.

Similarly, the other membership function circuit 31b also uses a set label voltage $V_{LB}$ to obtain an output voltage $V_{B1}$ representing a membership function value ($\mu_B$) corresponding to the input voltage $V_y$.

The MIN circuit 24a (included in the fuzzy inference synthesis circuit 14a, see FIG. 15) includes a wired OR 63 and a current source 64. Furthermore, the output voltages $V_A$ and $V_B$ of the above membership function circuits 31a and 31b are provided to this wired OR 63. The output of the wired OR becomes the voltage $V_M$ which represents the results of the MIN operation corresponding to $a_{M1}$ ($a_M$).

To describe this in further detail, transistors $Q_{11}$ and $Q_{12}$ of membership function circuit 31a, transistors $Q_{11}$ and $Q_{12}$ of membership function circuit 31b, the wired OR 63 and the current source 64 comprise a 4-input MIN circuit.

Figure 49E:
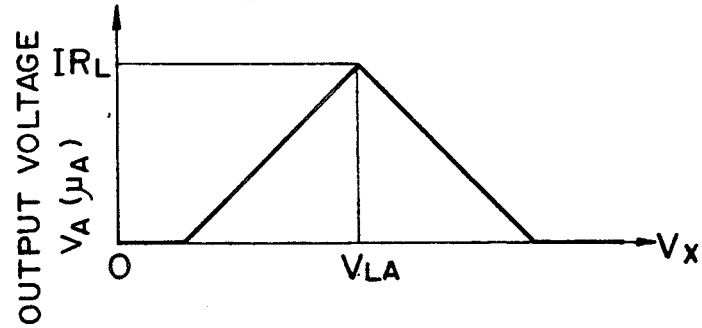

As can be seen from the graph of FIG. 49(E), the peak value of the membership function of membership function circuits 31a and 31b is determined by $IR_L$. If resistance $R_L$ is constant, the peak value varies as the current I changes.

The grade control circuits 51 are used to vary the current I depending on a given control voltage $V_c$. The grade control circuits 51 include a current mirror $CM_4$ which acts as a current source. This current mirror $CM_4$, transistors $Q_{53}$ and $Q_{54}$ which act as the current source for the membership function circuit 31a and transistors $Q_{53}$ and $Q_{54}$ which act as the current source for the membership function circuit 31b comprise a multicurrent mirror. Therefore, a current equal to the current I which flows through the current mirror $CM_4$ will flow through these transistors $Q_{54}$ and $Q_{54}$. The current mirror $CM_4$ contains a capacitor $C_1$. This capacitor $C_1$ is a capacitor used for phase compensation. As shown in FIG. 18, this capacitor can prevent fluctuations when the output of the voltage regulator circuit 4 is fed back to the input $V_C$ of the grade control circuit 51.

This current mirror $CM_4$ drives another current mirror $CM_5$. The collector of one of the current mirror $CM_5$ transistors is connected to a resistor $R_c$. Since a current I flows through this resistor $R_o$, the voltage $V_R = IR_o$ appears.

The grade control circuit 51 is provided with a differential circuit 65 and a current source $CS_o$. The differential circuit 65 includes two transistors $Q_{71}$ and $Q_{72}$, the emitters of which are connected to two resistors $R_{23}$ and $R_{24}$ of the same resistance values, and their point of connection is connected to the output side of current source $CS_o$.

The base of one of the transistors $Q_{71}$ is provided with the control voltage $V_c$, while the base of the other transistor $Q_{72}$ is provided with the above voltage $V_R$. If these voltages $V_c$ and $V_R$ are equal, an equal current will flow through the two transistors $Q_{71}$ and $Q_{72}$ from the current mirror $CM_3$.

If these voltages $V_c$ and $V_R$ are not equal, a difference in the currents $I_1$ and $I_2$ flowing through the two transistors will occur. The current mirror $CM_3$ acts to keep equal currents flowing through the two transistors $Q_{71}$ and $Q_{72}$, so any difference in currents $I_1$ and $I_2$ will flow to the base of transistor $Q_{73}$ connected to the collector side of transistor $Q_{72}$, so current of a value the amplification factor $\beta$ times this difference will flow through emitter of transistor $Q_{73}$. The emitter of transistor $Q_{73}$ is connected to the current mirror $CM_4$ through a Zener diode ZD, so the current flowing through the current mirror $CM_4$ will change. This change in current will appear as a change in the current I flowing through the resistor $R_o$, acting to make the voltage $V_R$ equal to the control voltage $V_c$. The Zener diode ZN gives the emitter of transistor $Q_{73}$ an appropriate potential, but can also be replaced by providing a plurality of transmitters.

Assuming the difference between the voltages $V_c$ and $V_R$ to be $\Delta V$, and that $R_{23} = R_{24} < = r_e$, the current I and voltage V are found by the following equations.

$$\begin{aligned} I &= (1/r_e) \cdot \beta \cdot \Delta V \\ V_R &= R_o \cdot I = (1/r_e) \cdot \beta \cdot \Delta V \\ &= (1/r_e) \cdot \beta \cdot R_o(V_c - V_R) \end{aligned}$$

Therefore, $$V_R = [(1/r_e) \cdot \beta \cdot R_o / \{1 + (1/r_e) \cdot \beta \cdot R_o\}] \cdot V_c$$

and assuming $(1/r_e) \cdot \beta \cdot R_o \gg 1$, $$V_R = V_c.$$

Therefore, the current I flowing in resistor $R_o$ becomes $$I = V_c/R_o.$$

In this way, the current I will be controlled by the control voltage $V_c$, and the peak voltage of the membership function circuits 31a and 31b will be controlled so that the output voltage $V_{o2}$ of the simple addition circuit 3 will be 1.

(7) Other Preferred Embodiments of the Center of Gravity Determination Circuit FIG. 50 illustrates the overall structure of a center of gravity determination circuit. The input to this center of gravity determination circuit is fuzzy information. This fuzzy information may represent the output of inference results from the fuzzy inference synthesis circuit of a fuzzy controller or the fuzzy inference engine of a fuzzy computer, or it may represent an inference in progress, as long as it represents a membership function generated by a membership function generator circuit.

A total of n signal lines $l_1, l_2, l_3, \ldots, l_i, \ldots, l_{n-1}$, and $l_n$ are provided, and the fuzzy information is represented by an electrical signal (voltage or current). Fuzzy information can also be referred to as fuzzy sets (membership functions), and these fuzzy sets (membership functions) are sets of grades (function values) corresponding to a plurality of elements (variables).

Figure 51:
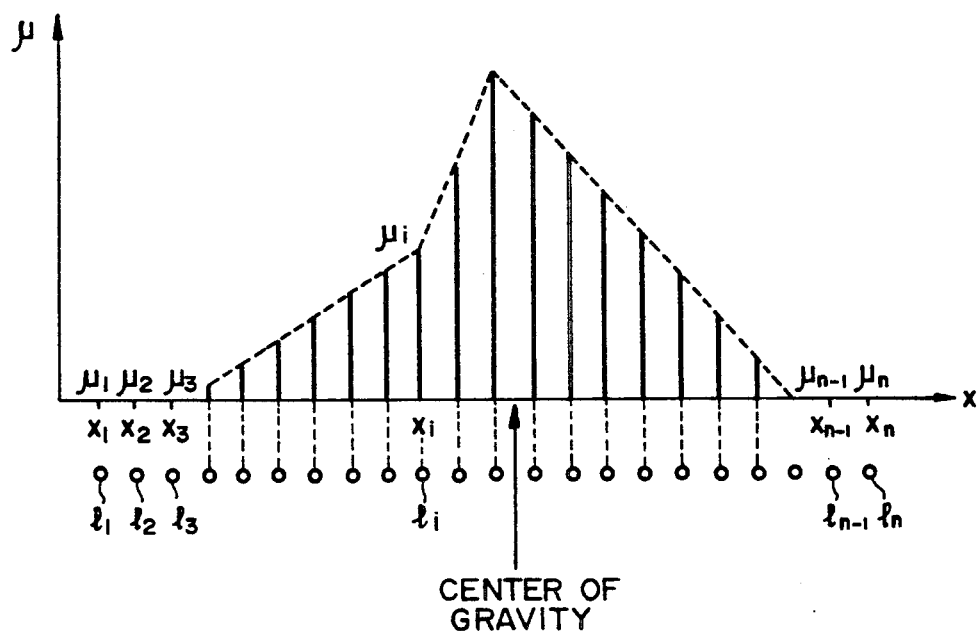
FIG. 51 is a graph used to explain fuzzy information and its center of gravity.

FIG. 51 illustrates one example of fuzzy information. The elements of the fuzzy set (or the variables of the membership function) are represented by x, assuming the discrete values $x_1, x_2, x_3, \ldots, x_i, \ldots, x_{n-1}$, and $x_n$. These elements (or variables) are embodied by means of a plurality of signal lines $l_1$ through $l_n$. The grades (function values corresponding to the variables) $\mu_1, \mu_2, \mu_3, \ldots, \mu_i, \ldots, \mu_{n-1}$, and $\mu_n$ are represented on these lines $l_1$ through $l_2$ by analog voltage or current signals.

In the following discussion, the grades $\mu_l$ through $\mu_n$ are represented by voltages. Therefore, for convenience, the voltages representing the grades $l_l$ through $\mu_n$ are also expressed as $\mu_l$ through $\mu_n$.

The center of gravity CG (position on the x axis) of the fuzzy information is found with the following equation.

$$CG = \sum_{i=1}^{n} \mu_i x_i \Big/ \sum_{i=1}^{n} \mu_i \quad (11)$$

As is clear from equation (1), multiplication, addition and division are required to find the center of gravity CG. By means of the center of gravity determination circuit of FIG. 50, the center of gravity CG can be found without multiplication or division, but by using addition only.

Equation (1) is transformed as follows.

$$\begin{aligned} CG &= \sum_{i=1}^{n} \mu_i x_i \Big/ \sum_{i=1}^{n} \mu_i \\ &= k \sum_{i=1}^{n} \mu_i x_i \Big/ k \sum_{i=1}^{n} \mu_i \\ &= \sum_{i=1}^{n} (k\mu_i) x_i \Big/ \sum_{i=1}^{n} (k\mu_i) \end{aligned} \quad (12)$$

If the denominator of equation (12) is adjusted to be 1, the center of gravity CG would be represented by the following equation.

$$CG = \sum_{i=1}^{n} (k\mu_i) x_i \quad (13)$$

In FIG. 50, the n signal lines $l_i$, upon which the voltages $\mu_i$ representing the fuzzy information are distributed, are connected to the input side of a variable coefficient array 5. The operation of multiplying the voltages $\mu_i$ by the coefficient k ($k\mu_i$) is carried out by the variable coefficient array 5.

The output of the variable coefficient array 5 ($k\mu_i$) *($1 \leq i \leq n$) is provided to a weighted addition circuit 2. The output of the weighted addition circuit 2 is a voltage signal representing the center of gravity CG which is calculated with the right side of equation (13), namely, $$\sum_{i=1}^{n} (k\mu_i) x_i.$$

The output of the variable coefficient array 5 ($k\mu_i$) ($1 \leq i \leq n$) is also provided as input to a simple addition circuit 3. This simple addition circuit 3 calculates the denominator $$\sum_{i=1}^{n} (k\mu_i)$$

of equation 12, and the output which represents the calculation results is provided as input to one input terminal of a voltage regulator circuit (comparator or differential circuit) 4.

A voltage equivalent to grade 1 of the fuzzy information is provided to the other input terminal of the voltage regulator circuit 4. The various grades representing fuzzy information can take any value in the range 0 to 1. By means of the output signal from this voltage regulator circuit 4, the coefficients k in the variable coefficient array 5 are adjusted so that the output of the simple addition circuit 3 is always 1.

Figure 52:
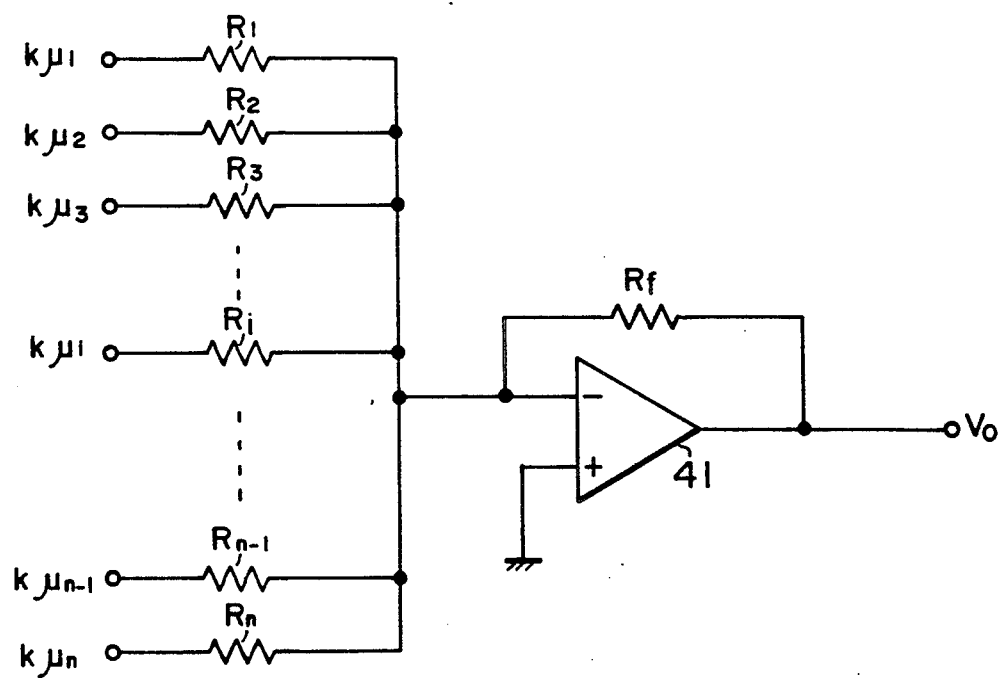
FIG. 52 is a circuit diagram illustrating an example of a weighted addition circuit.

FIG. 52 illustrates a specific example of the construction of the weighted addition circuit 2. The output $k\mu_1$, $k\mu_2, k\mu_3, \ldots, k\mu_i, \ldots, k\mu_{n-1}$, and $k\mu_n$ from the variable coefficient array 5 is provided as input to input side of an operational amplifier circuit 41 through resistors $R_1$, $R_2, R_3, \ldots, R_i, R_{n-1}$, and $R_n$. A feedback resistor $R_f$ is provided across the operational amplifier circuit 41.

Therefore, the output voltage $V_o$ of the operational amplifier circuit 41 is given by the following equations.

$$V_o = -[(R_f/R_1)k\mu_1 + (R_f/R_2)k\mu_2 + \ldots + (R_f/R_i)k\mu_i + \ldots + (R_f/R_n)k\mu_n] \quad (14)$$

Setting $$R_f/R_i = x_i \ldots \quad (15)$$

simplifies equation (14) to $$V_o = - \sum_{i=1}^{n} (k\mu_i)x_i. \qquad (16)$$

This equation is essentially equivalent to equation (13) described above. The minus sign merely indicates that the voltage is reversed, so if necessary, an inversion (amplifier) circuit can be used to make this a positive value.

As is clear from equation (15), the elements (variables) $x_1$ of fuzzy information (membership functions) embodied as a row position in the signal lines $l_1$ are expressed in the weighted addition circuit 2 as the input side resistors $R_i$.

The simple addition circuit 3 can be readily understood by taking the structure of the weighted addition circuit illustrated in FIG. 52 and setting the input-side resistors $R_i$ ($1 \leq i \leq n$) all to the same resistance value.

The variable coefficient array 5 may be realized by various means. For example, it could be realized by providing each line with an amplification circuit of a magnification k which is variable depending on the output voltage of the voltage regulator circuit 4, or it could also be realized by simultaneously changing the resistance value of the input resistors ($R_l$ through $R_4$, etc.) of the weighted addition circuit 2 and the simple addition circuit 3. Additionally, a MOS FET can be used instead of the feedback resistor as illustrated in FIG. 53.

Figure 53:
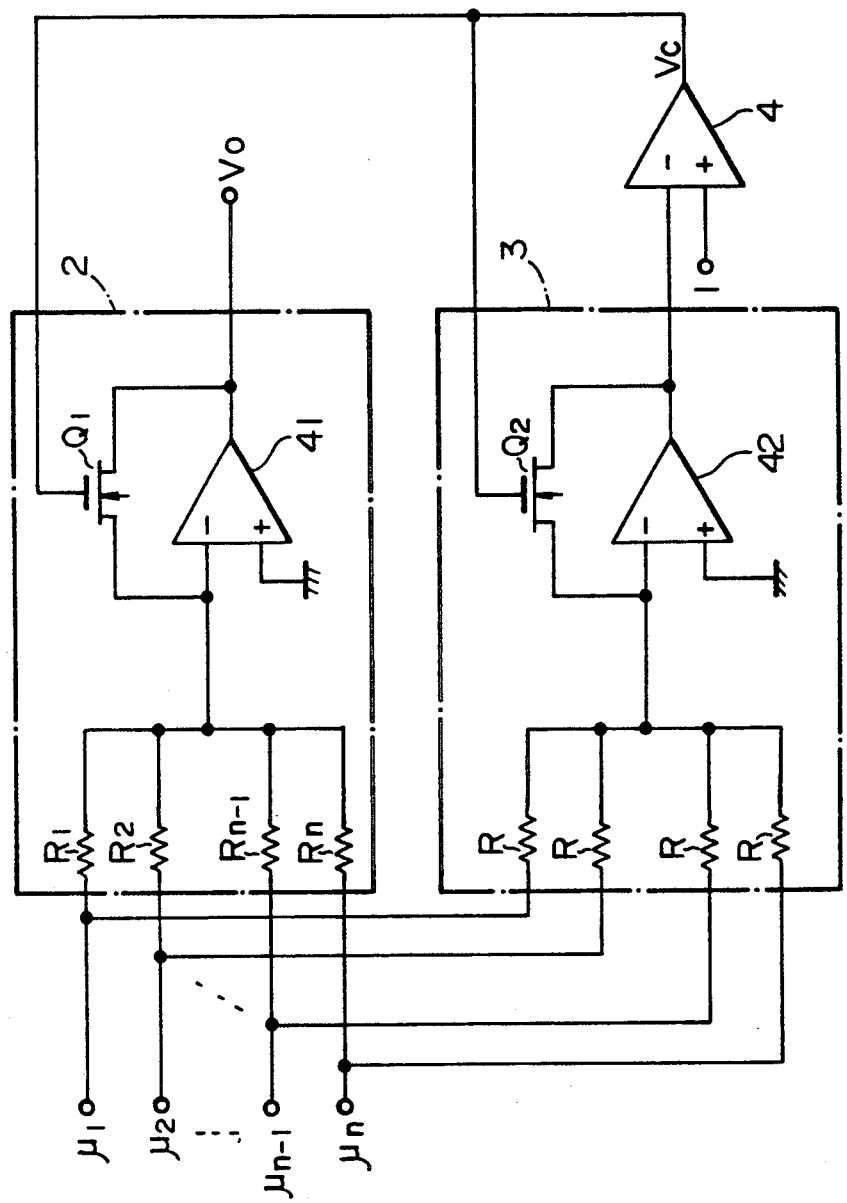
FIG. 53 is a circuit diagram illustrating an example of a variation.

In FIG. 53, the weighted addition circuit 2 comprises an operational amplifier circuit 41, a plurality of input resistors $R_l$ through $R_n$, and n MOS FET transistors $Q_1$. The simple addition circuit 3 comprises an operational amplifier circuit 42, a plurality of input resistors R, and n MOS FET transistors $Q_2$. By controlling these MOS FET transistors $Q_1$ and $Q_2$ by means of the output voltage $V_c$ of the voltage regulator circuit 4, their resistance between source and drain will be changed so the gain values $k_1$ and $k_2$ of these addition circuits 2 and 3 will change, so that the output of the simple addition circuit 3 is always 1. Employing the good linearity of MOS FET drain characteristics is preferable. In this preferred embodiment, equation (12) can be expressed in this manner:

$$CG = k_1 \sum_{i=1}^{n} \mu_i x_i / k_2 \sum_{i=1}^{n} \mu_i$$

$$CG = k_1 \sum_{i=1}^{n} \mu_i x_i \qquad (17)$$

In addition, these input resistors $R_l$ through $R_n$ and R can also be replaced by MOS FET. In this case, conversion to an IC is particularly preferable.

What is claimed is:

1. A fuzzy computer having gradecontrollable membership function circuits, comprising:
    (a) at least one membership function circuit which provides output signals representing membership functions in response to input signals;
    (b) a fuzzy inference engine which executes specified fuzzy inference operations on the output signals representing membership functions from said membership function circuit, and provides output signal representing inference results distributed over a plurality of output lines;
    (c) a weighted addition circuit which multiplies electrical signals representing output signals from said fuzzy inference engine by a predetermined coefficient for each of said plurality of output lines of the fuzzy inference engine, adds the multiplied results and outputs those as a center of gravity of the fuzzy inference results;
    (d) a simple addition circuit which adds the signals representing the inference results provided form said fuzzy inference engine; and
    (e) a grade control circuit which compares an output signal from said simple addition circuit to a predetermined reference signal, feeds back the compared result to said membership function circuit, and controls the level of output signals from said membership function circuit so that the output signal of said simple addition circuit represents a value equivalent to "1".

2. A fuzzy computer having grade-controllable membership function circuits according to claim 1, wherein said fuzzy inherence engine comprises:
    a plurality of implication circuits provided for each fuzzy implication, and including a plurality of switches connected in parallel to one another on the output side of said membership function circuit.

3. A fuzzy computer having grade-controllable membership function circuits according to claim 2, wherein mutually corresponding switch outputs of said plurality of implication circuits are connected through a MAX circuit to corresponding input of said weighted addition circuit.

4. A fuzzy computer having grade-controllable membership function circuits according to claim 3, wherein said MAX circuit comprises transistors, bases of which are connected to said switch output and emitters of which form output terminals for said implication circuits, and a wired OR which connects the emitters of transistors corresponding to each implication circuit to the input side of said weighted addition circuit.

5. A fuzzy computer having grade-controllable membership function circuits according to claim 2, wherein said membership function circuit provides, in response to an input signal, an output a signal of level which represents a previously-determined membership function determined by a peak level section of the output signal depending on a label signal.

* * * * *